United States Patent
Mao et al.

(10) Patent No.: US 12,248,724 B2
(45) Date of Patent: Mar. 11, 2025

(54) ENHANCED VIDEO CALL METHOD AND SYSTEM, AND ELECTRONIC DEVICE

(71) Applicant: Huawei Technologies Co., Ltd., Shenzhen (CN)

(72) Inventors: Jingling Mao, Shanghai (CN); Huiping Sun, Shenzhen (CN); Xiangning Liu, Shenzhen (CN); Long Wang, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 122 days.

(21) Appl. No.: 17/907,915

(22) PCT Filed: Jan. 8, 2021

(86) PCT No.: PCT/CN2021/070874
§ 371 (c)(1),
(2) Date: Aug. 29, 2022

(87) PCT Pub. No.: WO2021/169628
PCT Pub. Date: Sep. 2, 2021

(65) Prior Publication Data
US 2023/0138804 A1  May 4, 2023

(30) Foreign Application Priority Data
Feb. 28, 2020 (CN) .......................... 202010131423.2

(51) Int. Cl.
*G06F 3/14* (2006.01)
(52) U.S. Cl.
CPC .................. *G06F 3/1454* (2013.01)

(58) Field of Classification Search
CPC ................................. G06F 3/1454; G06F 3/14
See application file for complete search history.

(56) References Cited

U.S. PATENT DOCUMENTS 9,235,312 B2    1/2016  Dura et al.
9,419,923 B2*   8/2016  Seo .......................... H04L 51/04
(Continued)

FOREIGN PATENT DOCUMENTS

CN        101102211 A    1/2008
CN        101447998 A    6/2009
(Continued)

OTHER PUBLICATIONS

Zoom Community, "Side-by-side mode for screen sharing," Zoom support, https://support.zoom.us/hc/zh-cn, Total 2 pages (Oct. 1, 2019).

(Continued)

*Primary Examiner* — Olisa Anwah
(74) *Attorney, Agent, or Firm* — Leydig, Voit & Mayer, Ltd.

(57) ABSTRACT

An enhanced video call method is provided, including: A first electronic device establishes a video call with a second electronic device; if the first electronic device detects a first operation of a user on the screen sharing control, the first electronic device sends, to the second electronic device, a first request for sharing a screen of the first electronic device; and if the first request is agreed to by the second electronic device, the first electronic device displays a shared interface in a second display area of the first electronic device, and the first electronic device sends display data of the shared interface of the first electronic device to the second electronic device.

26 Claims, 39 Drawing Sheets

(56) References Cited

U.S. PATENT DOCUMENTS

| | | | |
|---|---|---|---|
| 10,057,305 B2 | 8/2018 | Woolsey et al. | |
| 10,516,851 B1 | 12/2019 | Eirinberg et al. | |
| 10,681,300 B1* | 6/2020 | Meccarelli | H04N 7/152 |
| 2011/0191695 A1* | 8/2011 | Dinka | H04L 65/4025 |
| | | | 715/753 |
| 2012/0084820 A1 | 4/2012 | Wang et al. | |
| 2012/0287231 A1* | 11/2012 | Ravi | H04W 12/50 |
| | | | 348/E5.009 |
| 2014/0025847 A1* | 1/2014 | Choi | G06F 13/102 |
| | | | 710/33 |
| 2014/0055552 A1 | 2/2014 | Song et al. | |
| 2014/0325396 A1* | 10/2014 | Sterman | H04N 7/147 |
| | | | 715/756 |
| 2015/0019694 A1* | 1/2015 | Feng | G06F 3/1462 |
| | | | 709/219 |
| 2016/0011845 A1 | 1/2016 | Kuchoor | |
| 2016/0088257 A1 | 3/2016 | Kim et al. | |
| 2016/0313969 A1 | 10/2016 | Ayabe | |
| 2017/0371501 A1* | 12/2017 | Wang | G06F 3/1454 |
| 2018/0121663 A1* | 5/2018 | Hassan | G06F 21/84 |

FOREIGN PATENT DOCUMENTS

| | | |
|---|---|---|
| CN | 101893964 A | 11/2010 |
| CN | 102291562 A | 12/2011 |
| CN | 102883134 A | 1/2013 |
| CN | 104038722 A | 9/2014 |
| CN | 104426939 A | 3/2015 |
| CN | 104469247 A | 3/2015 |
| CN | 104899361 A | 9/2015 |
| CN | 104902075 A | 9/2015 |
| CN | 105208434 A | 12/2015 |
| CN | 105224269 A | 1/2016 |
| CN | 105892977 A | 8/2016 |
| CN | 107835464 A | 3/2018 |
| CN | 107864358 A | 3/2018 |
| CN | 108933965 A | 12/2018 |
| CN | 109408168 A | 3/2019 |
| CN | 109495711 A | 3/2019 |
| CN | 109542378 A | 3/2019 |
| CN | 109862301 A | 6/2019 |
| CN | 110798652 A | 2/2020 |
| EP | 2472997 A1 | 7/2012 |

OTHER PUBLICATIONS

Xiao et al., "Design and Implementation of Screen-Sharing Tool in Video Conference Teaching System," Shanghai JiaoTong University, Total 3 pages. With an English abstract (Jan. 2014).

* cited by examiner

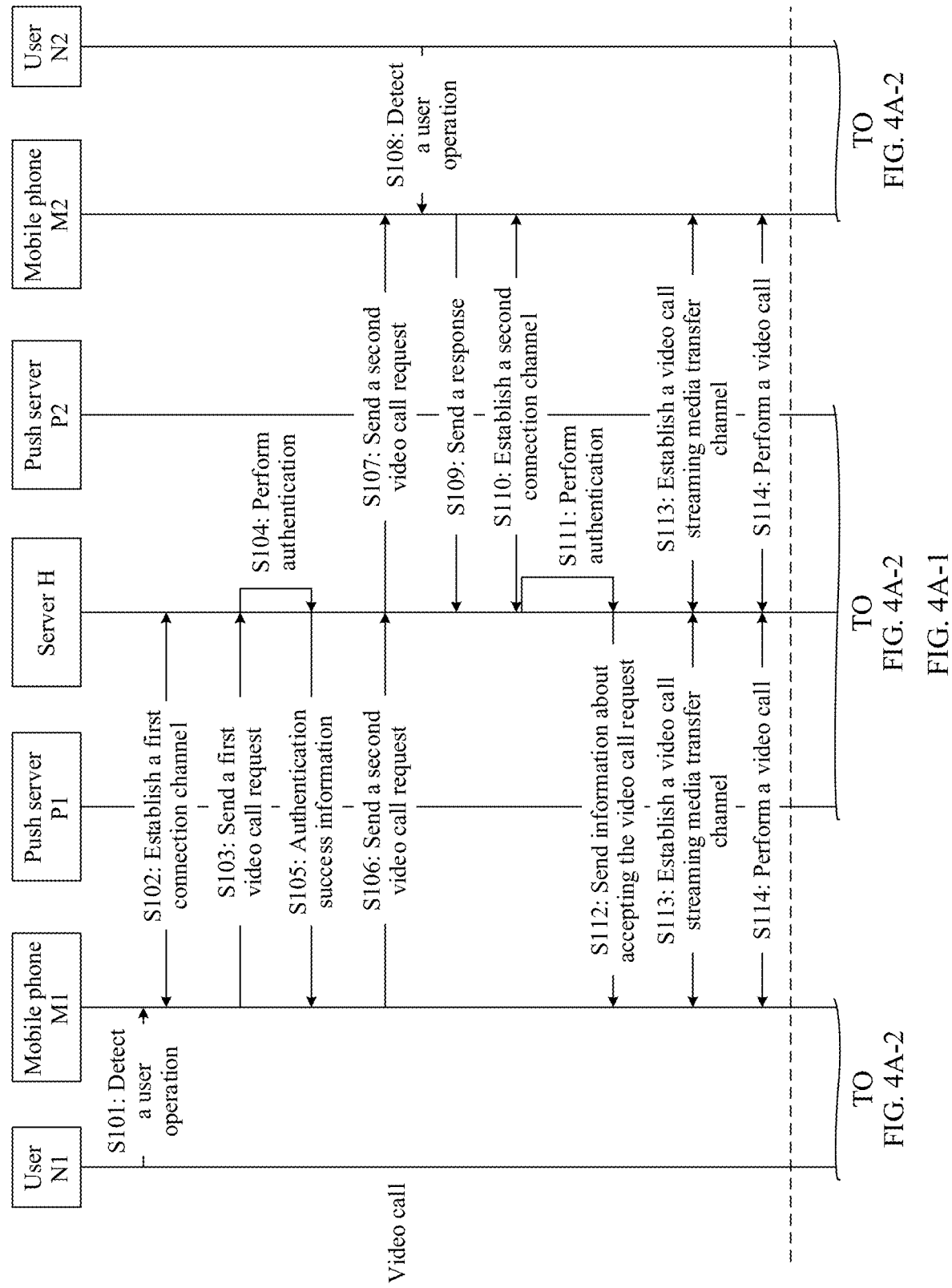

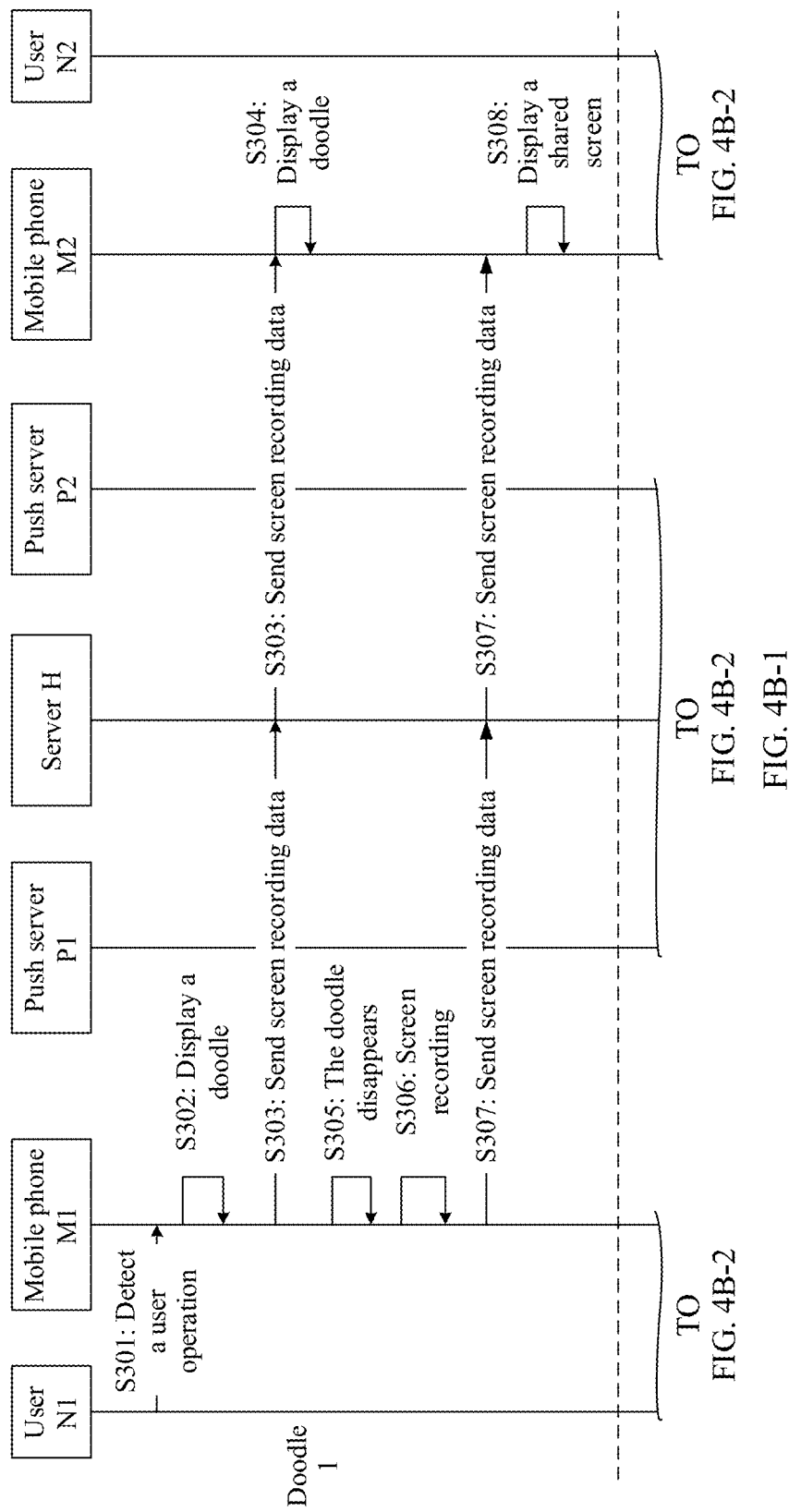

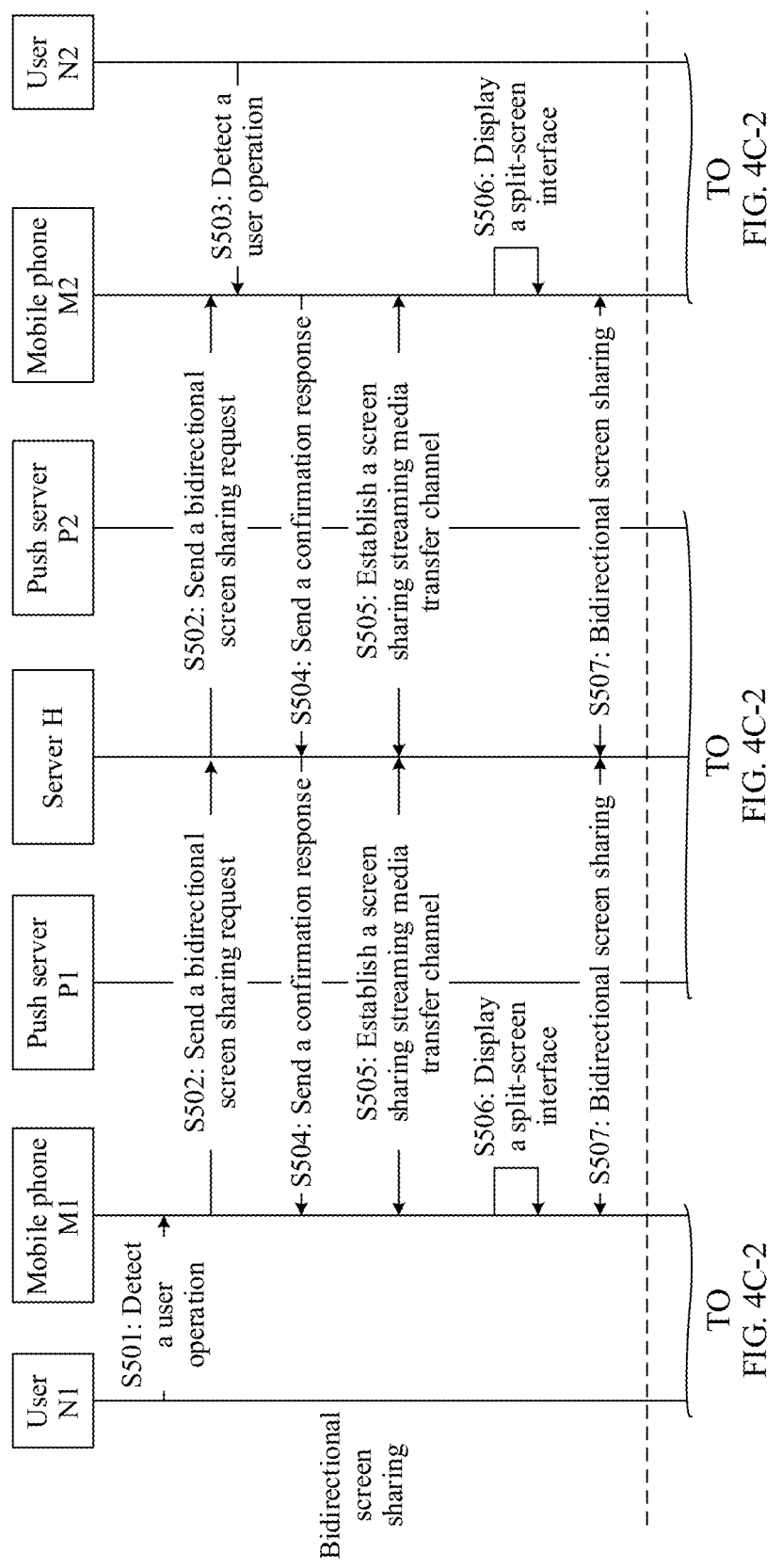

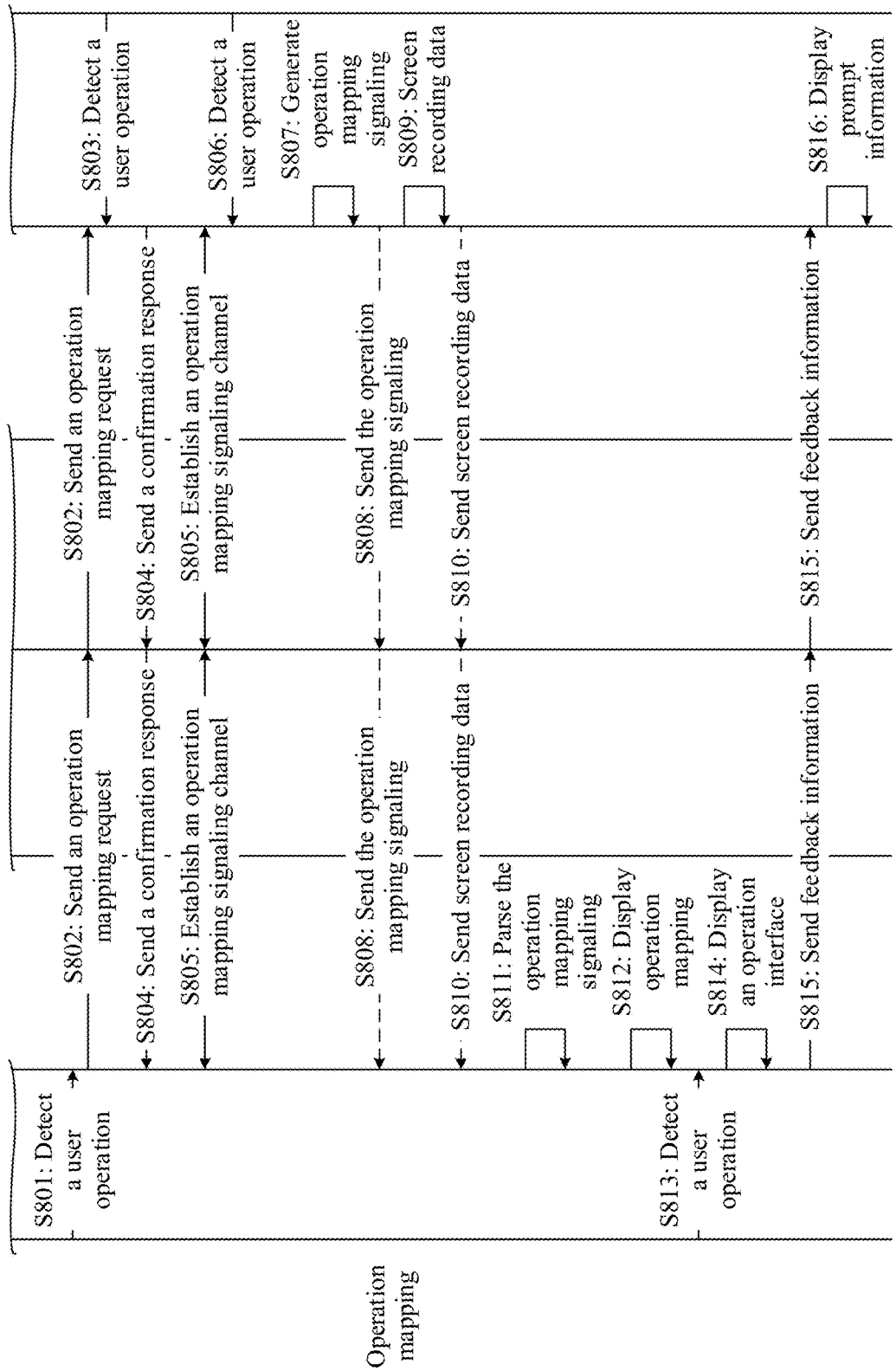

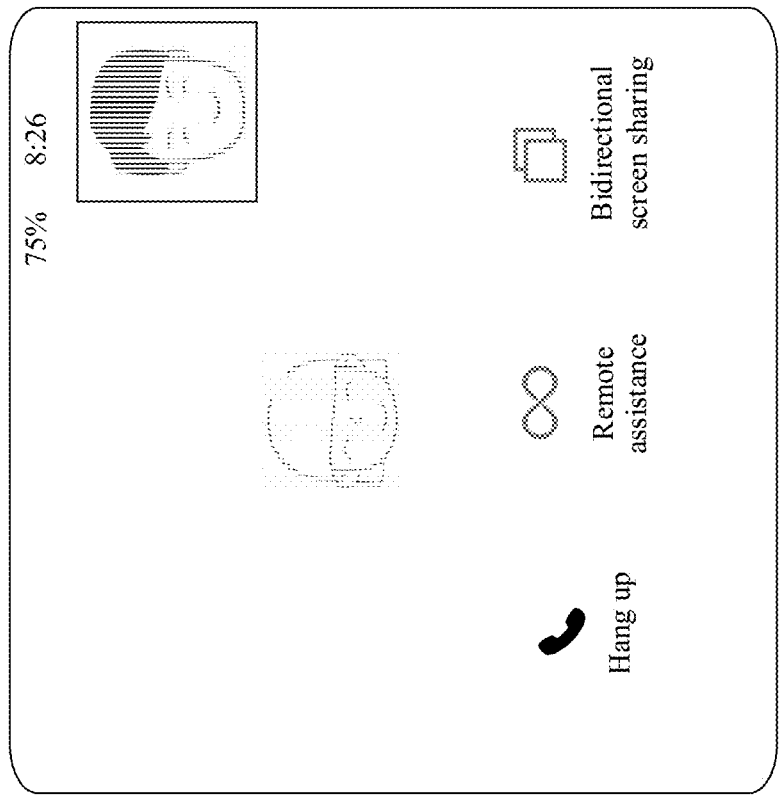
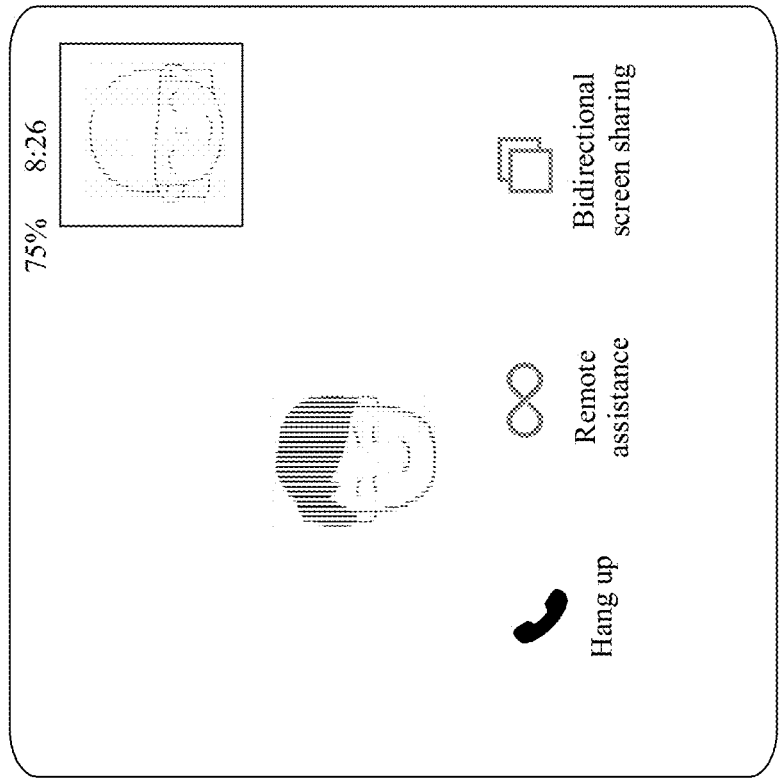
FIG. 5C

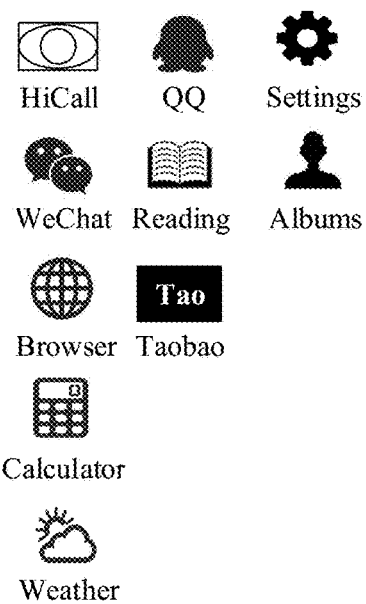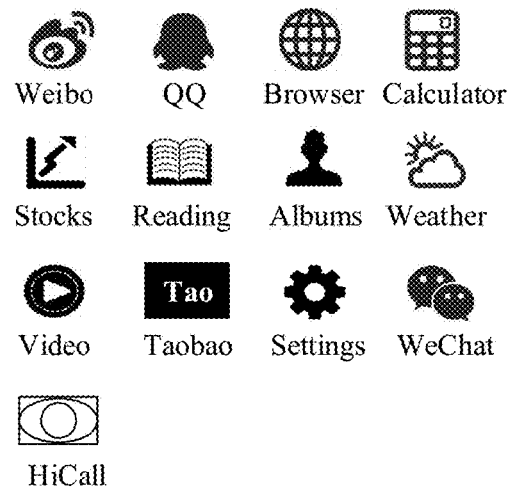
FIG. 6B

ENHANCED VIDEO CALL METHOD AND SYSTEM, AND ELECTRONIC DEVICE

CROSS-REFERENCE TO RELATED APPLICATIONS

This application is a national stage of International Application No. PCT/CN2021/070874, filed on Jan. 8, 2021, which claims priority to Chinese Patent Application No. 202010131423.2, filed on Feb. 28, 2020. Both of the aforementioned applications are hereby incorporated by reference in their entireties.

TECHNICAL FIELD

Embodiments of this application relate to the communications field, and in particular, to an enhanced video call method and system, and an electronic device.

BACKGROUND

Intelligent electronic devices such as mobile phones and tablet computers have increasingly rich functions. A user may use an application on the electronic device to perform functions such as a video call, screen sharing, and a remote operation. However, in the conventional technology, a function of a video call application is relatively simple. If the user wants to use another function (for example, screen sharing) in a video call process, the user further needs to open another application, and the user may need to switch between two or more applications in a use process. Such an operation manner is complex.

SUMMARY

Embodiments of this application provide an enhanced video call method and system, and an electronic device, to add other functions, such as screen sharing and remote assistance, to a video call application. This enriches functions of the video call application and simplifies user operations.

To resolve the foregoing technical problem, according to a first aspect, an implementation of an embodiment of this application provides an enhanced video call method, including: establishing, by a first electronic device, a video call with a second electronic device; displaying, by the first electronic device, a first video call interface, where the first video call interface includes a screen sharing control: if the first electronic device detects a first operation of a user on the screen sharing control, sending, to the second electronic device, a first request for sharing a screen of the first electronic device; and if the first request is agreed to by the second electronic device, displaying, by the first electronic device, the first video call interface in a first display area of the first electronic device, displaying a shared interface in a second display area of the first electronic device, and sending, by the first electronic device, display data of the shared interface of the first electronic device to the second electronic device. In other words, when the video call is performed, the screen sharing control is displayed on the first video call interface of the first electronic device. Therefore, the first electronic device may share the shared interface with the second electronic device based on the operation performed by the user on the screen sharing control. In addition, the first video call interface and the shared interface are displayed in different areas. This may further facilitate an operation performed by the user on the shared interface.

In a possible implementation of the first aspect, the first video call interface further includes a remote assistance control; and the method further includes: sending a second request to the second electronic device if the first electronic device detects a second operation of the user on the remote assistance control, where the second request is used by the first electronic device to request remote assistance from the second electronic device; and if the second request is agreed to by the second electronic device, receiving, by the first electronic device, a remote assistance instruction sent by the second electronic device, executing the remote assistance instruction, and displaying, on the shared interface, an interface for executing the remote assistance instruction. A remote assistance function is added to a video call application, so that remote assistance can be conveniently implemented during a video call and screen sharing, thereby improving user experience.

Further, the screen sharing control and the remote assistance control may be separately set as two controls, or may be set as one control. If the screen sharing control and the remote assistance control are set as one control, when the control is operated by the user, the first electronic device sends the first request and the second request to the second electronic device. If the second electronic device agrees to the first request and the second request, the first electronic device shares the shared interface to the second electronic device for displaying, and the second electronic device may perform remote assistance on the first electronic device by using the shared interface. In addition, the first request and the second request may also be sent as one request.

In a possible implementation of the first aspect, the enhanced video call method further includes: further displaying, by the first electronic device, a doodle control: displaying a doodle tool control on the shared interface if the first electronic device detects a third operation of the user on the doodle control; and if the first electronic device detects a fourth operation of the user on the doodle tool control, displaying, on the shared interface, a doodle interface corresponding to the fourth operation, and sending, by the first electronic device, doodle data to the second electronic device together with the display data of the shared interface. A doodle function is added to the video application. After completing sharing of the shared interface, the first electronic device may further receive, based on an operation of the user on the doodle control, a doodle of the user on the shared interface and display the doodle, and share the shared interface on which the doodle is displayed to the second electronic device for displaying. The doodle tool control may include controls such as a doodle pen and an eraser.

In a possible implementation of the first aspect, the enhanced video call method further includes: receiving, by the first electronic device, a third request that is sent by the second electronic device and that is for performing doodling on the displayed shared interface shared by the first electronic device to the second electronic device, where the second request is a doodle request: if the first electronic device agrees to the third request, making, by the first electronic device, the shared interface of the first electronic device incapable of being operated by the user; and receiving, by the first electronic device, doodle data sent by the second electronic device, and displaying a doodle on the shared interface based on the doodle data. In other words, if the second electronic device needs to perform doodle on the shared interface shared by the first electronic device, the first electronic device needs to agree the second electronic device to perform doodle, and the first electronic device needs to freeze the shared interface of the first electronic device. It should be noted that, that the first electronic device freezes the shared interface of the first electronic device is to prevent the shared interface from being operated by the user, so as to avoid that the shared interface of the first electronic device is operated by the user. This affects doodle display.

In a possible implementation of the first aspect, the doodle automatically disappears from the shared interface after a preset time. Certainly, the doodle tool control may also include an eraser tool and the like, so that the doodle can be erased.

In a possible implementation of the first aspect, after the doodle disappears from the shared interface, the shared interface of the first electronic device can be operated by the user.

In a possible implementation of the first aspect, if the first request is agreed to by the second electronic device, the method further includes: receiving, by the first electronic device, display data that is of a shared interface of the second electronic device and that is sent by the second electronic device, and displaying the shared interface of the second electronic device in the first display area based on the display data. In other words, the screen sharing control may be a control used to initiate bidirectional screen sharing, and the first request may be a bidirectional screen sharing request. Therefore, when the screen sharing control is operated by the user, the first electronic device shares the shared interface of the first electronic device to the second electronic device for displaying, and the second electronic device also shares the shared interface of the second electronic device to the first electronic device for displaying. During the video call, bidirectional screen sharing between the first electronic device and the second electronic device can be conveniently implemented, thereby improving user experience.

It should be noted that, when the first electronic device displays the shared interface of the second electronic device in the first display area, the first electronic device displays the first video call interface and the shared interface of the first electronic device in the second display area. Certainly, display manners of the first video call interface, the shared interface of the first electronic device, and the shared interface of the second electronic device may be selected based on a requirement.

In a possible implementation of the first aspect, the enhanced video call method includes: further displaying, by the first electronic device, an operation mapping control: if the first electronic device detects a fifth operation performed by the user on the operation mapping control, sending a fourth request used for performing operation mapping to the second electronic device, where the third request is an operation mapping request; and if the fourth request is agreed to by the second electronic device, receiving, by the first electronic device, operation mapping signaling that corresponds to the shared interface of the second electronic device and that is sent by the second electronic device, and displaying an operation mapping interface on the shared interface of the first electronic device based on the operation mapping signaling. During bidirectional screen sharing, the second electronic device may further display, on the shared interface of the first electronic device through operation mapping, an operation on the shared interface of the second electronic device, so as to guide the user to perform the same operation on the first electronic device.

In a possible implementation of the first aspect, the enhanced video call method further includes: if the first electronic device detects a sixth operation performed by the user on the operation mapping interface, sending, to the second electronic device, notification information used to notify the second electronic device that the user has performed the sixth operation. The second electronic device may be notified, by using the notification information, of an execution status of the first electronic device about the operation mapping, for example, the execution is completed.

In a possible implementation of the first aspect, the enhanced video call method includes: if the first electronic device detects the first operation of the user on the screen sharing control, automatically displaying, by the first electronic device, a split-screen control, where the split-screen control is displayed between the first display area and the second display area. For example, up/down screen splitting or left/right screen splitting may be performed by default, and the split-screen control is displayed in the middle of the screen. The split-screen control may be, for example, a separation bar.

In a possible implementation of the first aspect, if the first electronic device detects the first operation of the user on the screen sharing control, the method further includes: displaying, by the first electronic device, a split-screen control display type selection control that is used by the user to select a split-screen control display type; and if the first electronic device detects a seventh operation of the user on the split-screen control display type selection control, displaying a split-screen control based on a split-screen control display type selected by the user, where the split-screen control is displayed between the first display area and the second display area. To be specific, for example, a pop-up window may be displayed in a pop-up window manner, and the split-screen control display type selection control that is used to select a split-screen control display type is displayed in the pop-up window, so that the user triggers selection. For example, the split-screen control display type selection control includes "up/down screen splitting" and "left/right screen splitting". If the user selects "up/down screen splitting", the first electronic device displays an interface corresponding to "up/down screen splitting". If the user selects "left/right screen splitting", the first electronic device displays an interface corresponding to "left/right screen splitting".

In a possible implementation of the first aspect, if the first electronic device is connected to a third electronic device, the method further includes: if the first electronic device detects the first operation of the user on the screen sharing control, displaying, a screen sharing device selection control used by the user to select a device for screen sharing; and if the user selects the first electronic device as a screen sharing device, sending, by the first electronic device, the display data of the shared interface of the first electronic device to the second electronic device; or if the user selects the third electronic device as a screen sharing device, sending, by the first electronic device, display data of a shared interface of the third electronic device to the second electronic device. In other words, if the first electronic device is further connected to another electronic device, the first electronic device may further share a screen of the another electronic device to the second electronic device for displaying.

In a possible implementation of the first aspect, if the first electronic device is connected to a third electronic device, the method further includes: if the first electronic device receives a fifth request that is used for screen sharing and that is sent by the second electronic device, displaying, by the electronic device, a screen sharing device selection control used by the user to select a device for screen sharing; and if the user selects the first electronic device as a screen sharing device, receiving, by the first electronic device, the display data that is of the shared interface of the second electronic device and that is sent by the second electronic device, and displaying the shared interface: or if the user selects the third electronic device as a screen sharing device, receiving, by the first electronic device, the display data that is of the shared interface of the second electronic device and that is sent by the second electronic device, and sending the display data to the third electronic device. In other words, if the first electronic device is further connected to another electronic device, the first electronic device may further send the shared interface shared by the second electronic device to the another electronic device for displaying.

In a possible implementation of the first aspect, the enhanced video call method includes: if the first request is agreed to by the second electronic device, establishing, between the first electronic device and the second electronic device, at least one screen sharing streaming media transfer channel that is independent of a video call streaming media transfer channel, so as to transmit the display data of the shared interface, where the video call streaming media transfer channel is used to transmit video call data between the first electronic device and the second electronic device. Further, each screen sharing streaming media transfer channel corresponds to data transmission between a shared interface and a display interface of the shared interface. It should be noted that the screen sharing streaming media transfer channel that is independent of the video call streaming media transfer channel is established to transmit the display data of the shared interface, so that the video call and the screen sharing do not interfere with each other, thereby improving user experience of the video call and the screen sharing.

In a possible implementation of the first aspect, after the second request is agreed to by the second electronic device, a remote assistance operation signaling channel is established between the first electronic device and the second electronic device, so as to transmit remote assistance signaling.

In a possible implementation of the first aspect, after the doodle control is operated by the user, a doodle signaling channel is established between the first electronic device and the second electronic device, to transmit the third request. In addition, after the doodle disappears, the second electronic device may further send, to the first electronic device through the doodle signaling channel, a message used to notify that the doodle disappears.

In a possible implementation of the first aspect, after the fourth request is agreed to by the second electronic device, an operation mapping signaling channel is established between the first electronic device and the second electronic device, so as to transmit the foregoing operation mapping signaling and transmit notification information.

In a possible implementation of the first aspect, the operation mapping signaling includes mapping mark code information, operation domain information, operation object information, and operation code information.

In a possible implementation of the first aspect, the enhanced video call method further includes: if the first request is agreed to by the second electronic device, displaying, by the first electronic device, a side tool bar control on a side edge of the screen; and if the first electronic device detects an eighth operation of the user on the side tool bar control, displaying, by the first electronic device, an interface corresponding to the eighth operation. The eighth operation may be an operation such as dragging or sliding. The side tool bar may include at least one of the screen sharing control, the doodle control, and the operation mapping control, and may further include another control.

According to a second aspect, an implementation of an embodiment of this application provides an enhanced video call method, including: establishing, by a second electronic device, a video call with a first electronic device, where the second electronic device displays a second video call interface: receiving, by the second electronic device, a first request that is for sharing a screen of the first electronic device and that is sent by the first electronic device, and displaying, on the second video call interface, a first confirmation control used by a user to confirm the first request: if the second electronic device detects a ninth operation of the user on the first confirmation control, sending, to the first electronic device, a first reply indicating that the first request is agreed to; and receiving, by the second electronic device, display data that is of a shared interface of the first electronic device and that is sent by the first electronic device, displaying, by the second electronic device, the second video call interface in a first display area of the second electronic device, and displaying, in a second display area of the second electronic device, the shared interface corresponding to the display data. The second electronic device that performs a video call with the first electronic device receives and displays the shared interface shared by the first electronic device, so as to implement screen sharing between the first electronic device and the second electronic device.

In a possible implementation of the first aspect, the enhanced video call method includes: receiving, by the second electronic device, a second request sent by the first electronic device, and displaying a second confirmation control used by the user to confirm the second request, where the second request is used by the first electronic device to request remote assistance from the second electronic device: if the second electronic device detects a tenth operation of the user on the second confirmation control, sending, to the first electronic device, a second reply indicating that the second request is agreed to; and sending a remote assistance instruction to the second electronic device if the second electronic device detects an eleventh operation performed by the user on the shared interface.

In a possible implementation of the first aspect, the enhanced video call method includes: further displaying, by the second electronic device, a doodle control: if the second electronic device detects a twelfth operation of the user on the doodle control, sending, to the first electronic device, a third request for performing doodling on the displayed shared interface shared by the first electronic device to the second electronic device; and if the third request is agreed to by the first electronic device, and the second electronic device detects a thirteenth operation performed by the user on the shared interface, displaying, on the shared interface of the second electronic device, a doodle interface corresponding to the thirteenth operation, and sending doodle data to the first electronic device.

In a possible implementation of the first aspect, if the second electronic device agrees to the first request, the method further includes: receiving, by the second electronic device, the display data that is of the shared interface of the first electronic device and that is sent by the first electronic device, and displaying the shared interface of the first electronic device in the first display area of the second electronic device based on the display data.

In a possible implementation of the first aspect, the enhanced video call method includes: receiving, by the second electronic device, a fourth request that is sent by the first electronic device and that is used to perform operation mapping, and displaying a third confirmation control that corresponds to the fourth request and that is used by the user to confirm the fourth request: sending a third reply to the first electronic device if the second electronic device detects a fourteenth operation of the user on the third confirmation control; and if the second electronic device detects a fifteenth operation performed by the user on the shared interface of the second electronic device, displaying an interface corresponding to the fifteenth operation, and sending operation mapping signaling to the first electronic device.

In a possible implementation of the first aspect, the method further includes: receiving, by the second electronic device, notification information sent by the first electronic device, and displaying an interface corresponding to the notification information, where the notification information is used to notify the second electronic device that the user has performed a sixth operation, and the sixth operation is an operation performed by the user on the operation mapping interface on the first electronic device.

In a possible implementation of the first aspect, if the second electronic device agrees to the first request, the second electronic device automatically displays the split-screen control.

In a possible implementation of the first aspect, if the second electronic device agrees to the first request, the method further includes: displaying, by the second electronic device, a split-screen control display type selection control that is used by the user to select a split-screen control display type; and if the second electronic device detects a trigger operation of the user on the split-screen control display type selection control, displaying a split-screen control based on a split-screen control display type selected by the user.

In a possible implementation of the first aspect, if the second electronic device is connected to a fourth electronic device, the method further includes: if the second electronic device agrees to the first request, displaying, by the second electronic device, a screen sharing device selection control used by the user to select a device for screen sharing; and if the user selects the second electronic device as a screen sharing device, sending, by the second electronic device, the display data of the shared interface of the second electronic device to the first electronic device: or if the user selects the fourth electronic device as a screen sharing device, sending, by the second electronic device, the display data of the shared interface of the fourth electronic device.

In a possible implementation of the first aspect, if the second electronic device is connected to a fourth electronic device, the method further includes: if the second electronic device sends a fifth request used for screen sharing to the first electronic device, displaying, by the second electronic device, a screen sharing device selection control used by the user to select a device for screen sharing; and if the user selects the second electronic device as a screen sharing device, receiving, by the second electronic device, the display data that is of the shared interface of the first electronic device and that is sent by the first electronic device, and displaying the shared interface: or if the user selects the fourth electronic device as a screen sharing device, receiving, by the second electronic device, the display data that is of the shared interface of the first electronic device and that is sent by the first electronic device, and sending the display data to the fourth electronic device.

In a possible implementation of the first aspect, if the second electronic device agrees to the first request, the second electronic device displays a side tool bar control on a side edge of the screen; and if the second electronic device detects an operation of the user on the side tool bar control, the first electronic device displays an interface corresponding to the operation.

According to a third aspect, an implementation of an embodiment of this application provides an enhanced video call system, including: a first electronic device and a second electronic device, where the first electronic device establishes a communication connection to the second electronic device, the first electronic device executes the enhanced video call method provided in the first aspect and/or any possible implementation of the first aspect, and the second electronic device executes the enhanced video call method provided in the second aspect and/or any possible implementation of the second aspect. It should be noted that, both the first electronic device and the second electronic device may perform the foregoing enhanced video call method by using a same application. Therefore, when the enhanced video call method is not performed, the first electronic device and the second electronic device have a same or corresponding display interface.

The enhanced video call system provided in this embodiment of this application includes a first electronic device configured to perform the enhanced video call method provided in any one of the first aspect and/or the possible implementations of the first aspect. Therefore, beneficial effects (or advantages) of the enhanced video call method provided in the third aspect can also be implemented.

According to a fourth aspect, an implementation of an embodiment of this application provides an electronic device, including: a memory, configured to store a computer program, where the computer program includes program instructions; and a processor, configured to execute the program instructions, so that the electronic device performs the foregoing enhanced video call method.

According to a fifth aspect, an implementation of an embodiment of this application provides a computer-readable storage medium, where the computer-readable storage medium stores a computer program, the computer program includes program instructions, and the program instructions are run by an electronic device to enable the electronic device to perform the foregoing enhanced video call method.

BRIEF DESCRIPTION OF DRAWINGS

To describe the technical solutions in the embodiments of this application more clearly, the following briefly describes the accompanying drawings for describing the embodiments.

FIG. 4A-1 and FIG. 4A-2 are a flowchart of a method for performing a video call and remote assistance according to an embodiment of this application;

FIG. 4B-1 and FIG. 4B-2 are a flowchart of a doodling method according to an embodiment of this application;

FIG. 4C-1 and FIG. 4C-2 are a flowchart of a method for performing bidirectional screen sharing and operation mapping according to an embodiment of this application;

FIG. 6A to FIG. 6C-2 are schematic diagrams of other interfaces of mobile phones M1 and M2 according to an embodiment of this application;

FIG. 6D-1 to FIG. 6F are schematic diagrams of some interfaces of electronic devices according to an embodiment of this application.

DESCRIPTION OF EMBODIMENTS

The following further describes in detail implementations of embodiments of this application with reference to accompanying drawings.

The embodiments of this application mainly relate to an enhanced video call method applied to electronic devices. The electronic devices include an electronic device such as a mobile phone, a tablet computer, a television, a notebook computer, an ultra-mobile personal computer (UMPC), a handheld computer, a netbook, a personal digital assistant (PDA), a wearable device, or a virtual reality device.

It should be noted that, in this embodiment of this application, the electronic device is an electronic device that can perform wireless communication with another electronic device, the electronic device has a screen, and supports a screen splitting function and/or a screen selection function, and the electronic device has a video call function.

The enhanced video call method provided in this embodiment of this application may be applied to the foregoing electronic device. For example, the electronic device may be a mobile phone.

Figure 1:
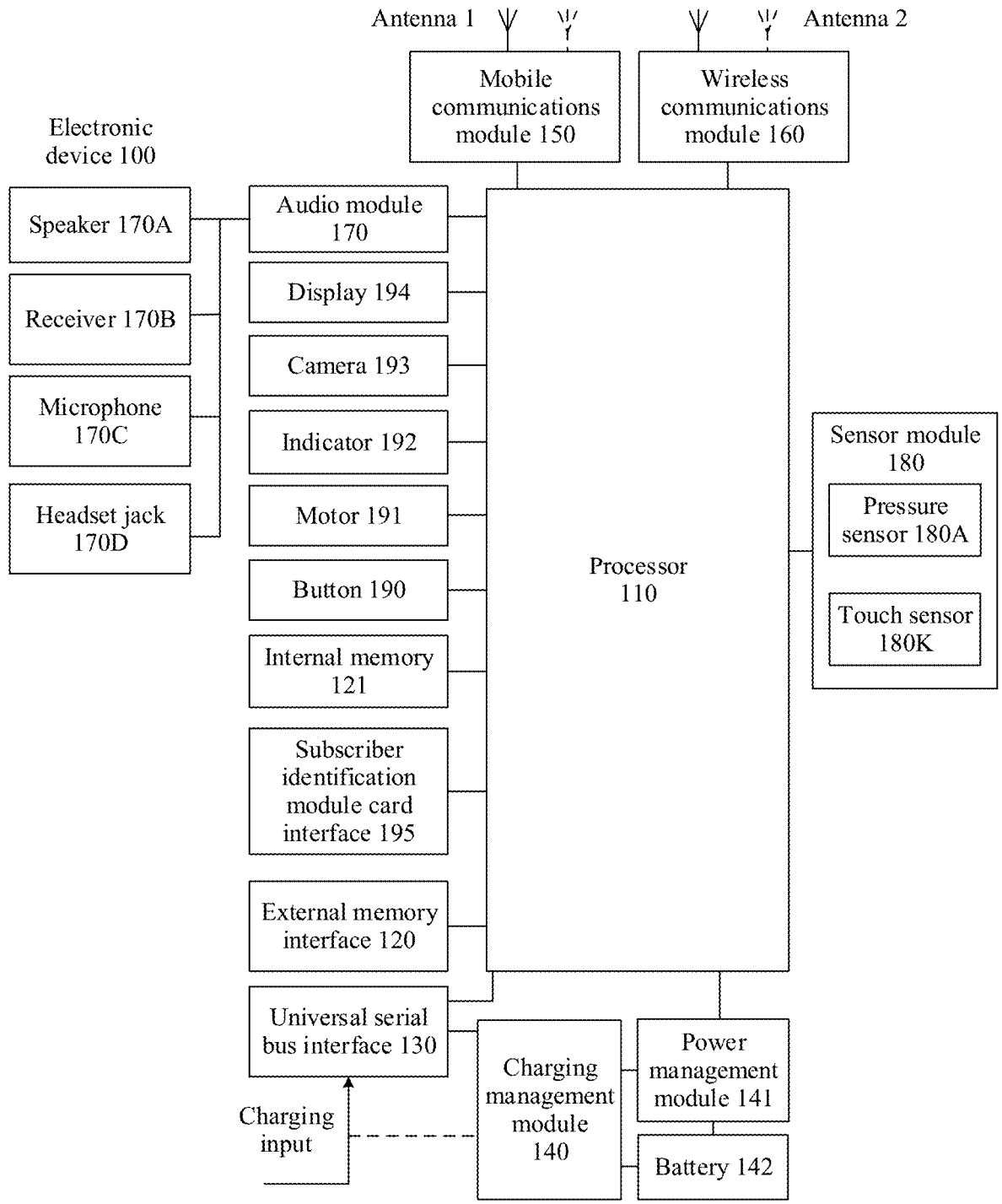
FIG. 1 is a schematic diagram of a structure of a mobile phone according to an embodiment of this application.

FIG. 1 is a schematic diagram of a structure of a mobile phone 100 according to an embodiment of this application.

The mobile phone 100 may include a processor 110, an external memory interface 120, an internal memory 121, a universal serial bus (USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (SIM) card interface 195, and the like. The sensor module 180 may include a pressure sensor 180A, a touch sensor 180K, and the like.

It may be understood that an illustrated structure in the embodiments of the present invention does not constitute a limitation on the mobile phone 100. In some other embodiments of this application, the mobile phone 100 may include more or fewer components than those shown in the figure, or combine some components, or split some components, or have different component arrangements.

The processor 110 may include one or more processing units. For example, the processor 110 may include an application processor (AP), a modem processor, a graphics processing unit (GPU), an image signal processor (ISP), a controller, a video codec, a digital signal processor (DSP), and a baseband processor. Different processing units may be independent components, or may be integrated into one or more processors. A memory may be further disposed in the processor 110, and is configured to store instructions and data. The processor 110 is configured to enable the mobile phone 100 to perform the enhanced video call method provided in the embodiments of this application.

A wireless communication function of the mobile phone 100 may be implemented through the antenna 1, the antenna 2, the mobile communications module 150, the wireless communications module 160, the modem processor, the baseband processor, and the like.

The mobile communications module 150 may provide a wireless communication function such as 2G/3G/4G/5G applied to the mobile phone 100.

The wireless communications module 160 may provide a wireless communications solution including a wireless local area network (WLAN) (for example, a wireless fidelity (Wi-Fi) network) and Bluetooth (BT) that is applied to the mobile phone 100.

In some embodiments, the antenna 1 and the mobile communications module 150) of the mobile phone 100 are coupled, and the antenna 2 and the wireless communications module 160 are coupled, so that the mobile phone 100 can communicate with a network and another device by using a wireless communication technology.

The application processor outputs a sound signal by using an audio device (which is not limited to the speaker 170A, the receiver 170B, or the like), or displays an image or a video on the display 194.

The mobile phone 100 implements a display function by using the GPU, the display 194, the application processor, and the like. The GPU is a microprocessor for image processing, and is connected to the display 194 and the application processor. The GPU is configured to: perform mathematical and geometric computation, and render an image. The processor 110 may include one or more GPUs, which execute program instructions to generate or change display information.

The display 194 is configured to display an image, a video, and the like. In some embodiments, the mobile phone 100 may include one or N displays 194. Herein, N is a positive integer greater than 1.

The mobile phone 100 may implement a photographing function and a video call function by using the ISP, the camera 193, the video codec, the GPU, the display 194, the application processor, and the like. In some embodiments, the mobile phone 100 may include one or N cameras 193, where N is a positive integer greater than 1. Further, the mobile phone 100 includes at least one camera 193 located on a same side as the display 194.

The video codec is configured to compress or decompress a digital video. The mobile phone 100 may support one or more video codecs. In this way, the mobile phone 100 may play or record videos in a plurality of encoding formats, for example, moving picture experts group (MPEG) 1, MPEG2, MPEG3 and MPEG4. In addition, the mobile phone may encapsulate and play audio/video data and screen recording data.

The mobile phone 100 may implement an audio function such as video calling, music playing or recording through the audio module 170, the speaker 170A, the telephone receiver 170B, the microphone 170C, the headset jack 170D, the application processor, and the like.

The audio module 170 is configured to convert digital audio information into an analog audio signal for output, and is also configured to convert analog audio input into a digital audio signal. The audio module 170 may be further configured to code and decode an audio signal. In some embodiments, the audio module 170 may be disposed in the processor 110, or some functional modules in the audio module 170 are disposed in the processor 110.

The speaker 170A, also referred to as a "loudspeaker", is configured to convert an audio electrical signal into a sound signal. The mobile phone 100 may make a video call, listen to music, or listen to a hands-free call by using the speaker 170A.

The receiver 170B, also referred to as an "earpiece", is configured to convert an electrical audio signal into a sound signal. When a call is answered or voice information is received by using the mobile phone 100, the receiver 170B may be put close to a human ear to listen to a voice.

The microphone 170C, also referred to as a "mike" or a "mic", is configured to convert a sound signal into an electrical signal.

The headset jack 170D is configured to connect to a wired headset.

The pressure sensor 180A is configured to sense a pressure signal, and can convert the pressure signal into an electrical signal. In some embodiments, the pressure sensor 180A may be disposed on the display 194. When a touch operation is performed on the display 194, the mobile phone 100 detects intensity of the touch operation by using the pressure sensor 180A. The mobile phone 100 may also calculate a touch position based on a detection signal of the pressure sensor 180A.

The touch sensor 180K is also referred to as a "touch component". The touch sensor 180K may be disposed on the display 194, and the touch sensor 180K and the display 194 constitute a touchscreen, which is also referred to as a "touch screen". The touch sensor 180K is configured to detect a touch operation performed on or near the touch sensor. The touch sensor 180K may transfer the detected touch operation to the application processor to determine a touch event type. A visual output related to the touch operation may be provided through the display 194. In some other embodiments, the touch sensor 180K may alternatively be disposed on a surface of the mobile phone 100, and is located on a position different from that of the display 194.

In this embodiment of this application, the mobile phone 100 may detect a trigger operation of a user on the display 194 based on the pressure sensor 180A and the touch sensor 180K, or may detect voice input of a user based on the receiver 170B, or may detect gesture input of a user based on the camera 193, or detect input of a user based on an input module such as another input keyboard. This is not limited in this embodiment.

The following describes the embodiments of this application by using a mobile phone as an example.

Figure 2:
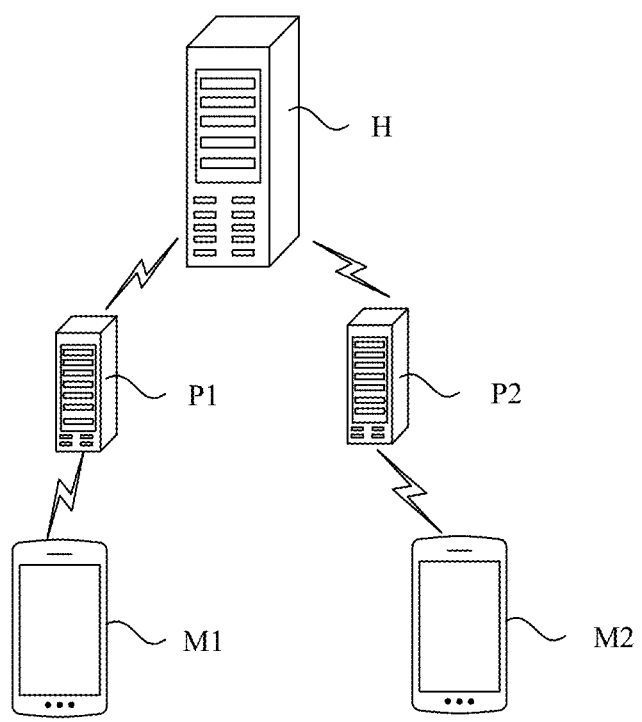
FIG. 2 is a block diagram of a structure of a communications system according to an embodiment of this application.

FIG. 2 is a block diagram of a structure of a communications system according to an embodiment of this application.

The communications system includes a mobile phone M1, a push server P1, a server H, a push server P2, and a mobile phone M2, where a user of the mobile phone M1 is a user N1, and a user of the mobile phone M2 is a user N2. The mobile phone M1 communicates with the push server P1 through a communication network. The mobile phone M2 communicates with the push server P2 through a communication network. The push server P1 and the push server P2 communicate with the server H through a communication network. The mobile phone M1 and the mobile phone M2 perform communication interaction with the push server P2 through the push server P1 and the server H.

It should be noted that, in another implementation of this embodiment of this application, the push server P1 and the push server P2 may alternatively be devices of another type, provided that the devices meet a requirement for communication between the mobile phone M1 and the server H and between the mobile phone M2 and the server H. Further, in another implementation of this embodiment of this application, the mobile phone M1 and the mobile phone M2 may directly communicate with the server H without using another server. This may be specifically set as required.

In some embodiments of this application, a communications application is installed on both the mobile phone M1 and the mobile phone M2. The communications application has a video call function, and optionally, further has at least one of functions such as bidirectional screen sharing, remote assistance, doodle, and operation mapping. The communications application may be logged in to by using account information and a password of the user. For a specific login manner, refer to the conventional technology. This is not limited in this embodiment of this application. A user N1 starts a communications application in the mobile phone M1, and initiates a video call request to a user N2. If the user N2 operates the mobile phone M2 and accepts the video call request, the user N1 and the user N2 may perform a video call.

It should be noted that, in this application, the video call means that the mobile phone M1 and the mobile phone M2 have a function of performing a video call between the user N1 and the user N2. The bidirectional screen sharing means that the mobile phone M1 shares a screen of the mobile phone M1 to the mobile phone M2 for displaying. In this process, the mobile phone M2 also shares a screen of the mobile phone M2 to the mobile phone M1 for displaying. The remote assistance means that the mobile phone M1 shares the screen of the mobile phone M1 with the mobile phone M2 for displaying, and the mobile phone M2 may perform a long-distance control and operation on the mobile phone M1. The doodle means that the mobile phone M1 may display, on the screen of the mobile phone M1 based on a trigger operation of the user N1, doodle content such as a line or a picture that is associated with the trigger operation of the user N1. The operation mapping means that the mobile phone M2 maps an operation performed by the user N2 on the mobile phone M2 to the mobile phone M1, so that the user N1 can perform a same operation by using mapping display on the mobile phone M1. This is described in the following with reference to specific embodiments.

In a process in which the mobile phones M1 and M2 perform video communication, interfaces of the video call displayed by the mobile phones M1 and M2 may both provide more function controls, for example, bidirectional screen sharing and remote assistance. If the user N1 enables a function such as bidirectional screen sharing or remote assistance by using these function controls, and the user N2 operates the mobile phone M2 to accept a request of the function, the mobile phone M1 may further display an interface corresponding to the function in another area while displaying the interface of the video call. Correspondingly, the mobile phone M2 may also display the interface of the video call and the interface corresponding to the function at the same time.

In an example in which remote assistance is performed in a video call process, the mobile phone M1 is used as a requesting party of remote assistance, and the mobile phone M2 is used as an assisting party of remote assistance, so that the user N2 may perform an operation on the mobile phone M2 to remotely assist in operating the mobile phone M1. It should be noted that, in this application, performing remote assistance means that the mobile phone M1 shares the screen of the mobile phone M1 with the mobile phone M2 for displaying, and the mobile phone M2 may perform remote assistance on the mobile phone M1 based on the screen shared by the mobile phone M1. Specifically, the mobile phone M1 communicates with the mobile phone M2 through a communication network. The mobile phone M1 initiates a remote assistance request. After the mobile phone M2 accepts the request, the mobile phone M1 authorizes an operation right to the mobile phone M2. The mobile phone M1 transmits image information displayed on the screen of the mobile phone M1 to the mobile phone M2 through a communication channel, so that the mobile phone M2 performs synchronous display, thereby implementing screen sharing. In addition, the user N2 performs a remote auxiliary operation by using the mobile phone M2, and the mobile phone M2 transmits remote auxiliary operation signaling corresponding to the remote auxiliary operation to the mobile phone M1 by using the signaling channel, so that the mobile phone M1 performs a corresponding operation based on the remote auxiliary operation signaling, thereby implementing the remote auxiliary operation performed by the user N2 on the mobile phone M1 by using the mobile phone M2.

The mobile phone M1 and the mobile phone M2 may have a screen splitting function. When screen splitting needs to be performed, a screen may be split into at least two display areas, to separately display different content or display same content. Alternatively, the mobile phone M1 and the mobile phone M2 may include at least two physical screens. The two screens may be separately used as independent screens, or the at least two physical screens may be combined into one screen and used as an entire screen. In this embodiment of this application, the mobile phone M1 and the mobile phone M2 may select, based on a user requirement, a screen from a plurality of screens to display different content during screen sharing.

Figure 3:
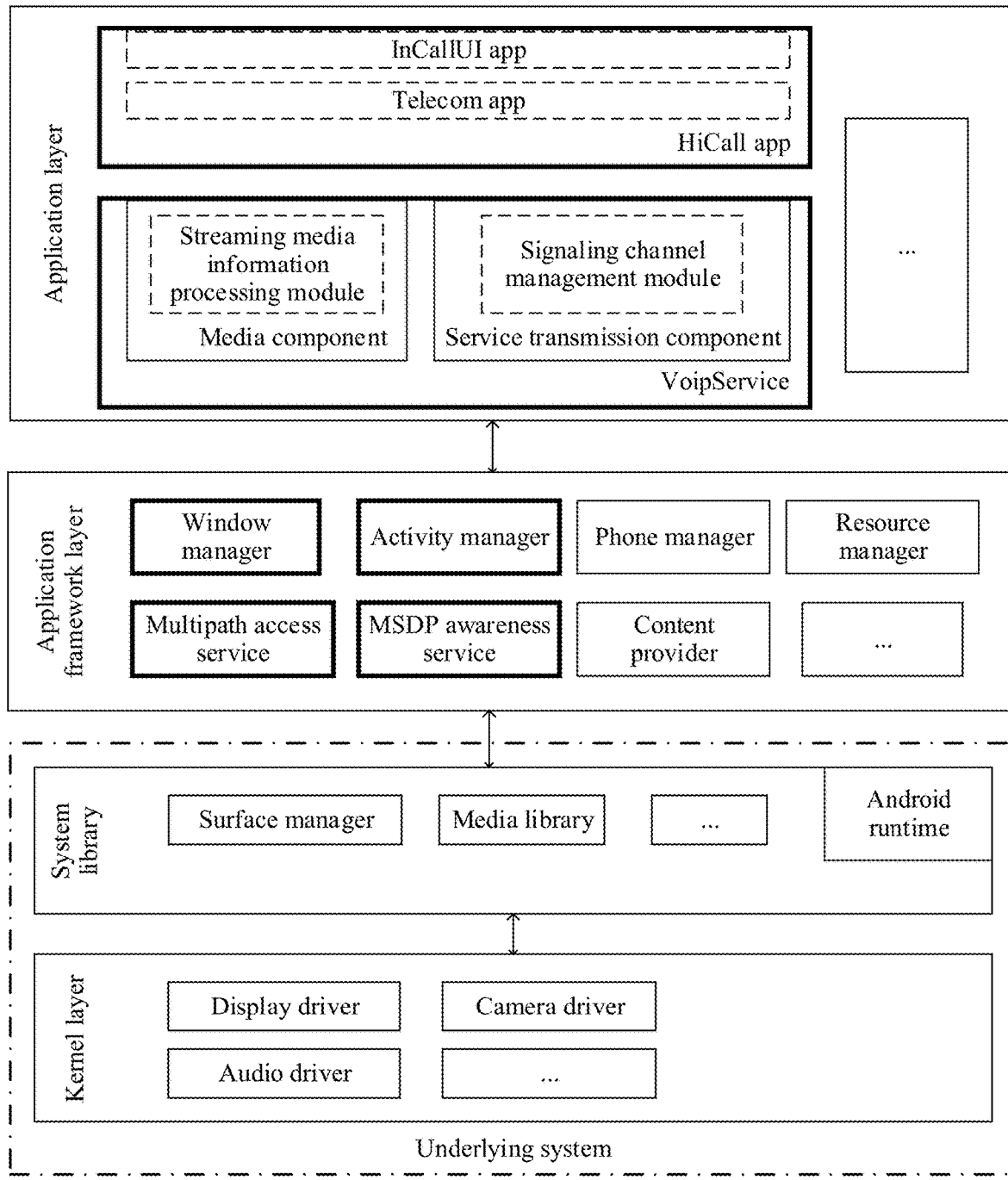
FIG. 3 is a block diagram of a software structure of a mobile phone according to an embodiment of this application.

FIG. 3 is a block diagram of a software structure of a mobile phone according to an embodiment of this application. In a layered architecture, software is divided into several layers, and each layer has a clear role and division of labor. The layers communicate with each other through a software interface. In some embodiments, an Android system is divided into four layers: an application layer, an application framework layer, a system library, and a kernel layer from top to bottom.

The application layer may include a series of applications, for example, including a HiCall app and a VoipService. The HiCall app is a communications application that supports a video call and screen sharing and that is provided in this embodiment of this application, and has a visualized user interface. The VoipService provides support for the HiCall app, and has no visualized user interface.

The application layer may include applications such as a camera, a gallery, a calendar, a call, a map, navigation, Bluetooth, music, a video, and an SMS message.

An application interface provided by the HiCall app includes some function controls. The function controls are displayed in a form of a side tool bar or in a form of another type of touch control on the screen, and may be displayed based on different scenarios in which the application is located. In this embodiment of this application, the function control may include one or more of five controls: "Video call", "Remote assistance", "Bidirectional screen sharing", "Doodle", and "Operation mapping", and display content of the function control on the screen includes an icon and a text.

Figure 5A:
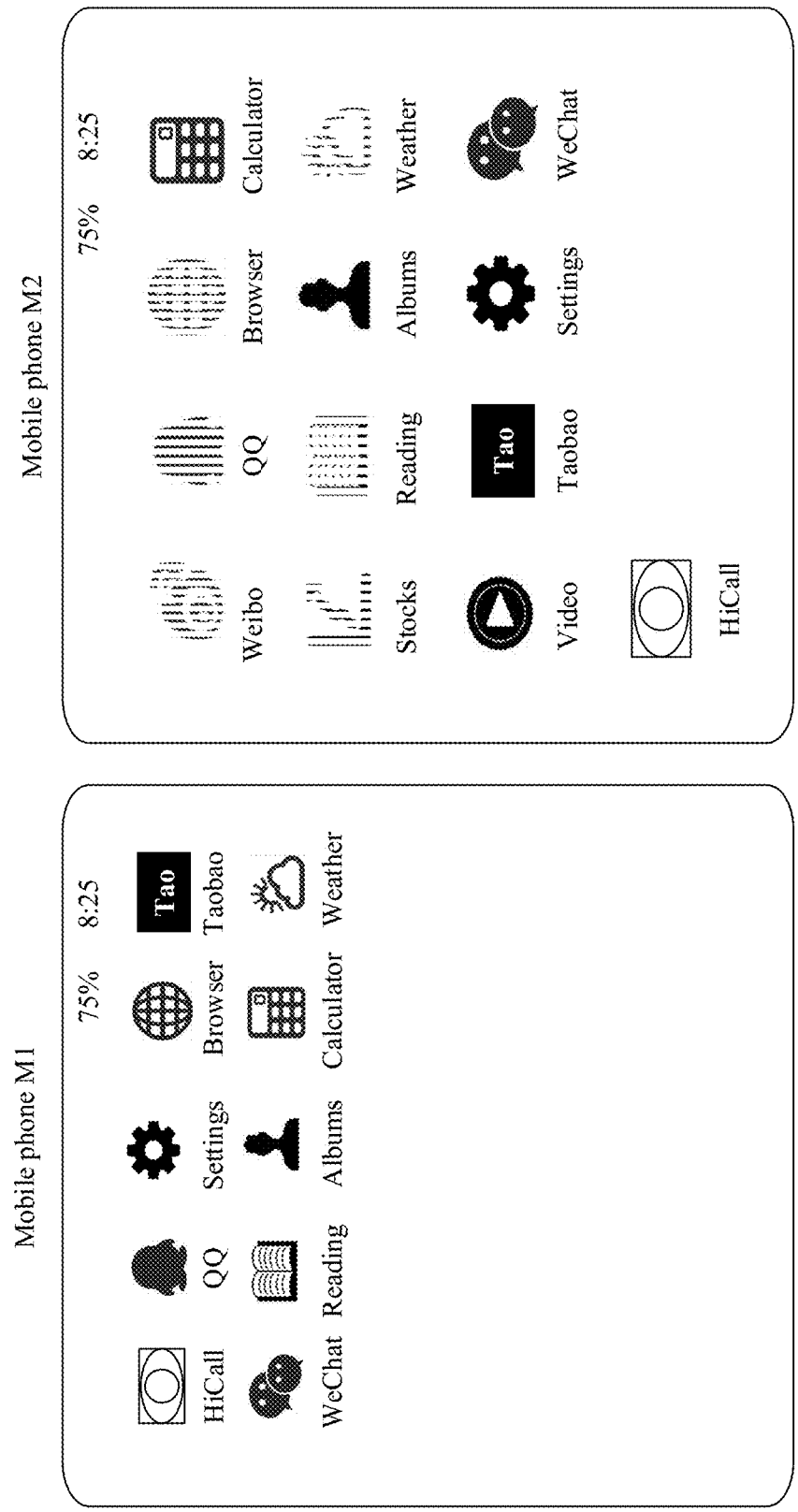
FIG. 5A to FIG. 5P are schematic diagrams of some interfaces of mobile phones M1 and M2 according to an embodiment of this application.
Figure 5B:
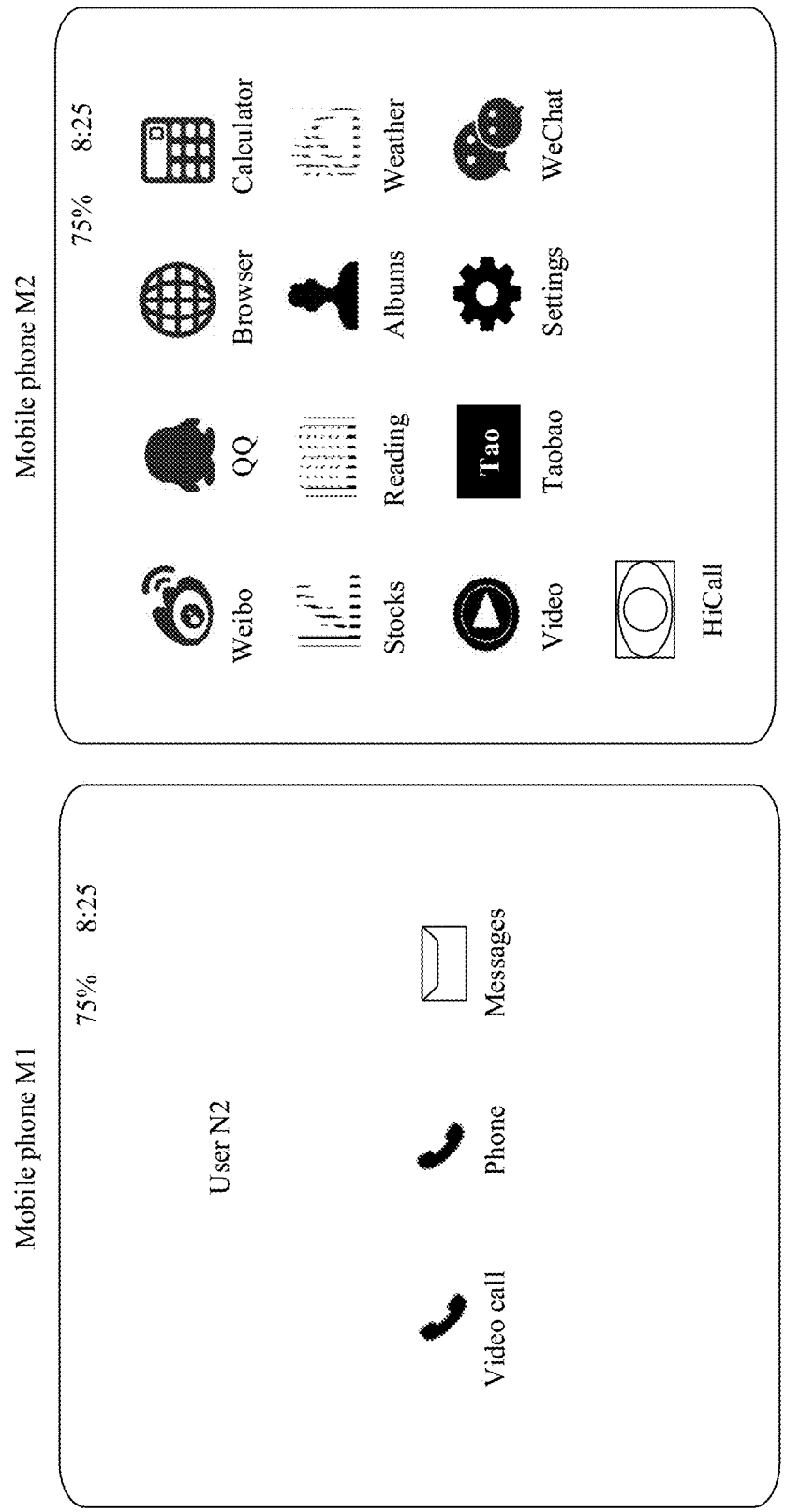
Figures 1, 5D:
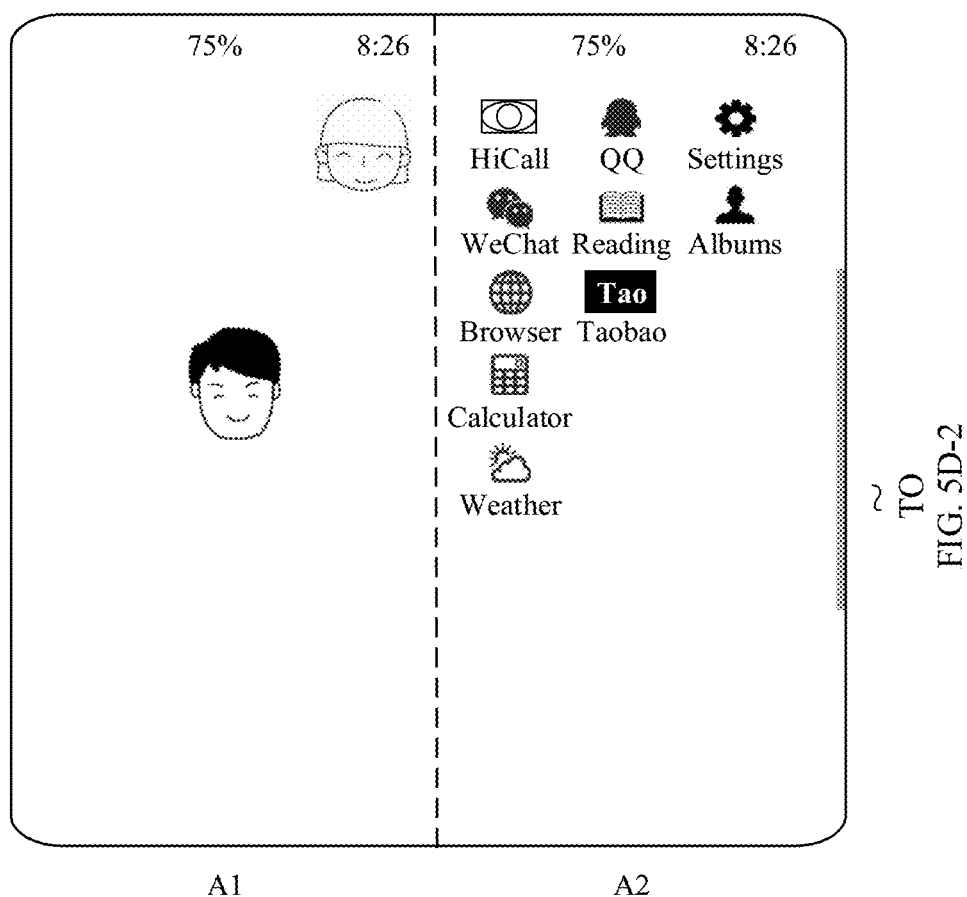
Figures 2, 5D:
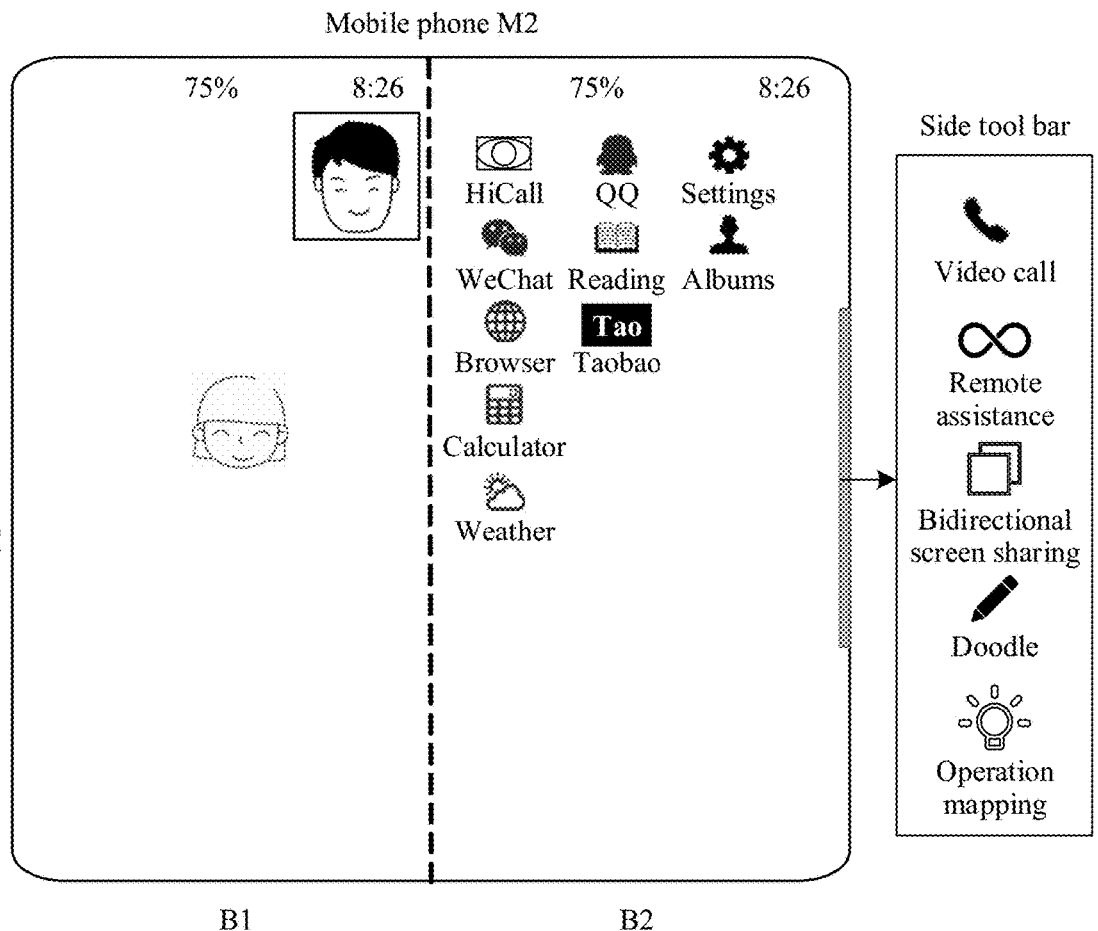

For example, for formats of the five controls "Video call", "Remote assistance", "Bidirectional screen sharing", "Doodle", and "Operation mapping", refer to the formats in the side tool bars in FIG. 5D-1 and FIG. 5D-2. Optionally, the side tool bar may display only some of the five controls, or display many other controls.

For example, if the mobile phone M1 detects an operation of triggering the "Video call" control by the user N1, a video call is established between the mobile phone M1 and the mobile phone M2.

If the mobile phone M1 detects an operation of triggering the "Remote assistance" control by the user N1, remote assistance is established between the mobile phone M1 and the mobile phone M2.

If the mobile phone M1 detects a trigger operation performed by the user N1 on the "Bidirectional screen sharing" control, the mobile phone M1 shares the screen of the mobile phone M1 to the mobile phone M2 for displaying, and at the same time, the mobile phone M2 shares the screen of the mobile phone M2 to the mobile phone M1 for displaying.

If the mobile phone M1 detects an operation of triggering the "Doodle" control by the user N1, the mobile phone M1 receives a doodle operation performed by the user N1, and shares a screen including the doodle to the mobile phone M2 for displaying, or the mobile phone M2 receives a doodle operation performed by the user N2, and shares the screen including the doodle to the mobile phone M1 for displaying.

If the mobile phone M1 detects an operation of triggering the "Operation mapping" control by the user N1, operation mapping is performed between the mobile phone M1 and the mobile phone M2.

The HiCall app includes an InCallUI app and a Telecom app. The InCallUI app is responsible for displaying and adaptation of a communications interface. For example, the InCallUI app includes an interface switching portal of service functions such as the foregoing video call, bidirectional screen sharing, remote assistance, doodle, and operation mapping, to display a corresponding interface.

The Telecom app is responsible for communication logic control, for example, conflict management of a call.

The VoipService is responsible for service logic control, including implementing functions such as voice call, video call, device discovery, message service, service function switchover, doodle, and operation mapping, and synthesizing and parsing operation mapping signaling. The capabilities are encapsulated into service APIs for the HiCall app to use.

The VoipService includes a media component and a service transmission component. The service transmission component includes a signaling channel management module. The signaling channel management module manages signaling channels, including creating communication channels and managing a plurality of channels. The channel includes a video call streaming media transfer channel, a screen sharing streaming media transfer channel, a remote assistance operation signaling channel, a doodle signaling channel, an operation mapping signaling channel, and the like. In this embodiment of this application, the video call streaming media transfer channel, the screen sharing streaming media transfer channel, the remote assistance operation signaling channel, the doodle signaling channel, the operation mapping signaling channel, and the like are all constructed and managed by the service transmission component.

The media component includes a streaming media information processing module. The streaming media information processing module is responsible for processing and transmitting streaming media information, and provides capabilities such as audio and video encoding and decoding and transmission. The streaming media information processing module is configured to implement processing of audio call streaming media data, video call streaming media data, and screen sharing streaming media data, including capturing a screen in real time, encoding an audio and a video into video frames, and transmitting the video frames to a peer device to implement screen sharing.

As a communication platform SDK, VoipService can be integrated with a plurality of devices and device apps to meet cross-platform requirements. An interaction protocol stack (communication platform SDK) based on a communication cloud signaling system is implemented, and signaling-plane interaction control for account management, device and capability discovery, NG-RTC audio and video (including P2P), and messages is implemented. In addition, the media component is provided by the cloud core NG-RTC (including capabilities such as audio and video encoding and decoding and transmission, which are used to implement audio and video media plane interaction based on the RTN network). The signaling channel management module and the media component can be deployed independently or together, and the media component can be replaced.

VoipService can be HwVoipService. The streaming media information processing module may be an HME (Huawei Media Engine, Huawei streaming media engine).

The application framework layer provides an application programming interface (API) and a programming framework for an application at the application layer. The application framework layer includes some predefined functions.

The application framework layer includes system services, for example, includes an activity manager service (AMS), a window manager service (WMS), a view system, a content provider, a phone manager, and a resource manager. In addition, the application framework layer may further include an MSDP (Multicast Source Discovery Protocol) awareness service and a multipath access service. This is not limited in this embodiment of this application.

The AMS, the WMS, and the VIEW provide capability support for doodle, operation mapping, and the like in this embodiment of this application. The AMS provides a basic UX interaction capability. The WMS is responsible for calculating a window area and providing operation domain information in the operation mapping signaling. The VIEW provides an operation object listening capability. Based on a response or callback of the last application, the VIEW captures a user operation behavior, records the operation object, and provides the operation object and operation code information in the operation mapping signaling.

Further, a screen splitting technology is based on a system service capability of the framework. The system service of the framework provides an interface for a user to specify a screen for screen sharing, for example, to specify a shared screen and a displayed screen of the shared screen, and specified information is transmitted to the AMS and the WMS. The WMS calculates a screen size of a mobile phone, calculates a position of the mobile phone for screen splitting, and other information. The system service allocates a window based on the specified information and a calculation result. For example, based on a user habit, a left screen is a first screen and a right screen is a second screen by default: or based on a user habit, an upper screen is a first screen and a lower screen is a second screen by default.

During screen sharing, an audio call image interface and a video call image interface can be displayed in small windows. The user can specify a screen to be shared, a screen to be shared by a peer end, and a screen to be displayed during a video call. If there is another device near the mobile phone, the mobile phone may transmit user-specified information to the another device by using near field communication signaling. A device type can be identified through signaling transmission. For example, a large-screen (TV) device is a video call device by default, which is responsible for displaying video call images. Devices such as mobile phones and PADs are responsible for screen sharing and operations by default.

Further, the system service of the framework feeds back the captured operation mapping signaling to the application layer, and the VoipService generates operation mapping signaling based on the operation mapping signaling fed back by the system service, and then transmits the signaling through the signaling channel.

The MSDP awareness service and the multipath access service are basic components of an existing audio call and video call, and the kernel layer is based on the existing audio call and video call. The kernel layer is the same as that in the conventional technology. Details are not described herein again.

The system library, the kernel layer, and the like below the application framework layer may be referred to as an underlying system. The underlying system includes an underlying display system, configured to provide a display service. For example, the underlying display system includes a display driver at the kernel layer and a surface manager in the system library.

An Android runtime includes a kernel library and a virtual machine. The Android runtime is responsible for scheduling and management of an Android system.

The kernel library includes two parts: a performance function that needs to be invoked in java language, and a kernel library of Android.

The application layer and the application framework layer run on the virtual machine. The virtual machine executes java files of the application layer and the application framework layer as binary files. The virtual machine is configured to implement functions such as object lifecycle management, stack management, thread management, security and exception management, and garbage collection.

The system library may include a plurality of functional modules, for example, a surface manager and a media library (Media Libraries). The surface manager is configured to manage a display subsystem and provide fusion of 2D and 3D layers for a plurality of applications. The media library supports playback and recording in a plurality of commonly used audio and video formats, and static image files. The media library may support a plurality of audio and video encoding formats, for example, MPEG4, H.264, MP3, AAC, AMR, JPG, and PNG.

The kernel layer is a layer between hardware and software. The kernel layer includes at least a display driver, a camera driver, an audio driver, and the like. This is not limited in embodiments of this application. That is, the kernel layer mainly includes hard coding, an MSDP virtualization device corresponding to the foregoing MSDP awareness service, and the like.

Based on the schematic software structure diagram shown in FIG. 3, the following briefly describes an internal working process of a mobile phone system.

For example, in this embodiment of this application, when a video call needs to be made, as shown in FIG. 5A, the user N1 starts the HiCall app in the mobile phone M1, and the user N1 enables a communications interface with the user N2. The communications interface is shown in FIG. 5B, and includes a name of the user N2, and video call, call, and SMS controls. The communications interface may further display other controls such as a call record. The communications interface may be selected based on a requirement.

Then, the user N1 triggers the "Video call" control shown in FIG. 5B. The HiCall app notifies, based on the trigger operation of the user, the service transmission component to establish the video call streaming media transfer channel. The service transmission component sends a request for establishing the video call streaming media transfer channel to the service transmission component in the mobile phone M2. After the mobile phone M2 confirms to perform a video call based on an input of the user, the mobile phone M1 establishes the video call streaming media transfer channel with the mobile phone M2 by using the service transmission component. The HiCall apps in the mobile phone M1 and the mobile phone M2 send a processing request for the video call streaming media data to their respective media components, and a streaming media information processing module in the media components encapsulates and parses the video call streaming media data (including video image data and audio data), so as to implement a video call. For example, the media component in the mobile phone M1 sends the encapsulated video call streaming media data to the video call streaming media transfer channel, and the video call streaming media transfer channel sends the encapsulated video call streaming media data to the peer mobile phone of the video call, that is, the mobile phone M2. The media component in the mobile phone M2 parses the video call streaming media data sent by the mobile phone M1 through the video call streaming media transfer channel, and sends the parsed video call streaming media data to the InCallUI app. The InCallUI app implements display of a video call interface of the mobile phone M1 based on the video call streaming media data. A process in which the mobile phone M1 implements display of the video call interface of the mobile phone M2 is similar. Details are not described herein again.

In addition, the video call streaming media data of the mobile phone that is encapsulated by the media component may be audio and video data collected by a camera and a microphone of the mobile phone. In addition, the InCallUI app displays a video call interface of the user of the mobile phone based on the audio and video data collected by the camera and the microphone of the mobile phone.

In this embodiment of this application, screen sharing is performed between the mobile phone M1 and the mobile phone M2 based on a video call. After the mobile phone M1 initiates a screen sharing request and the mobile phone M2 accepts the request, the HiCall apps in the mobile phone M1 and the mobile phone M2 separately send, to the service transmission components in the mobile phone M1 and the mobile phone M2, a request for establishing a screen sharing streaming media transfer channel, so that the service transmission component establishes the screen sharing streaming media transfer channel. The HiCall app sends a screen streaming media data processing request to the media component, and the media component encapsulates and parses the screen streaming media data. The media component sends the encapsulated screen streaming media data to the screen sharing streaming media transfer channel, and the screen sharing streaming media transfer channel sends the encapsulated screen streaming media data to the peer mobile phone of the video call. The media component receives the screen streaming media data of the peer mobile phone that is sent by the screen sharing streaming media transfer channel, parses the screen streaming media data, and sends the parsed screen streaming media data to the InCallUI app. The InCallUI app displays a screen shared interface of the peer mobile phone based on the screen streaming media data.

Further, on the basis of establishing the screen sharing, processing such as remote assistance, doodle, and operation mapping may be further performed. The service transmission component may be further configured to establish a remote assistance operation signaling channel, a doodle signaling channel, an operation mapping signaling channel, and the like based on the request sent by the HiCall app.

Further, the system service is further configured to capture a user operation, perform screen splitting processing and multi-screen selection processing, and receive a trigger operation such as operation mapping of the user. The AMS, WMS, and VIEW system services capture user operations, calculate an operation area, and convert the operation and operation area into corresponding codes.

An embodiment of this application provides an enhanced video call method used in the foregoing communications system. The following specifically describes a scenario in which the enhanced video call method is applied.

Figures 2, 4A:
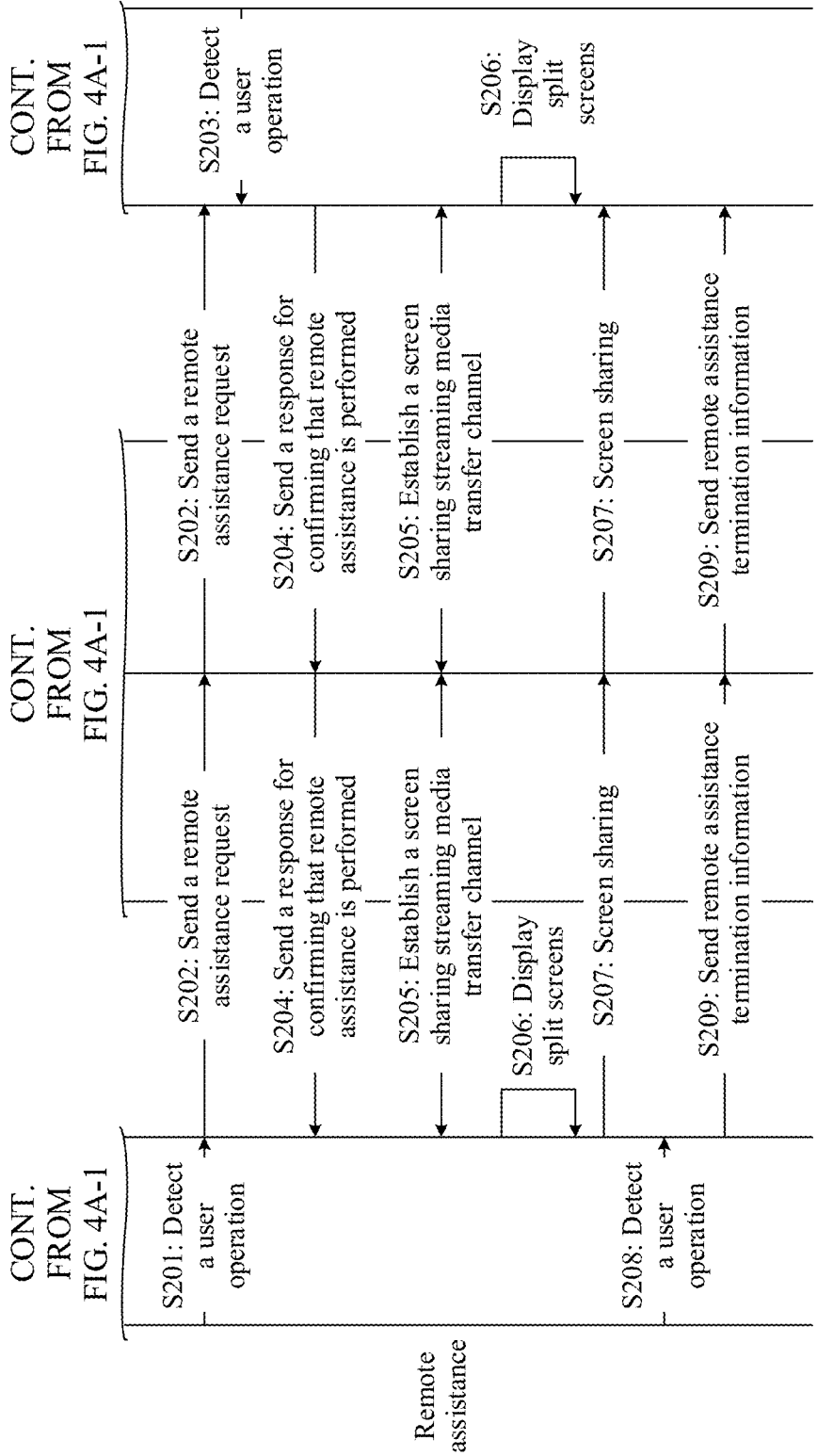

A scenario in which a video call is established between the mobile phone M1 and the mobile phone M2;

As shown in FIG. 4A-1 and FIG. 4A-2, that the video call between the mobile phone M1 and the mobile phone M2 is established includes the following steps.

S101: The mobile phone M1 detects a trigger operation of initiating a video call by the user N1.

In some embodiments, both the mobile phone M1 and the mobile phone M2 have only one physical screen, their respective home desktops (as shown in FIG. 5A) are displayed on the screens, and a HiCall app is displayed on the home desktop. Then, the user N1 taps the HiCall app on the mobile phone M1, the mobile phone M1 starts the HiCall app, and then the user selects "User N2" from a plurality of contacts to enter a communication interface with "User N2". A communications interface on the mobile phone M1 is shown in FIG. 5B. Function controls used for more communication between the user N1 and the user N2 are displayed on the interface, and the function controls include "Video call", "Phone", and "SMS message" controls. Further, the name "User N2" of the user N2 is further displayed on the interface.

The user taps the video call control to initiate a video call.

S102: The mobile phone M1 establishes a first connection channel with the server H.

The mobile phone M1 detects a trigger operation of initiating a video call by the user, and sends, to the server H based on the trigger operation, a request for establishing a connection channel, where the request includes identity information of the mobile phone M1. For example, the identity information includes device information such as a user ID (a mobile phone number), a device ID (an IMEI number or the like), and a device type.

After receiving the request, the server H performs verification on the mobile phone M1 based on the request. That the server H performs verification on the mobile phone M1 includes that the server H verifies, based on device information recorded on a server H side, device information provided by the mobile phone M1, such as the user ID, the device ID, and the device type.

If the verification succeeds, the server H sends a response to the mobile phone M1. After receiving the response, the mobile phone M1 completes establishment of the first connection channel with the server H. The response includes a unique communication channel identifier token ID generated by the server H based on the user ID, the device ID, and the communication network information of the mobile phone M1, and a device communication ID (that is, a session (time domain) ID) generated by calculation based on the user ID, the device ID, and the communication token ID, so as to return an authentication status and the device communication ID to the terminal side device.

S103: The mobile phone M1 sends a first video call request to the server H.

The mobile phone M1 sends the first video call request to the server H through the first connection channel. The first video call request includes identification information of the mobile phone M2, for example, a user ID (mobile phone number) of the mobile phone M2, and further includes a service identifier requested by the mobile phone M1, for example, a video call service identifier. The service identifier is transmitted to the peer mobile phone M2 as data information.

S104: After receiving the first video call request, the server H authenticates, for the mobile phone M1 based on the first video call request, whether the mobile phone M1 has permission to establish a video call through the server H. If the authentication succeeds, step S105 is performed.

That after receiving the first video call request, the server H authenticates the mobile phone M1 based on the first video call request to determine whether the mobile phone M1 is allowed to establish a video call includes: The server H authenticates the mobile phone M1 based on a device communication ID of the mobile phone M2 in the first video call request to determine whether the communication ID is consistent with a record on the server H side, and parses the device communication ID to obtain a token ID (the token ID is a unique communication channel identifier generated by the server side and used to identify a corresponding communication channel), so as to find the communication channel corresponding to the server side. Meanwhile, the server H compares the identification information of the mobile phone M2 (that is, the user ID (the mobile phone number) of the mobile phone M2) in the video communication request sent by the device M1 with a logged-in device information record at the server H end, and determines whether the mobile phone M2 is a communicable device. If the mobile phone M2 is the communicable device, the authentication succeeds. If the mobile phone M2 is not the communicable device, the authentication fails.

S105: The server H feeds back authentication success information to the mobile phone M1.

The authentication success information may be the token ID of the mobile phone M2 that is generated by the server H.

S106: The mobile phone M1 sends a second video call request to the server H.

The mobile phone M1 sends a second video call request to the server H through the first connection channel. The second video call request includes session (time domain) information, and the session information includes the token information used to identify the communication channel. The server H authenticates the second video call request by using the token. If the token is the token generated and sent by the server H, the authentication succeeds. After the authentication succeeds, S107 is performed.

S107: The server H pushes the second video call request to the mobile phone M2 by using a push server. The pushed information includes the user ID (the mobile phone number) of the mobile phone M1 of the calling party and the like.

S108: The mobile phone M2 detects a trigger operation that the user N2 confirms to perform a video call.

For example, after the server H pushes the second video call request to the mobile phone M2, the mobile phone M2 displays, on the screen of the mobile phone M2 based on the second video call request, controls used by the user to choose whether to perform a video call with the user N1, for example, an "Accept" control and a "Hang up" control, and the user N2 selects the "Accept" control.

S109: The mobile phone M2 sends, based on the trigger operation of the user N2 for confirming the video call, response information for receiving the video call request to the server H.

S110: After receiving the response information, the server H confirms that a second connection channel needs to be established with the mobile phone M2, and the second connection channel is established between the server H and the mobile phone M2 and between the server H and the mobile phone M2.

S111: The server H authenticates the mobile phone M2. After the authentication succeeds, S112 is performed.

That the server H authenticates the mobile phone M2 includes: The server H authenticates the mobile phone M2 by using the device communication ID of the mobile phone M1 to determine whether the communication ID is consistent with the record on the server H side, and parses the device communication ID to obtain a token ID (the token ID is a unique communication channel identifier generated by the server side, and is used to identify a corresponding communication channel), so as to find the communication channel corresponding to the server H. Meanwhile, the server H compares the identification information of the mobile phone M1 (that is, the user ID (the mobile phone number) of the device M1) that is sent by the mobile phone M2 with the logged-in device information record at the server H end, and determines whether the mobile phone M1 is a communicable device. If the mobile phone M1 is the communicable device, the authentication succeeds. If the mobile phone M1 is not the communicable device, the authentication fails.

S112: The server H sends, to the mobile phone M1, information about accepting the video call request.

The server H sends, to the mobile phone M1 through the second connection channel, the information about accepting the video call request.

S113: Establish a video call streaming media transfer channel between the mobile phone M1 and the mobile phone M2 by using the server H.

After the mobile phone M1 receives the information that is sent by the server H and indicates acceptance of the video call request, the video call streaming media transfer channel is established between the mobile phone M1 and the server H, and the video call streaming media transfer channel is established between the mobile phone M2 and the server H.

S114: After the video call streaming media transfer channel is established, the mobile phone M1 and the mobile phone M2 perform a video call through the server H.

An interface after the video call is established between the mobile phone M1 and the mobile phone M2 may be shown in FIG. 5C. The mobile phone M1 displays a video call image (for example, a video call image shown by a male avatar) of the user N2, and displays a video call image (for example, a video call image shown by a female avatar) of the user N1. In addition, the mobile phone M1 displays "Remote assistance", "Bidirectional screen sharing", and "Hang up" controls. Similarly, the mobile phone M2 displays the video call image of the user N1 and displays the video call image of the user N2, and the mobile phone M2 simultaneously displays "Remote assistance", "Bidirectional screen sharing", and "Hang up" controls.

A scenario in which remote assistance is performed between the mobile phone M1 and the mobile phone M2;

Further, when the video call is performed between the mobile phone M1 and the mobile phone M2, the user may select to perform remote assistance by using the "Remote assistance" control on the interface shown in FIG. 5C.

Refer to FIG. 4A-1 and FIG. 4A-2. In an implementation, a process of performing remote assistance includes the following steps.

S201: The mobile phone M1 detects a trigger operation of tapping the "Remote assistance" control by the user N1.

S202: The mobile phone M1 sends a remote assistance request to the mobile phone M2 by using the server H.

The remote assistance request is sent from the mobile phone M1 to the mobile phone M2 by using the first connection channel and the second connection channel.

S203: The mobile phone M2 detects that the user N2 confirms to perform a trigger operation of remote assistance.

S204: The mobile phone M2 performs the trigger operation of remote assistance based on the confirmation of the user N2, and generates and sends, to the mobile phone M1, response information for confirming to perform the remote assistance.

The response information is sent from the mobile phone M2 to the mobile phone M1 by using the first connection channel and the second connection channel.

S205: After receiving the response information, the mobile phone M1 establishes a screen sharing streaming media transfer channel with the mobile phone M2.

S206: The mobile phone M1 displays a split-screen bar (shown by a dashed line in FIG. 5D-1), and displays a screen A1 and a screen A2 that are located on two sides of the split-screen bar, where the screen A1 displays a video call interface, the screen A2 displays a main desktop interface of the mobile phone M1 by default, and the mobile phone M1 displays a side tool bar on a right side of the screen A2. The mobile phone M2 displays the split-screen bar (shown by a dashed line in FIG. 5D-2), and displays a screen B1 and a screen B2 that are located on two sides of the split-screen bar. The screen B1 displays a video call interface, and the screen B2 displays a main desktop interface of the mobile phone M2 by default. In addition, the mobile phone M2 displays a side tool bar on a right side of the screen B2.

Further, the user may further manually drag the split-screen bar to move leftwards or rightwards, so as to adjust sizes of the screens located on the two sides of the split-screen bar.

It should be noted that, the main desktop interface of the mobile phone M1 is an interface initially displayed after the mobile phone M1 shown in the interface A2 in FIG. 5D-1 is powered on and after the user wakes up the mobile phone M1. The main desktop of the mobile phone M2 is an interface initially displayed after the mobile phone M2 is powered on and after the user wakes up the mobile phone M2.

In addition, the screen A2 and the screen B2 may also display, by default, an initial display interface or another interface after the user of the HiCall app logs in. This may be selected based on a requirement.

Further, side tool bars that can be hidden and that are shown in FIG. 5D-1 and FIG. 5D-2 are displayed on edge sides of the mobile phone M1 and the mobile phone M2. The side tool bar may be hidden to a side of the screen in a folded state based on a trigger operation such as sliding rightward of the user, or may be displayed on the screen in an unfolded state based on a trigger operation such as sliding leftward of the user. In addition, the side tool bar on the mobile phone M1 is located on the right side of the screen A2, and the side tool bar on the mobile phone M2 is located on the right side of the screen B2.

When the side tool bar is in the unfolded state, five controls "Video call", "Remote assistance", "Bidirectional screen sharing", "Doodle", and "Operation mapping" that can be triggered are sequentially displayed in a column, so that the user selects a corresponding communication type. Certainly, the side tool bar may display only some of the foregoing controls, or display more other controls. In addition, the controls in the side tool bar may be sequentially displayed in columns, or may be sequentially displayed in rows, or may be displayed in another manner. This is not limited in this application.

It should be noted that, in this embodiment of this application, for ease of displaying content on the screen, an example in which the side tool bar on the screen is in the folded state is used for description, and an example of the unfolded state of the side tool bar is marked on the outside of the screen. It should be understood that, in an actual operation process of selecting a communication type by using the side tool bar, the side tool bar is displayed on the screen of the mobile phone in the unfolded state when the user slides left.

It should be noted that a form of the side tool bar may be set based on a requirement.

S207: The mobile phone M1 shares the screen streaming media data of the screen A2 to the screen B2 of the mobile phone M2 for displaying by using the screen sharing streaming media transfer channel.

The mobile phone M1 performs screen recording on the screen A2, and transmits screen streaming media data of the screen A2 obtained after the screen recording to the mobile phone M2 by using the screen sharing streaming media transfer channel. The mobile phone M2 displays, on the screen B2, a display picture corresponding to the screen A1 based on the screen streaming media data, so as to share the screen A1 to the screen B2, and enable the user N2 to implement remote assistance for the mobile phone M1 by using the screen B2.

After the mobile phone M1 shares the screen A2 to the screen B2 of the mobile phone M2 for displaying by using the screen sharing streaming media transfer channel, for example, display interfaces of the mobile phone M1 and the mobile phone M2 may be shown in FIG. 5D-1 and FIG. 5D-2, where the screen A1 displays the video call images of the user N1 and the user N2, the screen B1 displays the video call images of the user N1 and the user N2, the screen A2 may display the main desktop interface of the mobile phone M1 after the screen A2 be split on the mobile phone M1, and the screen B2 correspondingly displays the main desktop interface of the screen A2 of the mobile phone M1.

In addition, it should be noted that the screen A1 may further display, based on the trigger operation of the user N1, an interface corresponding to the trigger operation of the user N1, for example, zoom out a video call image, and display a display interface such as a home screen. Display of the screen A1 and display of the screen A2 are independent. In some embodiments, an operation performed by the user on the screen A1 does not affect display of the screen A2. In some embodiments, an operation performed by the user N1 on the screen A1 may also affect display of the screen A2. In addition, similarly, the screen B1 may display, based on the trigger operation of the user N2, an interface corresponding to the trigger operation of the user N2, for example, opening an application.

Further, after the mobile phone M1 shares the screen A2 to the screen B2 of the mobile phone M2 for displaying by using the screen sharing streaming media transfer channel, the user N2 may implement remote assistance for the mobile phone M1 by operating the screen B2. It should be noted that, in response to the remote assistance performed by the user N2 on the mobile phone M1 by using the mobile phone M2, the mobile phone M1 further displays, on the screen A2 of the mobile phone M1, an interface corresponding to the remote assistance operation.

A remote assistance signaling channel is further established between the mobile phone M1 and the mobile phone M2. The mobile phone M2 sends remote assistance signaling including operation information for performing remote assistance on the mobile phone M1 and an operated control to the mobile phone M1 through the remote assistance signaling channel, so that the mobile phone M1 performs a corresponding operation based on the remote assistance signaling, thereby implementing remote assistance of the mobile phone M2 for the mobile phone M1, for example, performing a remote assistance operation such as application uninstallation shown in FIG. 5E.

In addition, that the remote auxiliary signaling channel is established between the mobile phone M1 and the mobile phone M2 may be that the remote auxiliary signaling channel is established after the mobile phone M1 receives the foregoing response information.

It should be noted that, the remote assistance performed between the mobile phone M1 and the mobile phone M2 is performed on the basis of establishing unidirectional screen sharing between the mobile phone M1 and the mobile phone M2. In addition, when the mobile phone M2 does not perform remote assistance on the mobile phone M1, the mobile phone M1 and the mobile phone M2 perform an operation of sharing the screen A2 to the mobile phone M2 for displaying. When the mobile phone M2 performs remote assistance on the mobile phone M1, the mobile phone M1 and the mobile phone M2 stop the operation of sharing the screen A2 to the mobile phone M2 for displaying, and perform an operation of performing remote assistance on the mobile phone M1 by the mobile phone M2.

When the user N2 does not perform an operation on the screen B2, the user N1 may further perform an operation on the screen A2. The screen A2 displays an interface in response to the operation of the user N1. The mobile phone M1 performs screen recording on the screen A2, and shares data obtained after the screen recording to the screen B2 of the mobile phone M2 for displaying by using the foregoing screen sharing streaming media transfer channel.

S208: The mobile phone M1 detects a trigger operation of terminating remote assistance by the user N1.

S209: The mobile phone M1 sends remote assistance termination signaling to the mobile phone M2 based on the trigger operation of terminating the remote assistance by the user N1. After receiving the information, the mobile phone M2 terminates the remote assistance operation.

It should be noted that, the user N1 may perform a trigger operation of terminating remote assistance by tapping the "Remote assistance" operation control again to terminate the remote assistance operation, or by tapping the "Video call" operation control to switch to a video call only to terminate the remote assistance operation, or tapping a "Stop" control (not shown in the figure) displayed in the side tool bar to terminate the remote assistance operation. This may be selected and set as required. Certainly, the user N2 may also trigger the remote assistance control for terminating remote assistance on the mobile phone M2 to end the "Remote assistance" operation.

After the remote assistance between the mobile phone M1 and the mobile phone M2 is terminated, the screens of the mobile phone M1 and the mobile phone M2 may enter a corresponding interface based on a user operation, for example, may display interfaces shown in FIG. 5C, or display unidirectional screen shared interfaces shown in FIG. 5D-1 and FIG. 5D-2. This may be set based on a requirement.

According to the enhanced video call method provided in this embodiment of this application, a video call and screen sharing may be simultaneously performed between the mobile phone M1 and the mobile phone M2 by using one application. The video call streaming media transfer channel is established between the mobile phone M1 and the mobile phone M2 to perform the video call, and the screen sharing streaming media transfer channel that is independent of the video call streaming media transfer channel is established for screen sharing. In addition, the mobile phone M1 and the mobile phone M2 split a screen into two screens by using a screen splitting technology, so that the mobile phone M1 and the mobile phone M2 can display the screen used for remote assistance while displaying the video call interface, and the mobile phone M2 can perform remote assistance on the mobile phone M1.

However, in the conventional technology, currently, a video call is performed between the mobile phone M1 and the mobile phone M2 through an application, and screen sharing needs to be performed between the mobile phone M1 and the mobile phone M2 through another application. In other words, the mobile phone M1 and the mobile phone M2 cannot simultaneously perform a video call and screen sharing through one application. In addition, current screen sharing supports only unidirectional screen sharing. In other words, the mobile phone M1, as a screen sharing party, unidirectionally shares the screen of the mobile phone M1 to the mobile phone M2 for displaying. During screen sharing, the mobile phone M1 shares the entire screen of the mobile phone M1 as a whole to the mobile phone M2 for displaying, so that when the user N2 performs an operation on the shared screen of the mobile phone M1 that is displayed on the screen of the mobile phone M2, the screen of the mobile phone M1 can only be operated by the user by using the mobile phone M2 or selected by the user N1 to terminate the remote assistance, and the user N1 cannot perform another operation on the screen of the mobile phone M1 at the same time.

It should be noted that, in this embodiment of this application, remote communication may be established between the mobile phone M1 and the mobile phone M2 to perform the foregoing remote assistance, or short-distance communication may be established between the mobile phone M1 and the mobile phone M2 to perform short-distance assistance. This may be selected based on a requirement. The short-distance communication may refer to short-distance communication such as Wi-Fi and Bluetooth.

A scenario in which doodle is performed between the mobile phone M1 and the mobile phone M2.

Figure 5E:
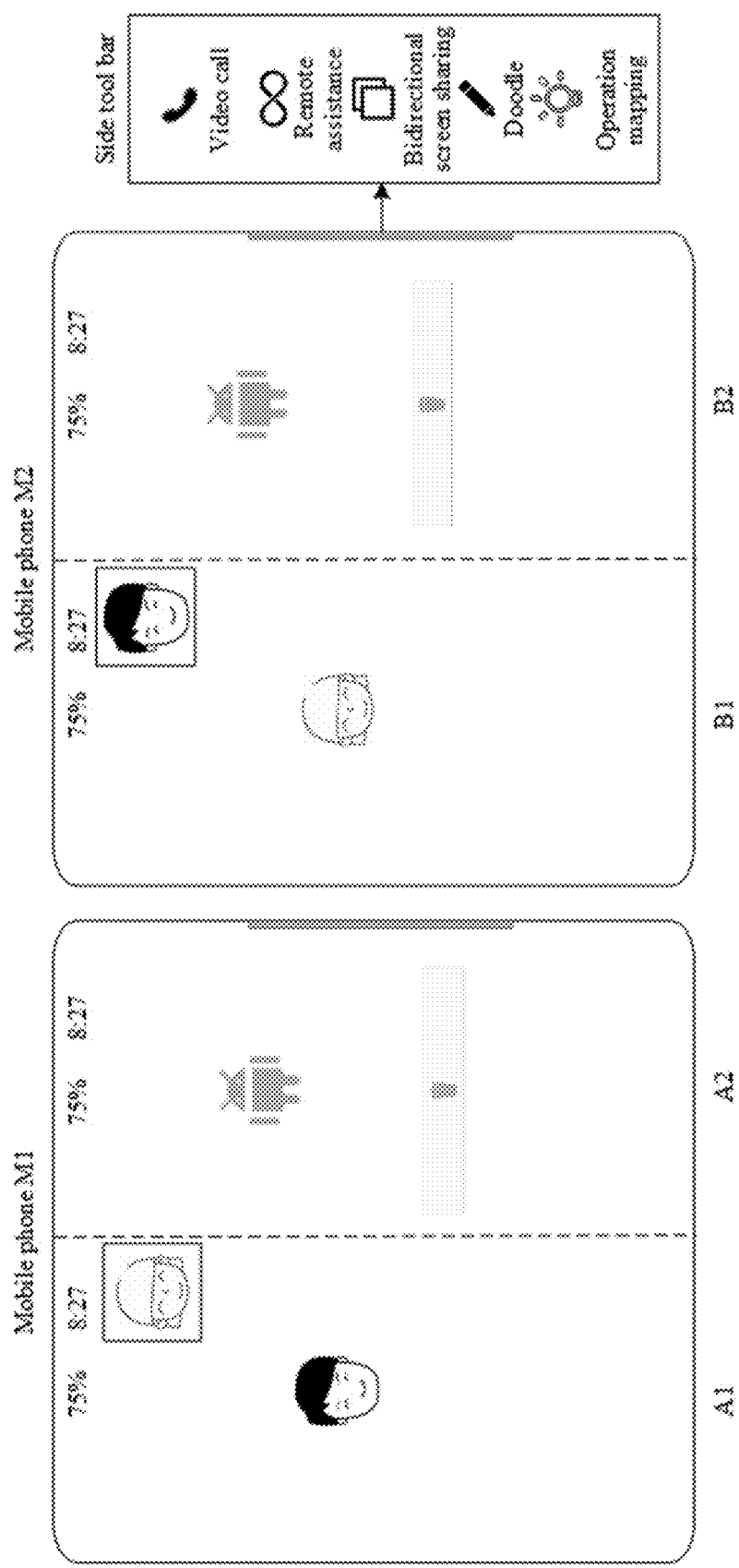

Further, when remote assistance is performed between the mobile phone M1 and the mobile phone M2, for example, on an interface shown in FIG. 5E, the user may further trigger a "Doodle" control on the screen of the mobile phone M1, so that the mobile phone M1 and the mobile phone M2 switch to doodle.

Figures 2, 4B:
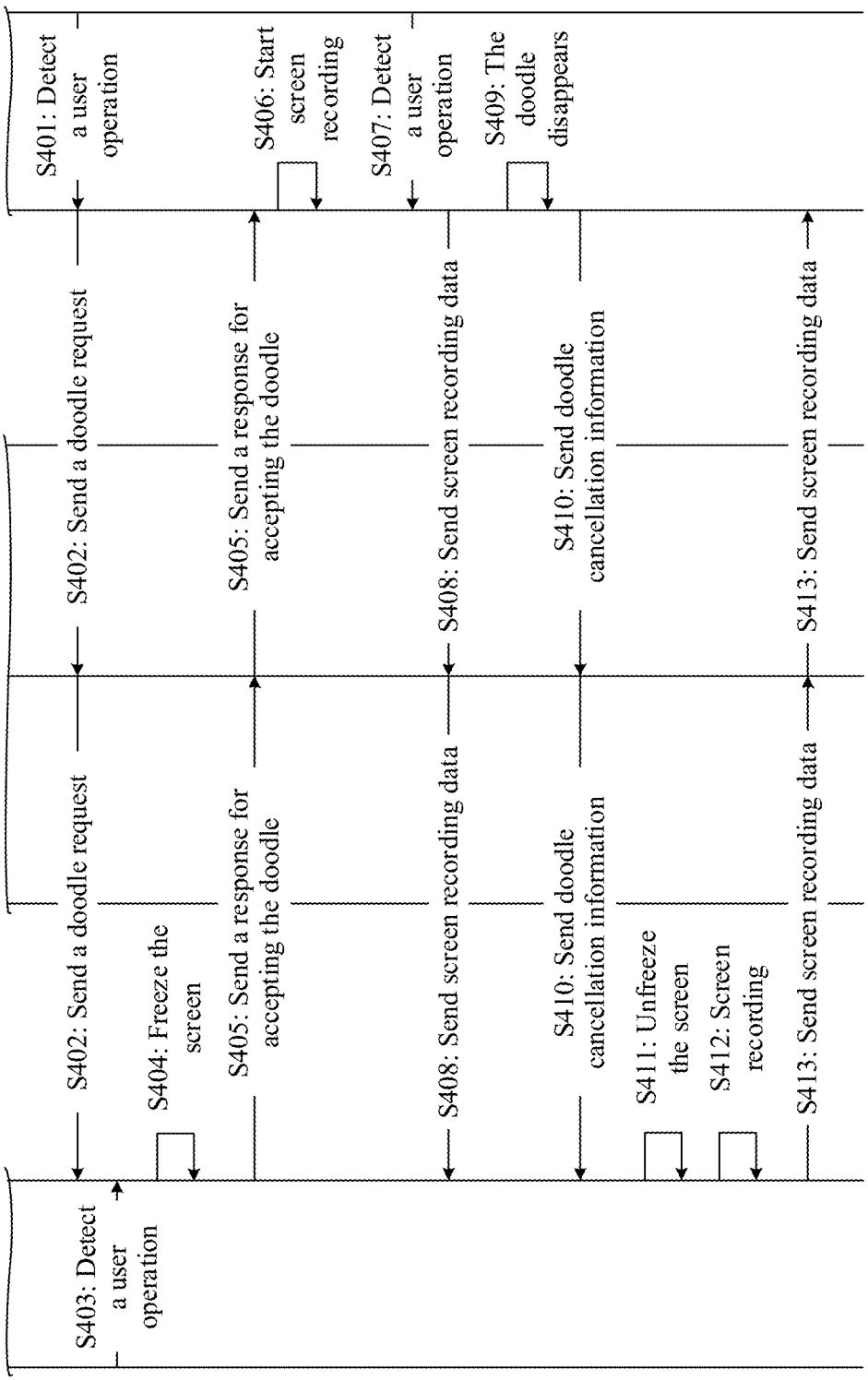

Refer to FIG. 4B-1 and FIG. 4B-2. In an implementation of this embodiment of this application, the mobile phone M1 serves as a remote assistance requesting party, and the mobile phone M2 serves as a remote assistance assisting party. If a doodle initiator is the mobile phone M1, the mobile phone M1 allows the user N1 to doodle on the screen A2 by default, and a doodle process includes the following steps.

S301: The mobile phone M1 detects a trigger operation that the user N1 triggers a "Doodle" control displayed on the screen of the mobile phone M1.

For example, the user N1 triggers, on the interface shown in FIG. 5E, the "Doodle" control on the screen of the mobile phone M1.

S302: The mobile phone M1 detects a doodle operation of the user N1 on the screen A2, and displays a doodle on the screen A2, where the doodle is, for example, a circle displayed on the screen A2 shown in FIG. 5F.

S303: The mobile phone M1 sends screen recording data of the doodle operation of the user N1 to the mobile phone M2.

The mobile phone M1 sends the screen recording data to the mobile phone M2 by using the foregoing screen sharing streaming media transfer channel, and the screen recording data includes doodle data.

S304: The mobile phone M2 receives the screen recording data, and implements screen sharing on the screen B2 based on the screen recording data, so as to display a doodle, where the doodle is, for example, a circle displayed on the screen B2 shown in FIG. 5F.

It should be noted that, in this embodiment of this application, the doodle may be a trace such as a painting or a marking that is generated by a "Paint" tool corresponding to the "Doodle" control based on a trigger operation of the user, so as to achieve an objective of the user, such as painting or marking.

Figure 5F:
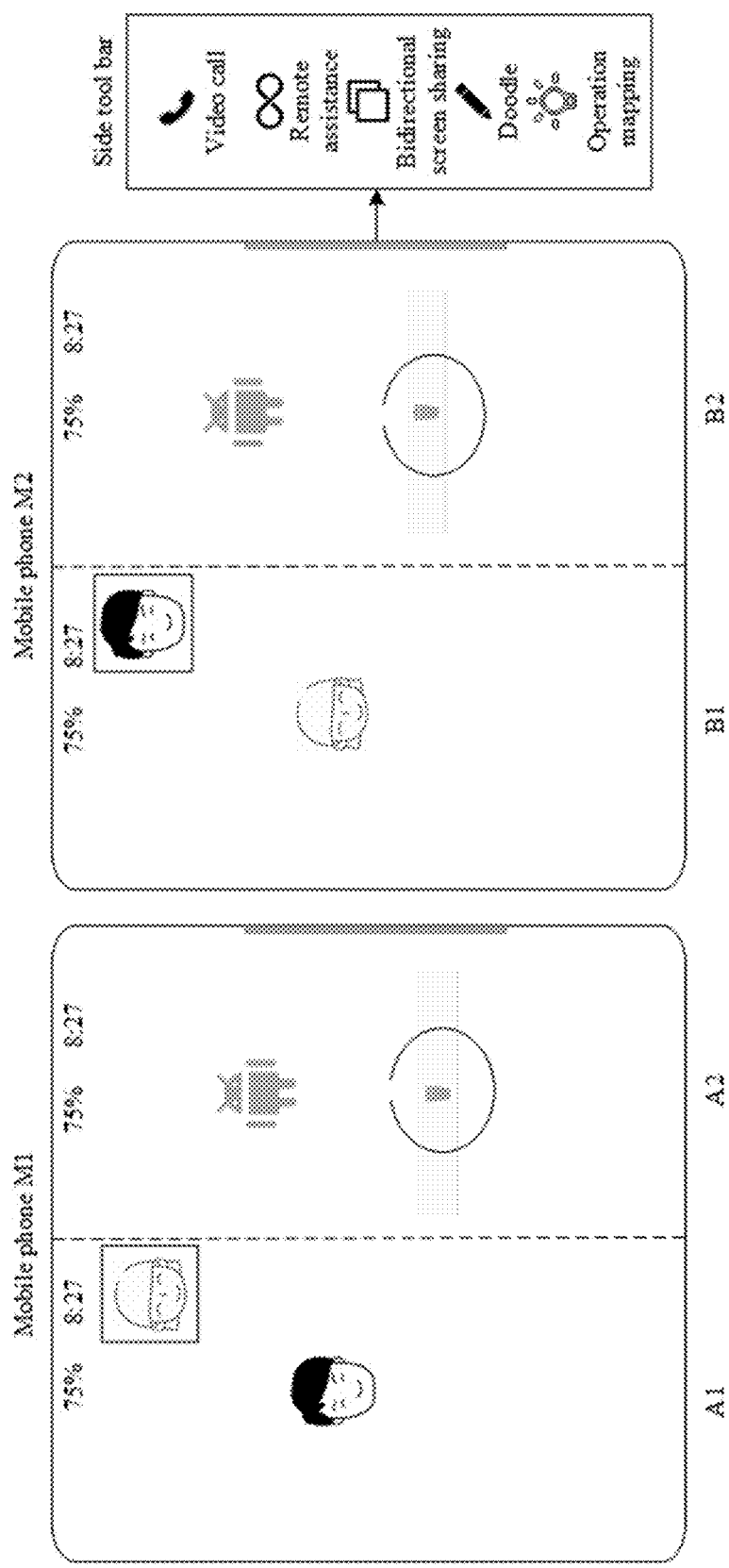

For example, in a scenario shown in FIG. 5E, the user N1 may select the "Doodle" control, and then the user N1 doodles around a position of an offloading icon on the screen A2 of the mobile phone M1 shown in FIG. 5F. The doodle may be, for example, a circle. Then the mobile phone M1 shares the screen A2 to the screen B2 of the mobile phone M2 for displaying, and forms the doodle around the position of the offloading icon on the screen B2 of the mobile phone M2. After doodle screen sharing is completed, display interfaces of the mobile phone M1 and the mobile phone M2 are shown in FIG. 5F.

S305: After a preset time, the doodle automatically disappears.

The preset time may be 3s. That is, after the user N1 completes the doodle, the doodle is displayed on the screen A2 for 3s, and then the doodle automatically disappears. The preset time may be set based on a requirement. This is not limited in this embodiment of this application.

S306: The mobile phone M1 performs screen recording on the screen A2 to obtain screen recording data.

S307: The mobile phone M1 sends the screen recording data to the mobile phone M2.

S308: The mobile phone M2 receives the screen recording data, implements screen sharing based on the screen recording data, and performs display on the screen B2 of the mobile phone M2, so that the doodle pattern on the screen B2 disappears.

In a scenario shown in FIG. 5F, the doodle disappears on the screen A2 of the mobile phone M1, and then the mobile phone M1 shares the screen A2 to the screen B2 of the mobile phone M2 for displaying, so that the doodle disappears on the screen B2 of the mobile phone M2. After the doodle disappears, display interfaces of the mobile phone M1 and the mobile phone M2 are shown in FIG. 5E.

Figure 5G:
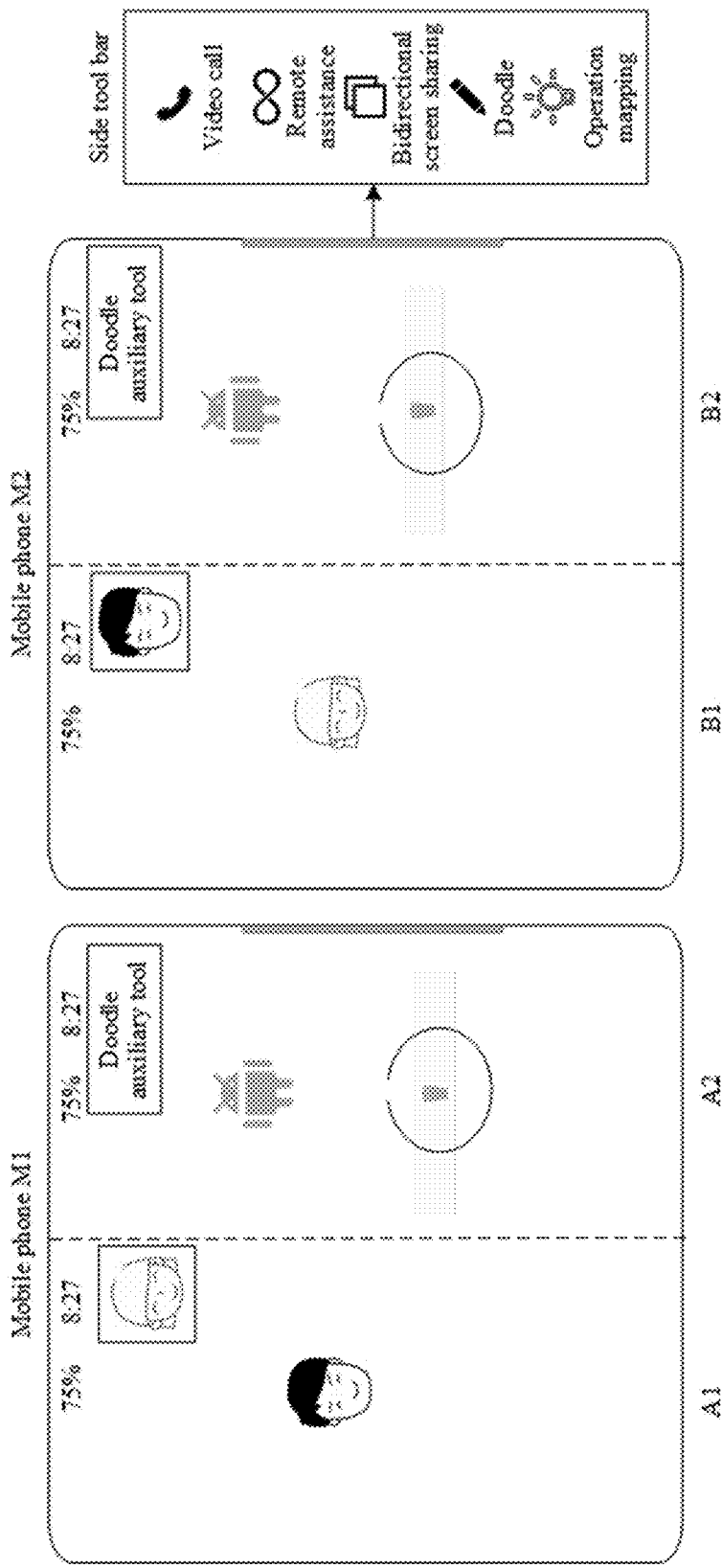

It should be noted that, in some implementations, after the user taps the "Doodle" control, as shown in FIG. 5G, a pop-up window is further displayed on the interface to display a "Doodle auxiliary tool" control. When the user triggers the "Doodle auxiliary tool" control, controls such as an eraser and a modify pen may be further displayed. The user uses the controls such as the eraser and the modify pen to further erase and modify the doodle. In addition, the "Doodle auxiliary tool" may further include a control used to end a doodle operation, where the control is triggered by the user to end the doodle, and may be set based on a requirement. This is not limited in this application.

Another scenario in which doodle is performed between the mobile phone M1 and the mobile phone M2.

Further, referring to FIG. 4B-1 and FIG. 4B-2, in an implementation of this embodiment of this application, the mobile phone M1 is a remote assistance requesting party, and the mobile phone M2 is a remote assistance assisting party. If an initiator of the doodle operation is the mobile phone M2, the mobile phone M2 and the mobile phone M1 need to negotiate whether to allow the user N2 to doodle on the screen B2. When determining to allow the user N2 to doodle on the screen B2, the mobile phone M2 receives the doodle of the user N2 on the screen B2. The doodle process includes the following steps.

S401: The mobile phone M2 detects a trigger operation that the user N2 triggers the "Doodle" control in the side tool bar on the screen of the mobile phone M2.

S402: The mobile phone M2 sends a doodle request to the mobile phone M1 based on the trigger operation of the user N2 on the "Doodle" control.

S403: The mobile phone M1 detects that the user N1 performs a trigger operation of confirming reception of the doodle request.

S404: The mobile phone M1 freezes the screen A2, so that the screen A2 cannot be operated by the user N1.

S405: The mobile phone M1 sends response information for accepting the doodle to the mobile phone M2.

S406: After receiving the response information, the mobile phone M2 starts detection of a doodle trigger operation performed by the user N2.

S407: The mobile phone M2 detects that the user N2 performs the doodle trigger operation, and the mobile phone M2 displays, on the screen of the screen B2 based on the doodle of the user N2, the doodle on the interface B2 shown in FIG. 5F.

S408: The mobile phone M2 sends the screen recording data to the mobile phone M1.

The mobile phone M2 sends, to the mobile phone M1, screen recording data that includes doodle data and that is obtained after screen recording is performed on the screen B2. The mobile phone M1 receives the screen recording data, and performs display based on the screen recording data.

For example, in a scenario shown in FIG. 5E, the user N2 may select the "Doodle" control. Then, the user N2 doodles around the position of the uninstallation icon on the screen B2 of the mobile phone M2 shown in FIG. 5F, and forms the doodle around the position of the uninstallation icon on the screen A2 of the mobile phone M1. After doodle screen sharing is completed, display interfaces of the mobile phone M1 and the mobile phone M2 are shown in FIG. 5F.

S409: After a preset time, the doodle disappears.

The preset time may be 3s, and may be set based on a requirement. This is not limited in this embodiment of this application.

S410: The mobile phone M2 sends doodle cancellation information to the mobile phone M1.

The mobile phone M2 sends the doodle cancellation information to the mobile phone M1 through a doodle signaling channel between the mobile phone M2 and the mobile phone M1, where the doodle signaling channel may be established between the mobile phone M1 and the mobile phone M2 after the mobile phone M1 sends the response information for accepting the doodle to the mobile phone M2.

S411: After receiving the doodle cancellation information, the mobile phone M1 cancels screen freezing processing on the screen A2, so that the screen A2 can be operated by the user N1.

S412: The mobile phone M1 starts screen recording.

S413: The mobile phone M1 performs a screen sharing operation.

In a scenario shown in FIG. 5F, after the doodle on the screen B2 of the mobile phone M2 disappears, the doodle displayed on the screen A2 of the mobile phone M1 also disappears. After the doodle disappears, display interfaces of the mobile phone M1 and the mobile phone M2 are shown in FIG. 5E.

That is, according to the enhanced video call method provided in this embodiment of this application, doodle can be further implemented while remote assistance is performed. In addition, if the user N1 performs doodle on the screen A2, the mobile phone M1 may directly share the shared screen including the doodle to the screen B2 of the mobile phone M2 for displaying. If the user N2 performs doodle on the screen B2, the mobile phone M1 and the mobile phone M2 further need to negotiate, and the mobile phone M1 needs to freeze the screen A2. After the mobile phone M2 receives the doodle, screen recording is performed on the screen B2, and the doodle is mapped to the screen A2 of the mobile phone M1 for displaying.

A scenario of bidirectional screen sharing between the mobile phone M1 and the mobile phone M2 is as follows.

Further, during a video call between the mobile phone M1 and the mobile phone M2, the user may further select the "Bidirectional screen sharing" control on the interface shown in FIG. 5C, so that bidirectional screen sharing is performed between the mobile phone M1 and the mobile phone M2.

Refer to FIG. 4C-1 and FIG. 4C-2. A process of performing bidirectional screen sharing between the mobile phone M1 and the mobile phone M2 may include the following steps.

S501: The mobile phone M1 detects that the user N1 performs a trigger operation of initiating bidirectional screen sharing.

S502: The mobile phone M1 sends a bidirectional screen sharing request to the mobile phone M2 by using the server H based on the trigger operation of bidirectional screen sharing of the user N1.

S503: The mobile phone M2 detects that the user N2 performs a trigger operation of confirming bidirectional screen sharing.

S504: The mobile phone M2 performs, based on the confirmation of the user N2, the trigger operation for bidirectional screen sharing, generates and sends, to the mobile phone M1, response information for confirming to perform bidirectional screen sharing.

S505: After receiving the response information, the mobile phone M1 establishes a first screen sharing streaming media transfer channel and a second screen sharing streaming media transfer channel with the mobile phone M2.

S506: The mobile phone M1 displays a split-screen bar (shown by a dashed line in FIG. 5H-1), and displays a screen A1 and a screen A2 that are located on two sides of the split-screen bar, where the screen A1 displays a video call interface (an image of the other party during a video call) and an operable interface of the mobile phone M1 (for example, a main desktop of the mobile phone M1), and the screen A2 displays a shared interface shared by the mobile phone M2 (for example, a main desktop of the mobile phone M2). In addition, the mobile phone M1 displays a side tool bar on a right side of the screen A2. The mobile phone M2 displays the split-screen bar (shown by the dashed line in FIG. 5H-2), and displays a screen B1 and a screen B2 that are located on two sides of the split-screen bar, where the screen B1 displays a video call interface (an image of the other party during the video call) and an operable interface of the mobile phone M2 (for example, a main desktop of the mobile phone M2), and the screen B2 displays a shared interface shared by the mobile phone M1 (for example, the main desktop of the mobile phone M1). In addition, the mobile phone M2 displays a side tool bar on a right side of the screen B2.

S507: The mobile phone M1 shares the screen A1 to the screen B2 of the mobile phone M2 for displaying, and the mobile phone M2 shares the screen B1 to the screen A2 of the mobile phone M1 for displaying.

Figures 1, 5H:
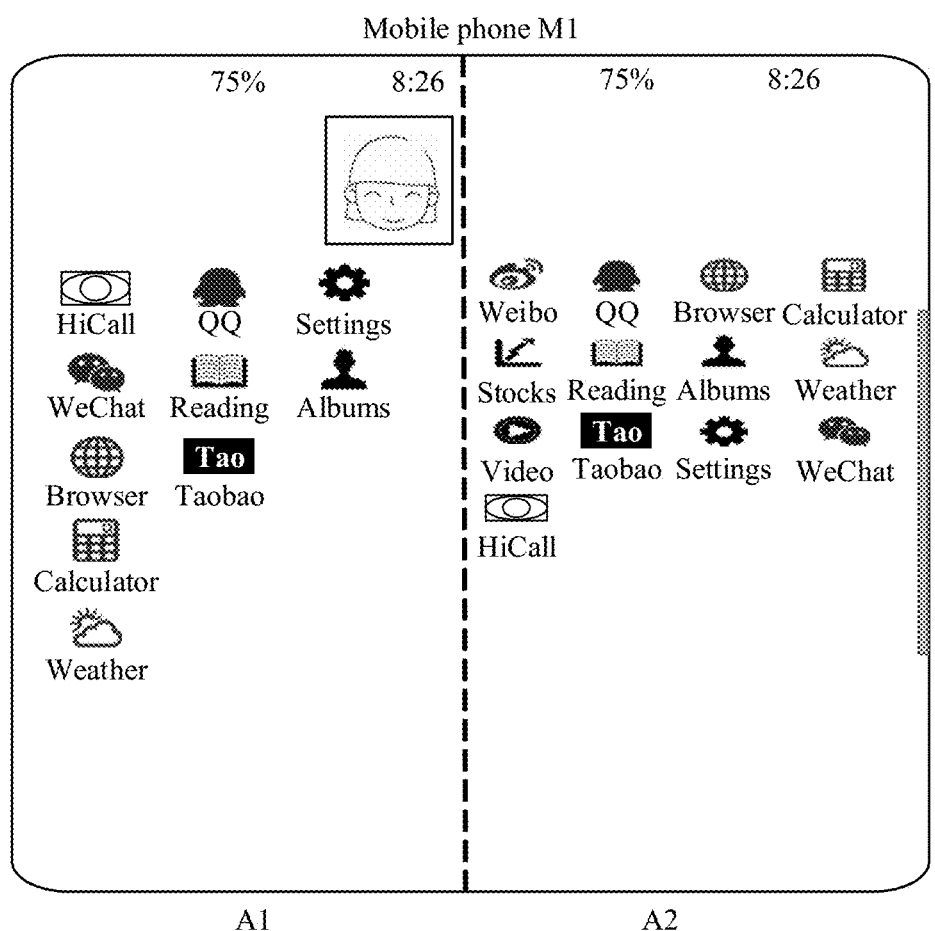
Figures 2, 5H:
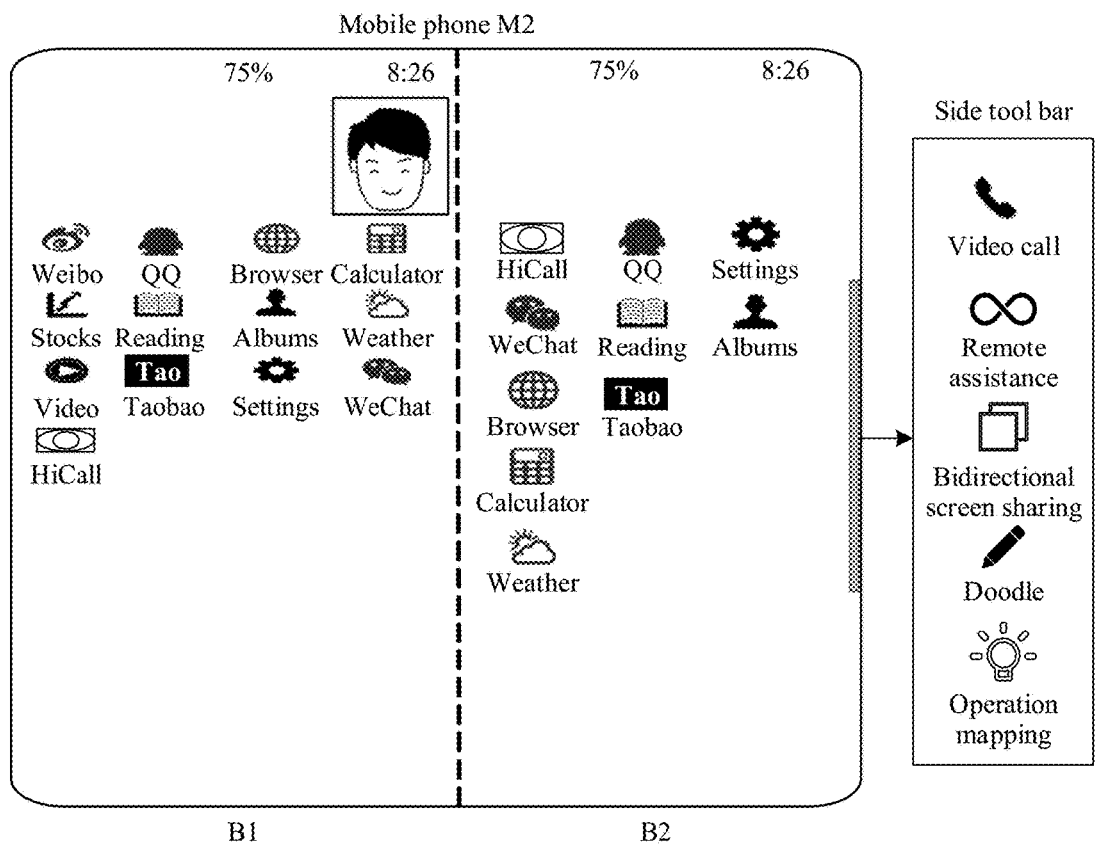

For example, for the scenario shown in FIG. 5C, the mobile phone M1 and the mobile phone M2 are in a video call state, the user N1 taps a "Bidirectional screen sharing" control, and the user N2 receives "Bidirectional screen sharing". After "Bidirectional screen sharing" is established, the interfaces of the mobile phone M1 and the mobile phone M2 are shown in FIG. 5H-1 and FIG. 5H-2. The screen A1 is a screen that is of the mobile phone M1 and that is used by a user to perform an operation. An operable interface (for example, a desktop) of the mobile phone M1 and an image of the other party during a video call may be displayed on the screen A1. The screen B1 is a screen that is of the mobile phone M2 and that is used by a user to perform an operation. An operable interface (for example, a desktop) of the mobile phone M2 and an image of the other party during a video call may be displayed on the screen B1.

It should be noted that the first screen sharing streaming media transfer channel is used to transmit display data, doodle data, and the like that are related to the screen A1 and the screen B2, and the second screen sharing streaming media transfer channel is used to transmit display data, doodle data, and the like that are related to the screen A2 and the screen B1.

Another scenario of bidirectional screen sharing between the mobile phone M1 and the mobile phone M2 is as follows.

Further, for example, as shown in FIG. 5D-1 and FIG. 5D-2, when remote assistance is established between the mobile phone M1 and the mobile phone M2, the user may further select "Bidirectional screen sharing" based on the side tool bar, so that bidirectional screen sharing is established between the mobile phone M1 and the mobile phone M2. It should be noted that, in this case, compared with that the first screen sharing streaming media transfer channel and the second screen sharing streaming media transfer channel need to be established between the mobile phone M1 and the mobile phone M2 in S505, the two screen sharing streaming media transfer channels can be established as long as another screen sharing streaming media transfer channel is established between the mobile phone M1 and the mobile phone M2. The screen sharing streaming media transfer channel established in S205 is the first screen sharing streaming media transfer channel, the another screen sharing streaming media transfer channel is a second screen sharing streaming media transfer channel. Other processes of performing bidirectional screen sharing are the same as or similar to the foregoing steps S501 to S507. Details are not described herein again.

According to the enhanced video call method provided in this embodiment of this application, bidirectional screen sharing between the mobile phone M1 and the mobile phone M2 can be implemented, so that the mobile phone M1 and the mobile phone M2 each have a screen used by a user. In addition, the screen used by the user may be used as a shared screen and shared to a peer end for displaying, and a screen that is of the peer end and that is used by the user is displayed, thereby implementing bidirectional screen sharing and effectively improving user experience.

Figures 1, 5I:
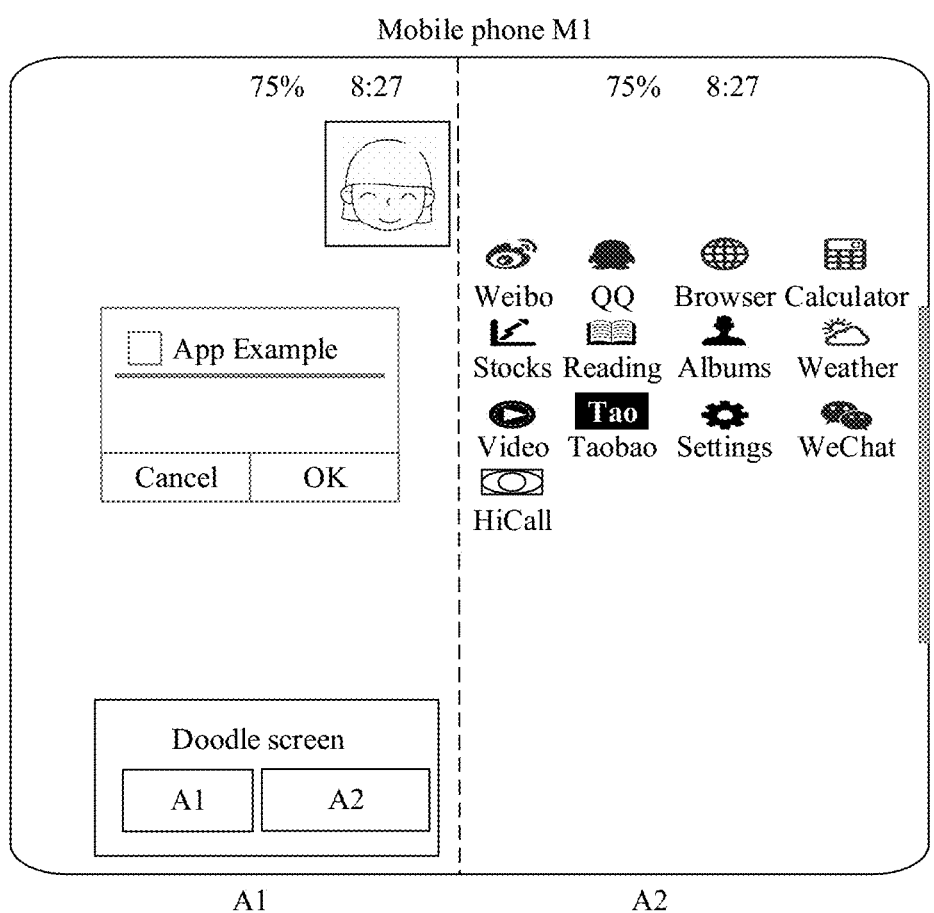
Figures 2, 5I:
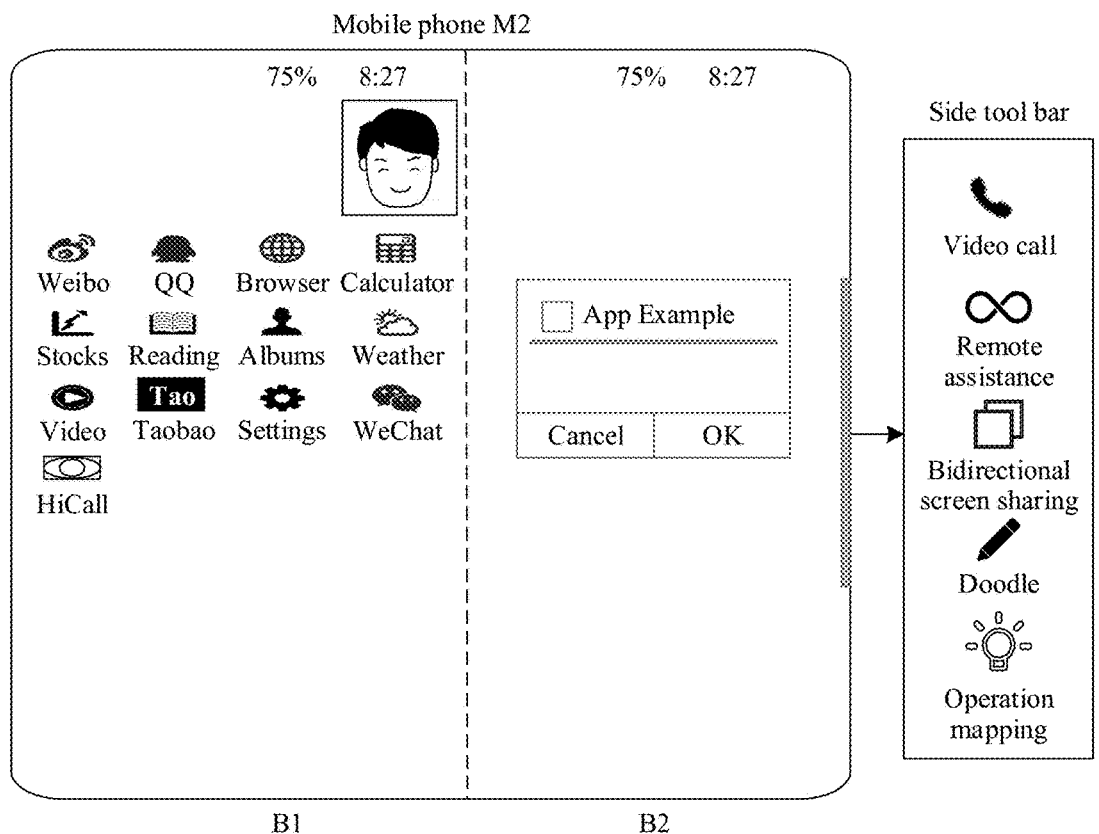
Figures 1, 5J:
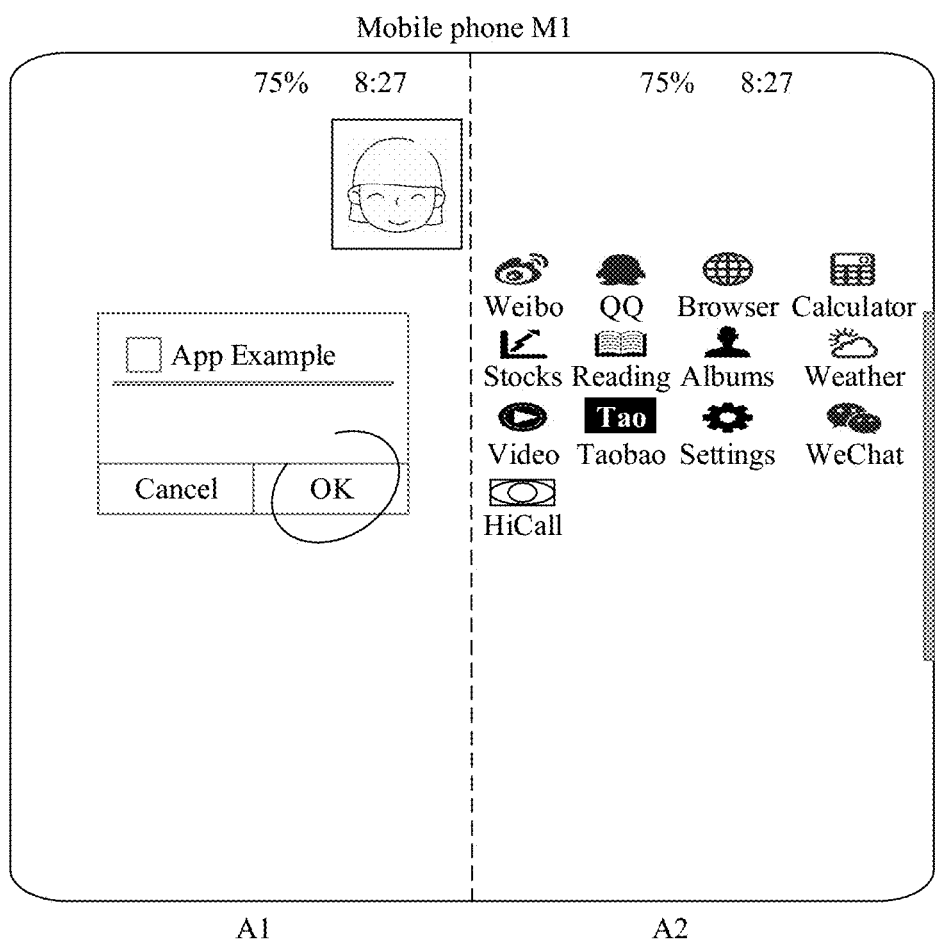
Figures 2, 5J:
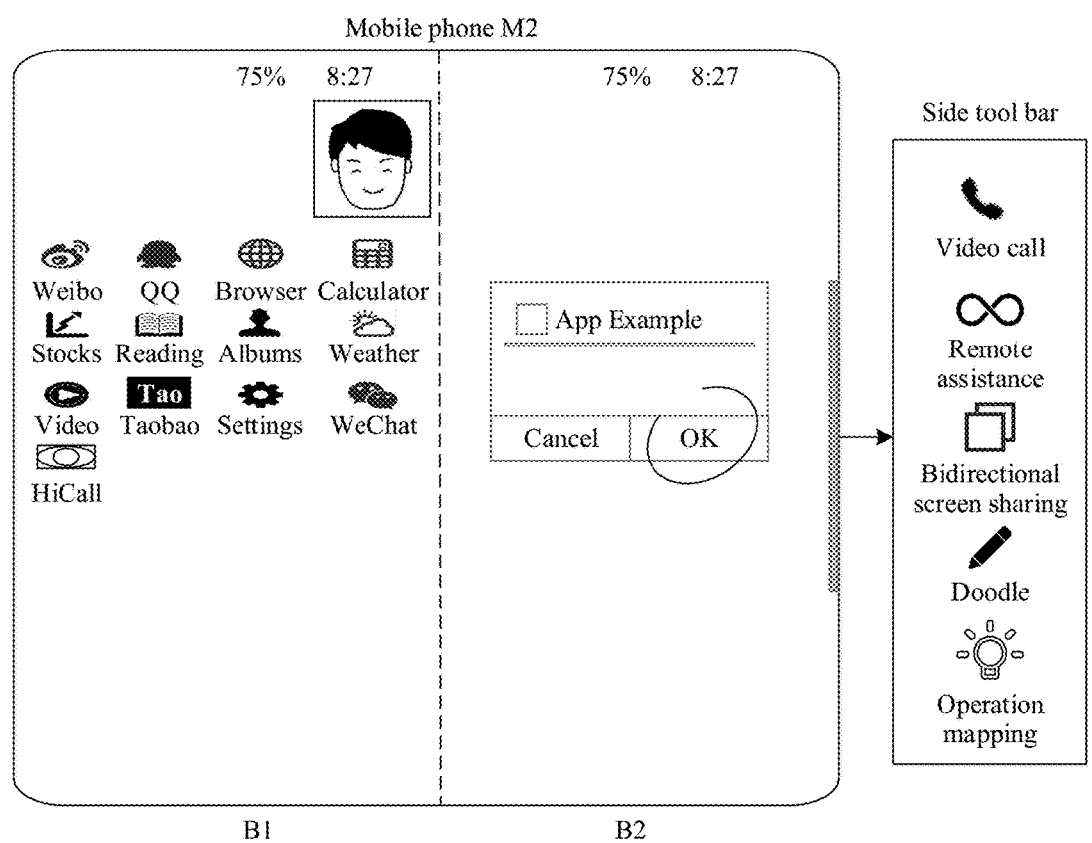

Further, when bidirectional screen sharing is performed between the mobile phone M1 and the mobile phone M2, the users may further select to doodle based on the side tool bars shown in FIG. 5H-1 and FIG. 5H-2. If the mobile phone M1 detects an operation of the user N1 on a doodle control, as shown in FIG. 5I-1, the mobile phone M1 displays, in a pop-up window; a control of a doodle screen that is used by the user to select to perform a doodle operation. If the user selects a screen A1, the mobile phone M1 agrees the user N1 to doodle on the screen A1 by default, and the mobile phones M1 and M2 perform a doodle process shown in steps S301 to S308. For example, interfaces after doodle is performed are shown in FIG. 5J-1 and FIG. 5J-2.

Figures 1, 5K:
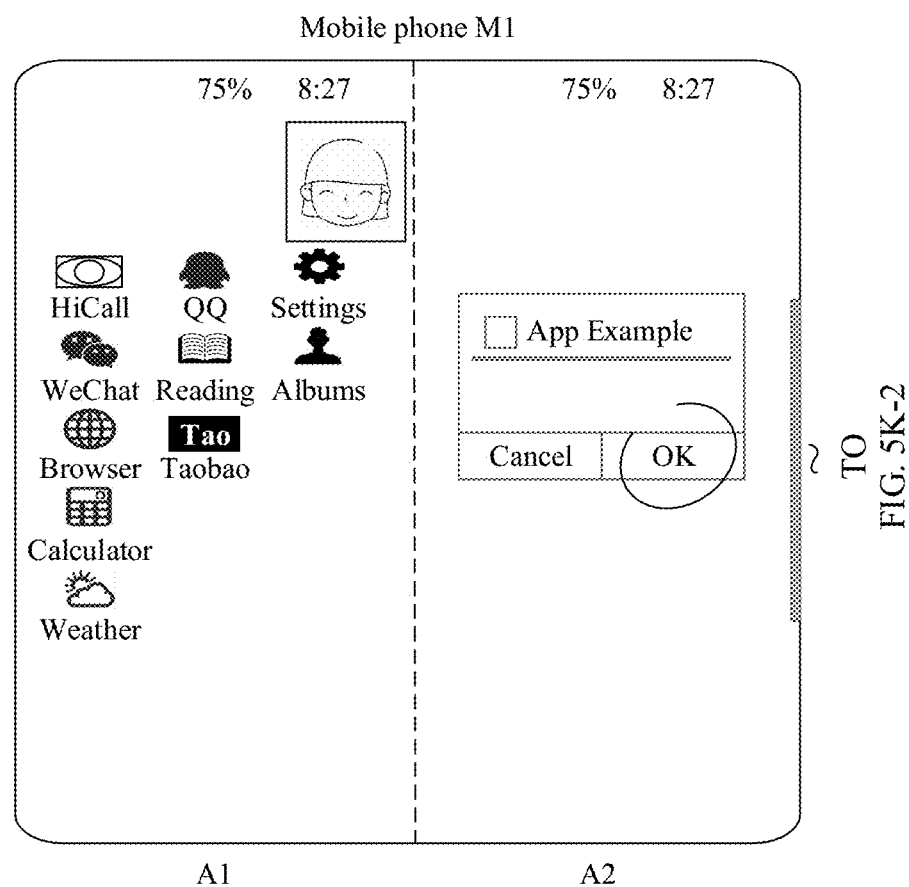
Figures 2, 5K:
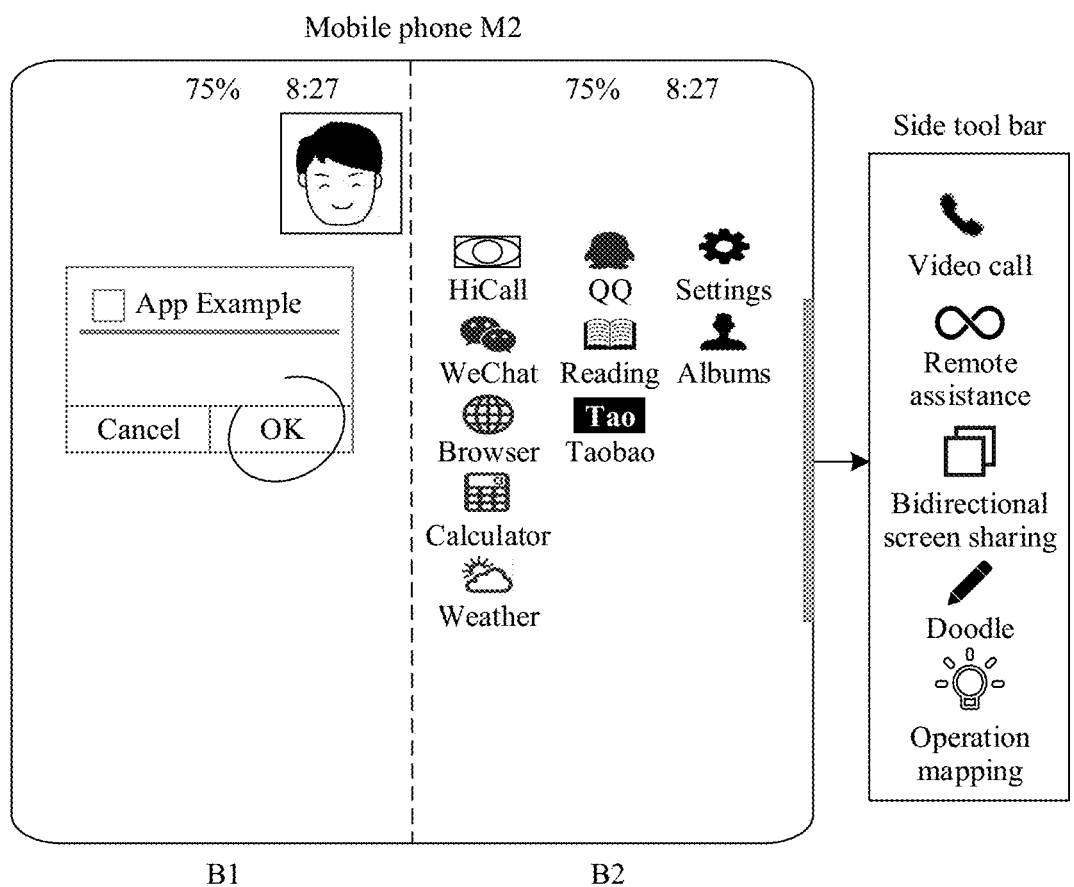

If the user selects the screen A2, the mobile phone M1 and the mobile phone M2 need to negotiate whether the user N1 is allowed to doodle on the screen A2. When determining that the user N1 is allowed to doodle on the screen A2, the mobile phone M1 receives the doodle on the screen A2 from the user N1. In addition, the mobile phones M1 and M2 perform processes similar to those shown in steps S401 to S413. For example, interfaces after doodle is performed are shown in FIG. 5K-1 and FIG. 5K-2.

In an implementation of this embodiment of this application, when the mobile phone M1 and the mobile phone M2 perform bidirectional screen sharing, the user may further select an "Operation mapping" control based on the tool bar, and the mobile phone M1 and the mobile phone M2 perform an operation related to operation mapping. Refer to FIG. 4C-1 and FIG. 4C-2. Performing operation mapping includes the following steps.

S801: The mobile phone M1 detects a trigger operation performed by the user N1 on an "Operation mapping" control.

Figure 5L:
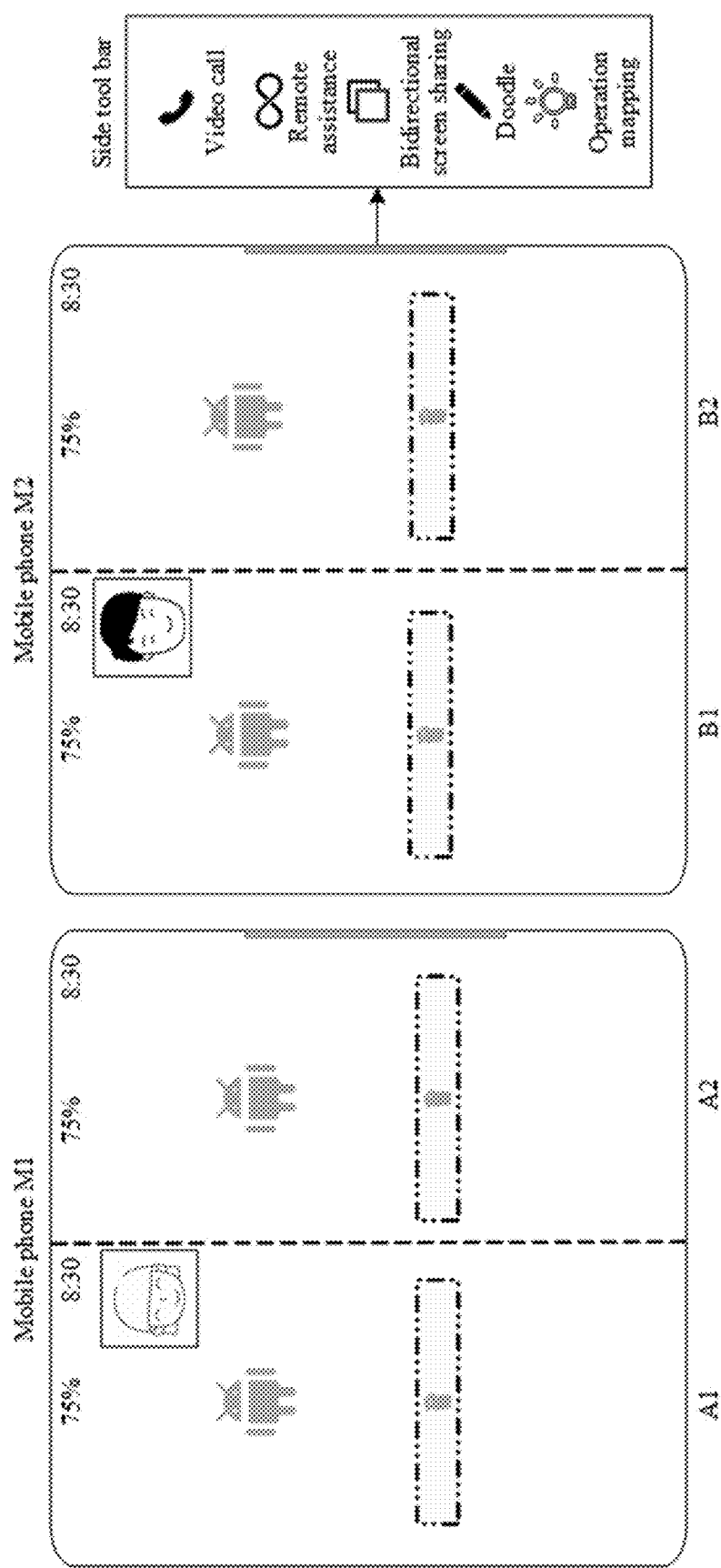

For example, in this embodiment of this application, an application uninstallation scenario is used as an example for description. During application uninstallation, display interfaces of the mobile phone M1 and the mobile phone M2 are shown in FIG. 5L.

S802: The mobile phone M1 sends an operation mapping request to the mobile phone M2 by using the server H based on a trigger operation of the user N1 on the "Operation mapping" control.

S803: The mobile phone M2 detects confirmation of the user N2 that a trigger operation of operation mapping is to be performed.

S804: The mobile phone M2 performs the trigger operation of the operation mapping based on the confirmation of the user N2, and generates and sends, to the mobile phone M1, response information for confirming to perform the operation mapping.

S805: The mobile phone M1 establishes an operation mapping signaling channel with the mobile phone M2.

S806: The mobile phone M2 receives a trigger operation performed by the user N2 on the screen B1.

S807: The mobile phone M2 generates operation mapping signaling based on the trigger operation performed by the user N2 on the screen B1. S809 is performed at the same time.

The mobile phone M2 captures the trigger operation of the user N2, calculates an operation area of the user N2, converts the operation and the operation area into a corresponding code, and generates operation mapping signaling, where the operation mapping signaling includes a mapping mark code, an operation field, an operation object, and an operation code. The mapping mark code is used to identify that a signaling type is operation mapping, the operation field is an operation area recorded based on a screen scale, the operation object is an operated control object identifier and is defined by a system, and the operation code is used to identify an operation behavior such as tap, pull-down, slide-up, or irregular slide.

S808: The mobile phone M2 sends the operation mapping signaling to the mobile phone M1 through the operation mapping signaling channel.

S809: The mobile phone M2 receives the trigger operation performed by the user N2 on the screen B1, and continuously performs screen recording, to obtain screen recording data.

Figure 5M:
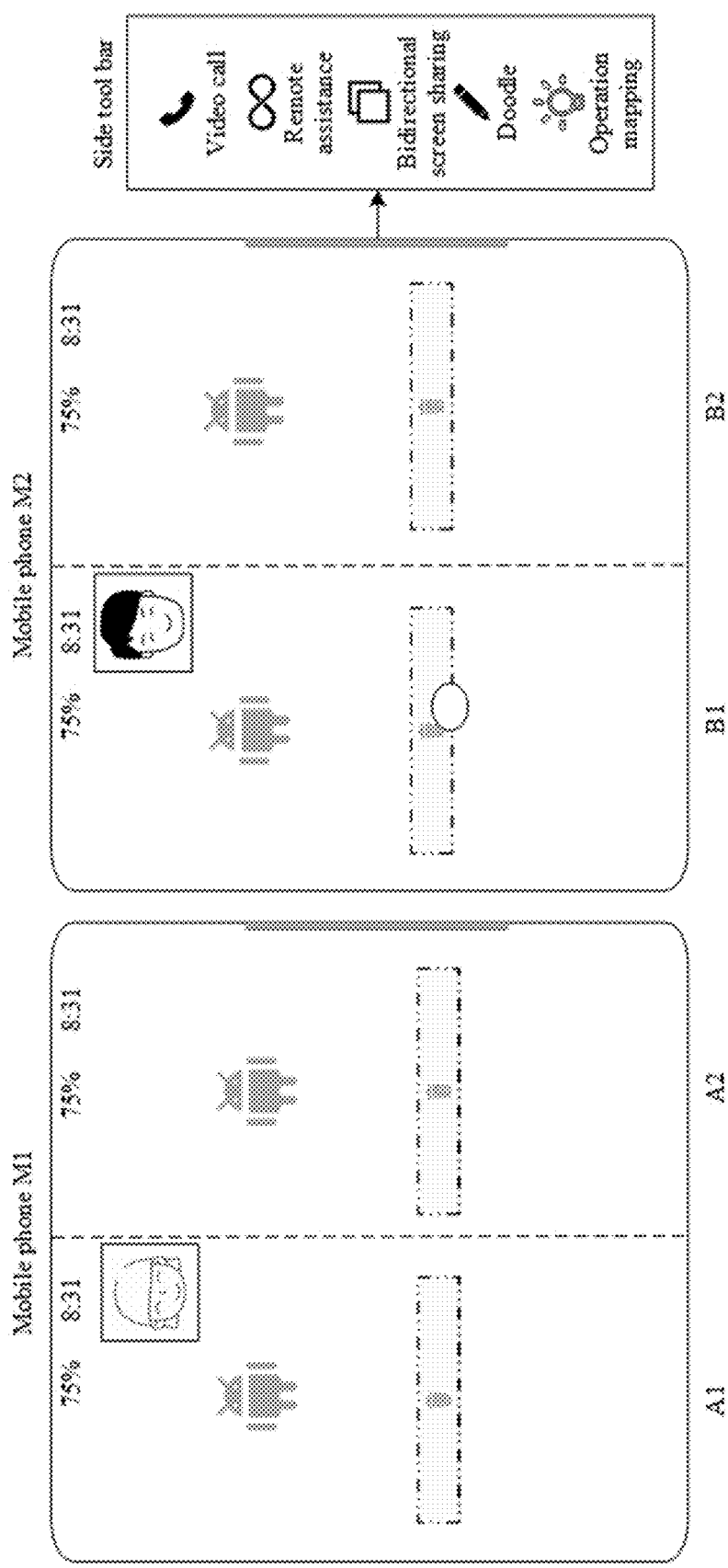

As shown in FIG. 5M, the user N2 performs a tap trigger operation on an uninstallation icon on the screen B1.

S810: The mobile phone M2 sends screen recording data of the second screen B2 to the mobile phone M1.

S811: The mobile phone M1 receives the operation mapping signaling, and parses the operation mapping signaling.

S812: The mobile phone M1 displays an operation mapping interface based on a parsing result.

The mobile phone M1 receives the operation mapping signaling output by the mobile phone M2. First, the mobile phone M1 determines that the received signaling is the operation mapping signaling, and then determines, based on a displayed screen, whether an operation area (for example, an area of an unloading control triggered by a finger of the user N2 and an area around the unloading control) in the operation mapping signaling and an operation object (for example, the unloading control) in which the user N2 performs an operation exist, and the operation object can perform an operation behavior corresponding to an operation code in the signaling. When the foregoing condition is met, the mobile phone M1 displays an operation mapping prompt based on the information such as the operation area, the control object, and the operation. For example, the operation prompt is marked with a frame line on the screen A1 of the mobile phone M1.

Figure 5N:
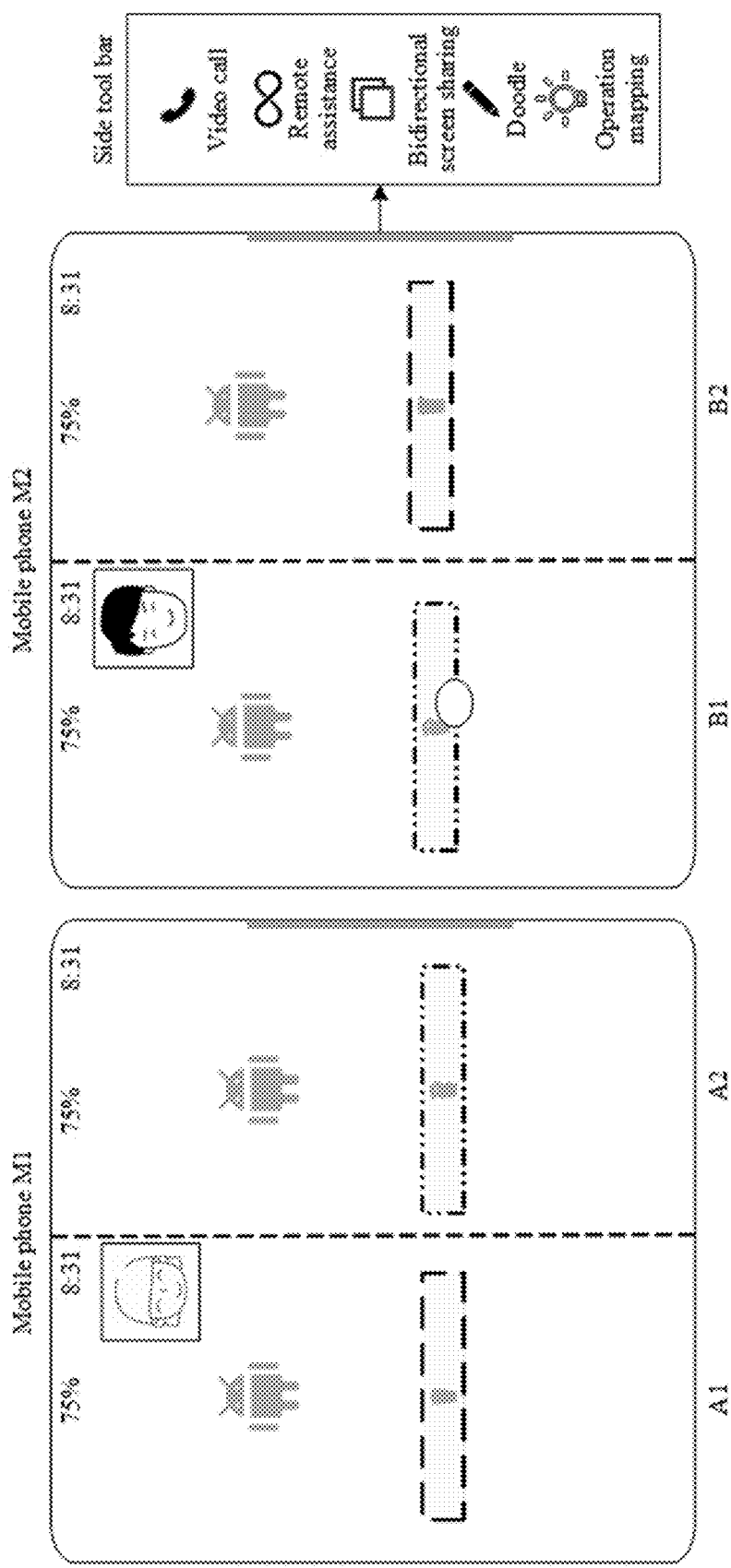
Figure 50:
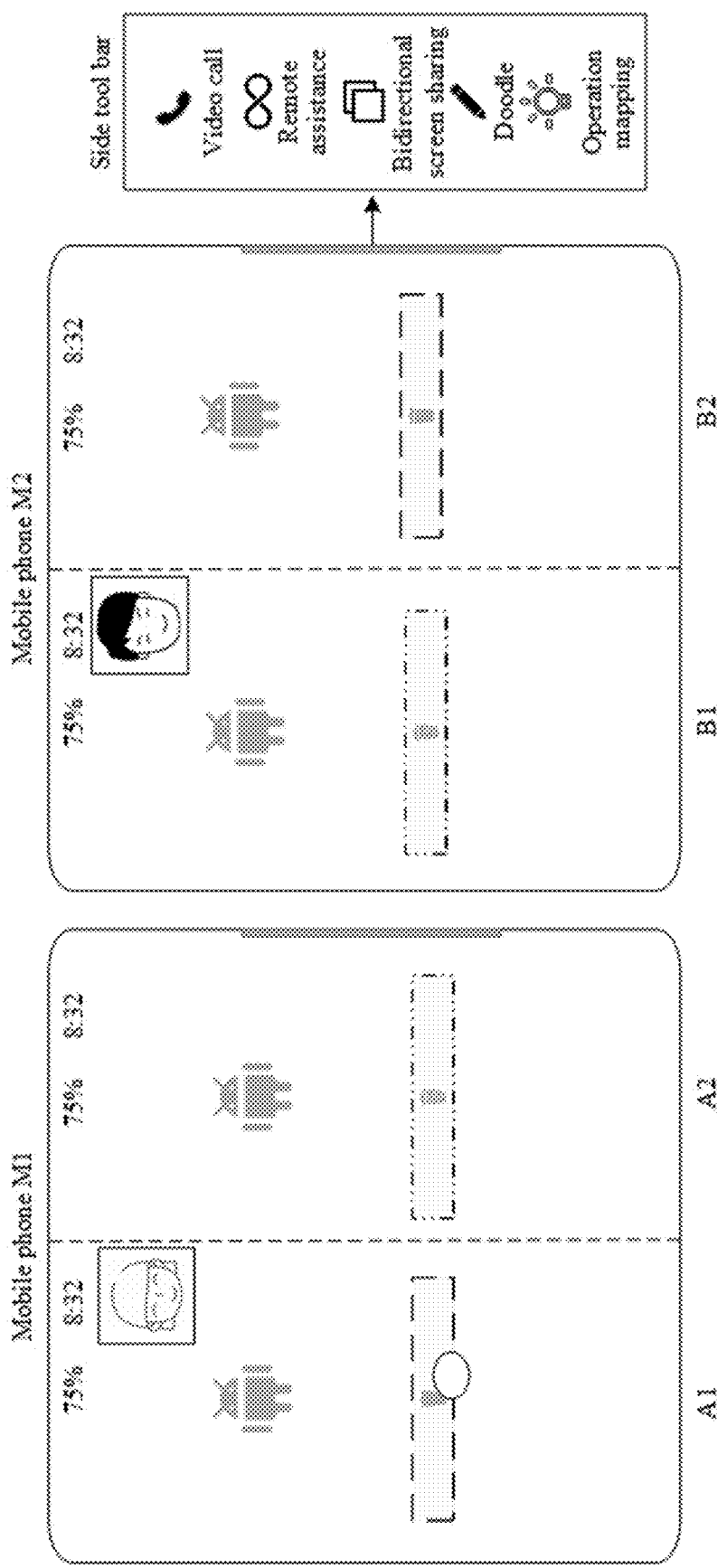

Further, a display interface obtained after operation mapping is performed is shown in FIG. 5N.

S813: The mobile phone M1 detects the trigger operation performed by the user N1 based on the operation mapping.

As shown in FIG. 5O, the user N1 performs a trigger operation on a screen A1.

S814: The mobile phone M1 displays, based on the trigger operation of the user N1, an interface corresponding to the trigger operation.

The mobile phone M1 obtains the operation prompt based on the operation prompt marked on the screen A1 and an operation mark displayed on the screen A2, thereby achieving an effect of guiding the user N1 to perform a self-learning operation by using the mobile phone M1.

S815: The mobile phone M1 generates response information indicating that the trigger operation is completed, and sends the response information to the mobile phone M2 through the operation mapping signaling channel.

S816: The mobile phone M2 generates prompt information based on the response information, and displays the prompt information on the screen B1.

The prompt information may be transmitted in a toast (prompt box) information manner.

After the mobile phone M1 performs an operation based on the operation mapping prompt, the mobile phone M1 detects an operation behavior of the user N1, and feeds back a mapping learning result to the mobile phone M2. The mobile phone M2 notifies the user that the peer end has completed learning through the toast and the user can proceed with subsequent operations.

It should be noted that, for ease of description, in the foregoing process, the process of transmitting each piece of information between the mobile phone M1 and the server H through the push server P1 and the process of transmitting each piece of information between the mobile phone M2 and the general server H through the push server P2 are omitted, but persons skilled in the art should understand that the information is transmitted through the push server.

Figure 5P:
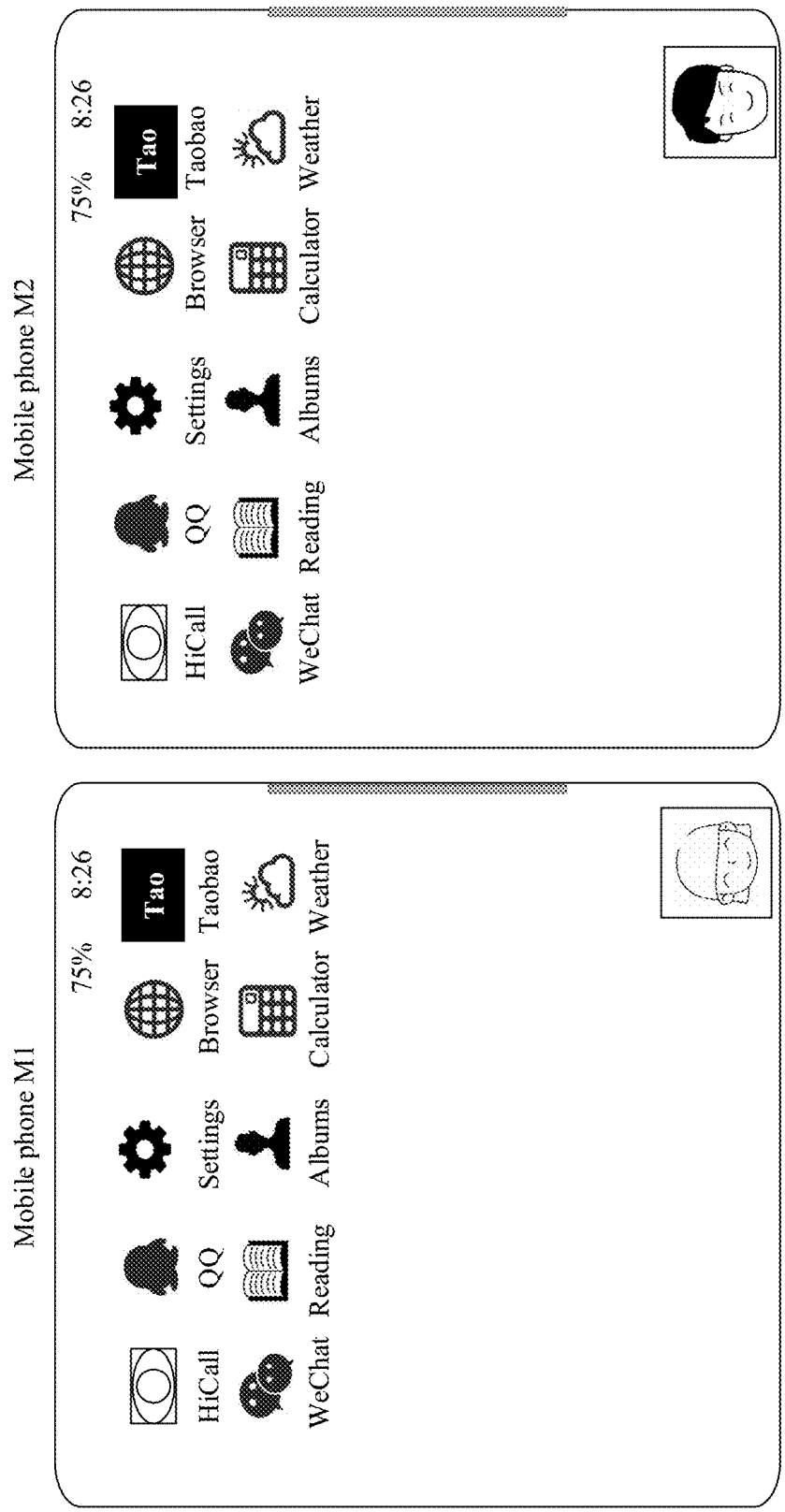

Further, in an implementation of this application, during remote assistance, for step S206, the mobile phone M1 and the mobile phone M2 may also display an interface shown in FIG. 5P. To be specific, the mobile phone M1 displays the video call image of the user N2 in a lower right corner of the screen, and displays the main desktop at another area. The mobile phone M2 displays the video call image of the user N1 in a lower right corner of the screen, and displays the main desktop shared by the mobile phone M1 at the another area. Certainly, when remote assistance is performed, for step S206, another type of display interface may also be used.

It should be noted that, that the mobile phone M1 and the mobile phone M1 divide respective screens of the mobile phone M1 and the mobile phone M1 into at least two display areas includes: If only one physical screen is disposed on each of the mobile phone M1 and the mobile phone M2, the mobile phone M1 and the mobile phone M2 display a split-screen bar in a middle position of the respective screen to divide the screen into the two display areas.

Figure 6A:
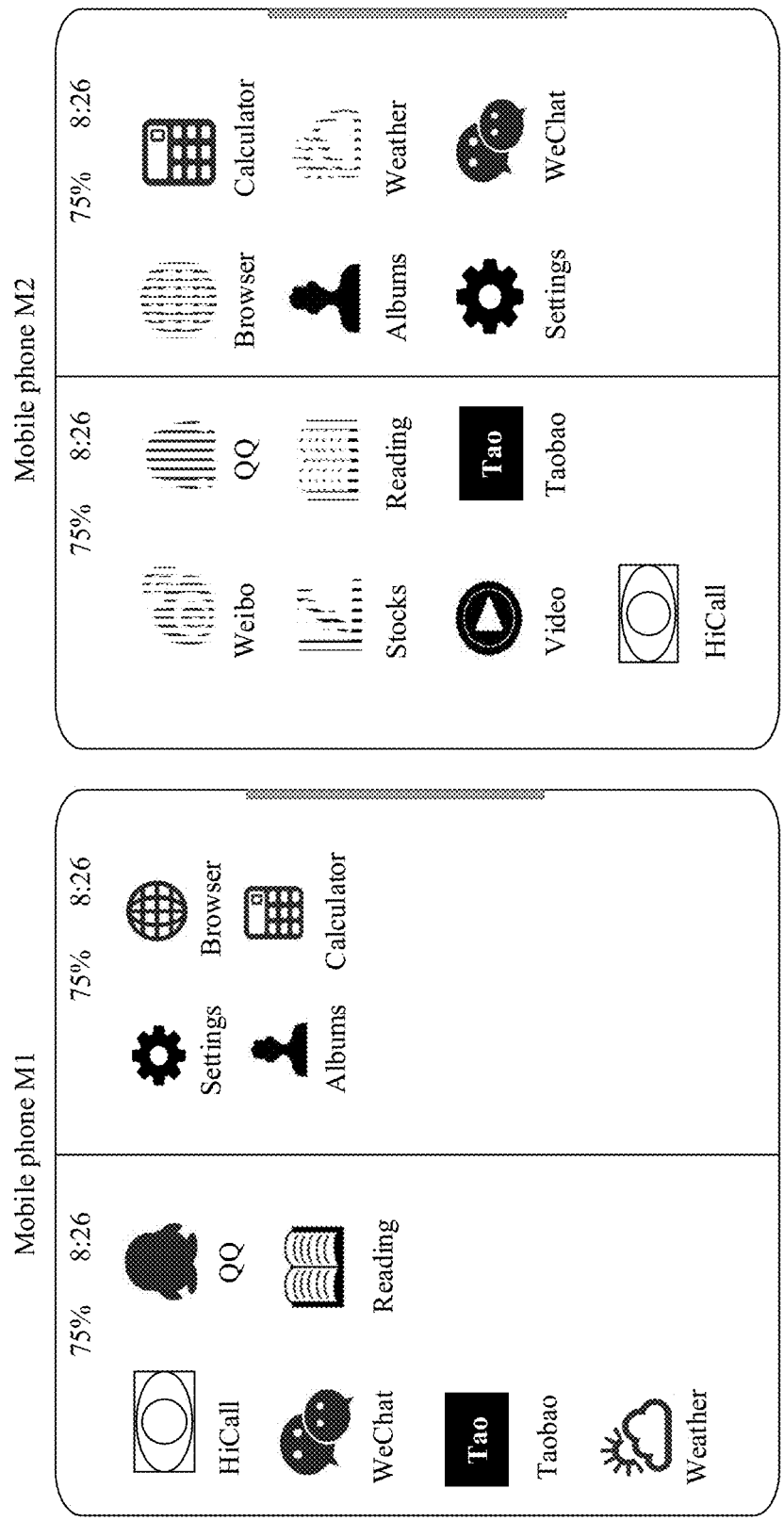

Alternatively, if the mobile phone M1 and the mobile phone M2 include a plurality of physical screens, the mobile phone M1 and the mobile phone M2 select at least two screens from the plurality of screens. The mobile phone M1 and the mobile phone M2 may be multi-screen terminals, and may select two screens from the plurality of screens as a shared screen and a screen used to display the shared screen of the peer mobile phone. For example, as shown in FIG. 6A, the mobile phone M1 and the mobile phone M2 each include a left physical screen and a right physical screen, and the two screens are respectively used as the foregoing screen A1 and screen A2, and the foregoing screen B1 and screen B2. Further, in the foregoing screen sharing scenario, interfaces displayed on the two screens are the same as interfaces displayed after screen splitting. Details are not described herein again.

Figures 1, 6C:
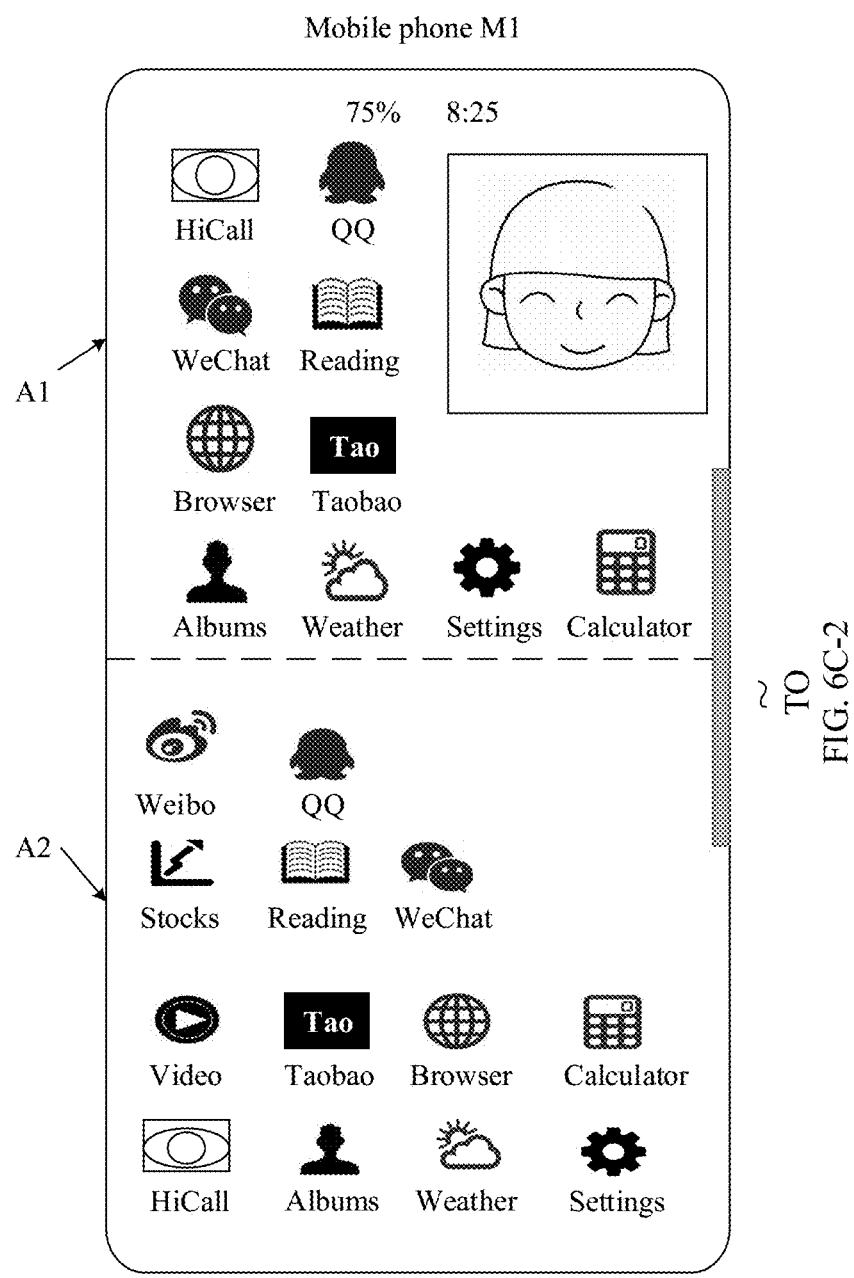
Figures 2, 6C:
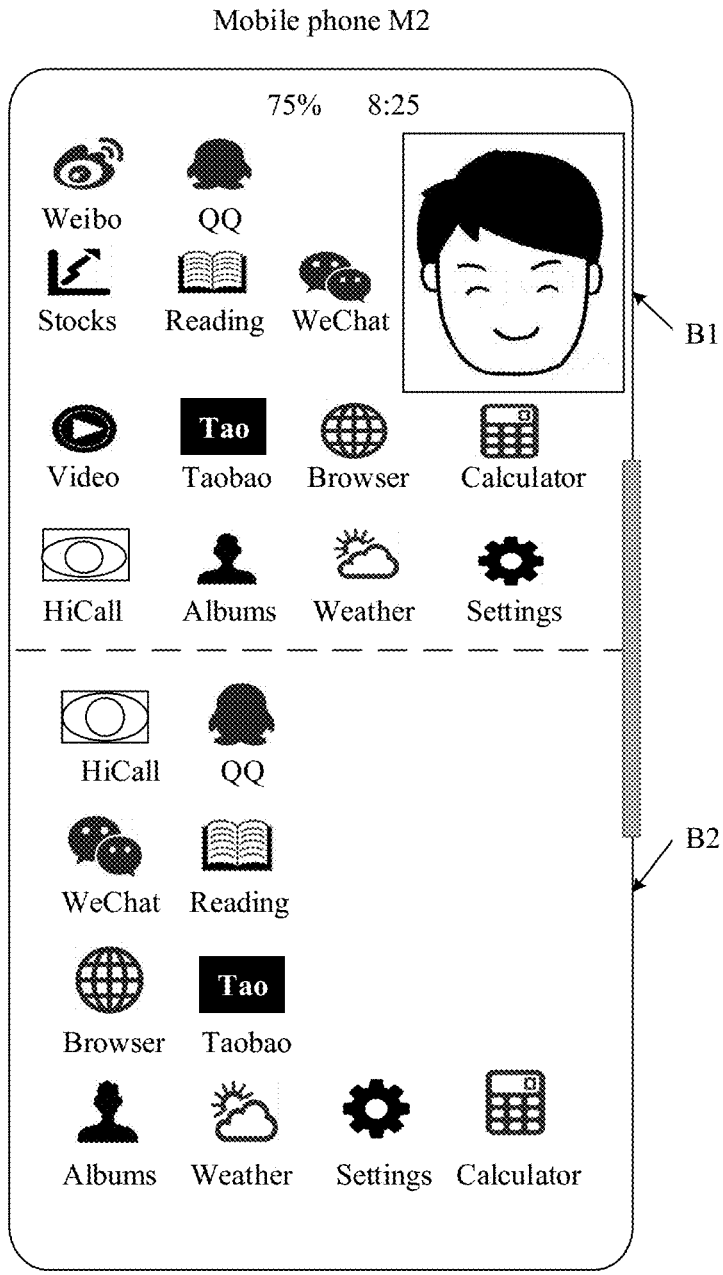

In addition, referring to FIG. 6B, in this embodiment of this application, screen shapes of the mobile phone M1 and the mobile phone M2 may alternatively be shown in FIG. 6B. During screen splitting, the screens are split into a state shown in FIG. 6C-1 and FIG. 6C-2.

Figures 1, 6D:
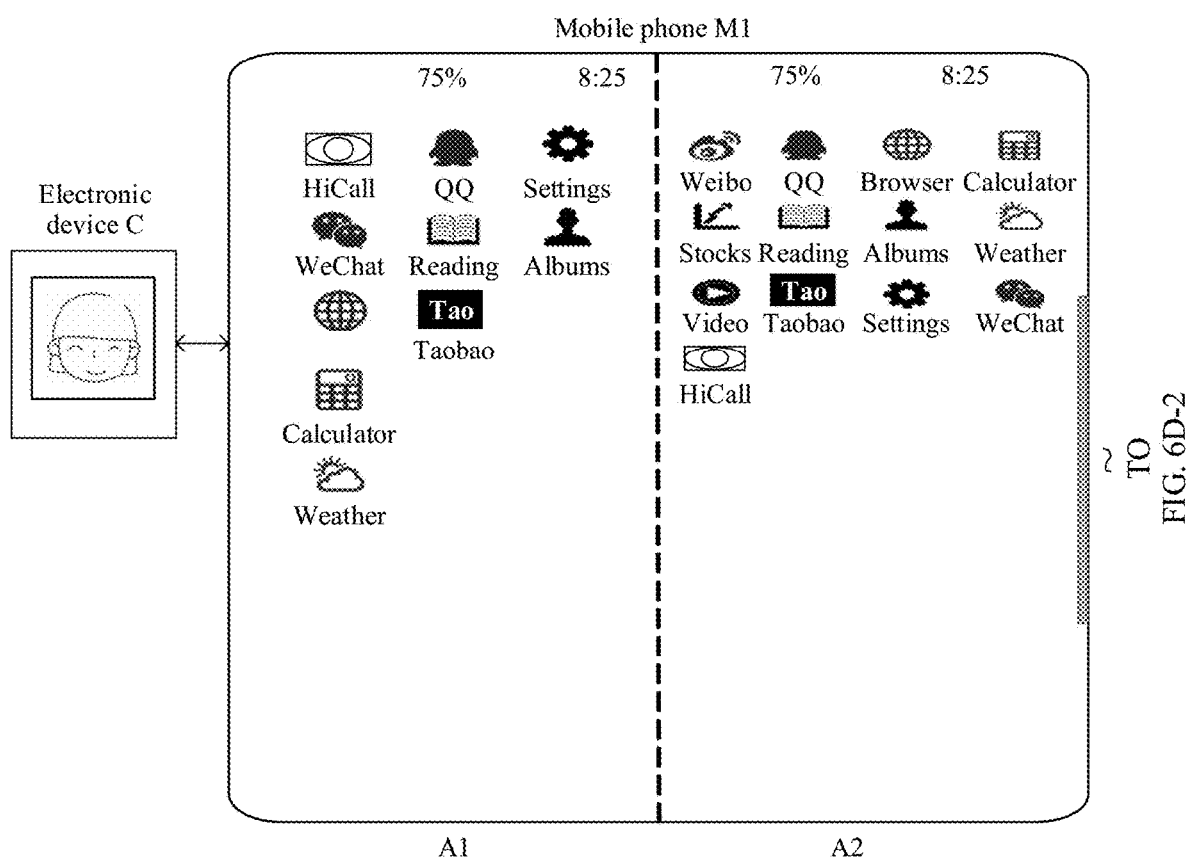
Figures 2, 6D:
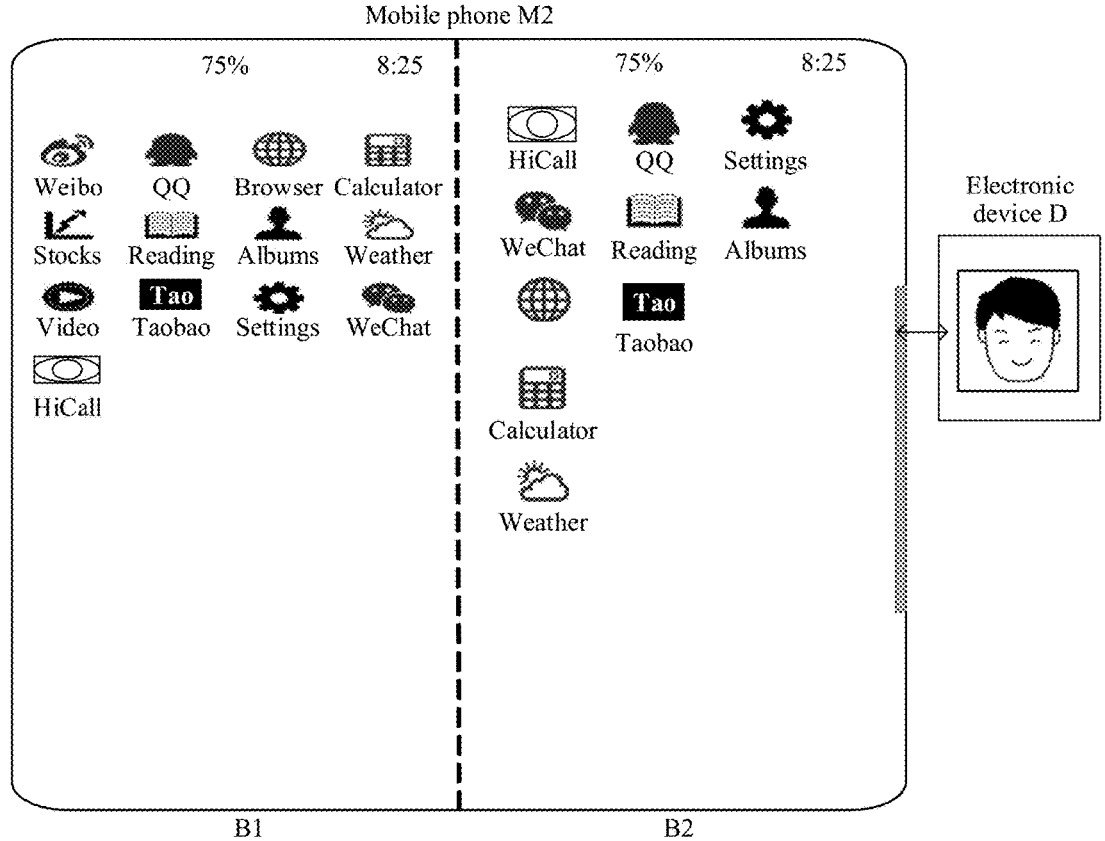

Further, in this embodiment of this application, the mobile phone M1 is communicatively connected to an electronic device C. and the mobile phone M1 shares, to the electronic device C for displaying, a video call interface for a video call with the mobile phone M2. Further, the mobile phone M2 is communicatively connected to the electronic device D. and the mobile phone M2 shares, to an electronic device D for displaying, a video call interface for a video call with the mobile phone M1. For example, corresponding to the display interfaces of the scenario shown in FIG. 5H-1 and FIG. 5H-2, display interfaces of the mobile phone M1 and the mobile phone M2 are shown in FIG. 6D-1 and FIG. 6D-2. In another scenario, similarly, the video call interface is shared to the electronic device C and the electronic device D for displaying. Details are not described herein again.

Figure 6E:
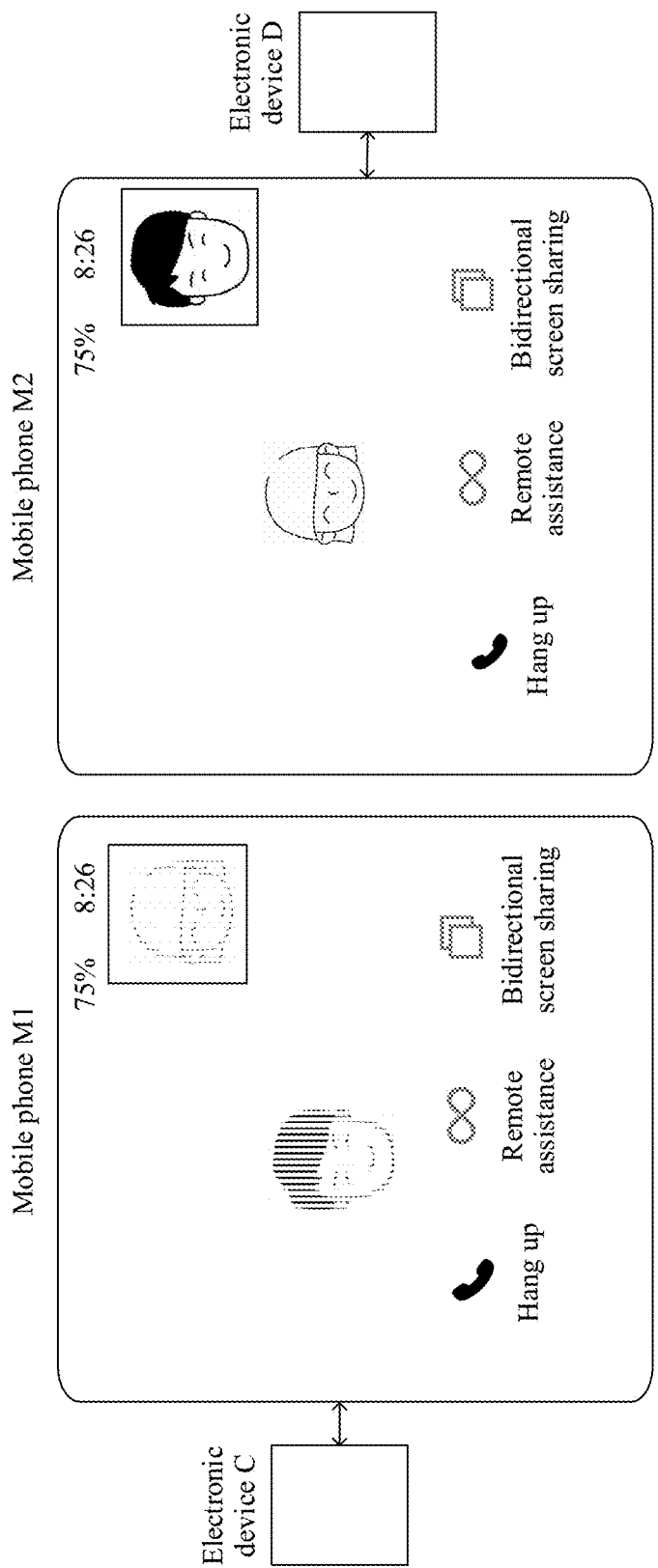

Further, in this application, as shown in FIG. 6E, the mobile phone M1 and the electronic device C are in a communication connection, the mobile phone M2 and the electronic device D are in a communication connection, and the mobile phone M1 and the mobile phone M2 establish a video call. When the foregoing remote assistance is performed, an operation of selecting a device of a sharing screen may be further performed.

Figure 6F:
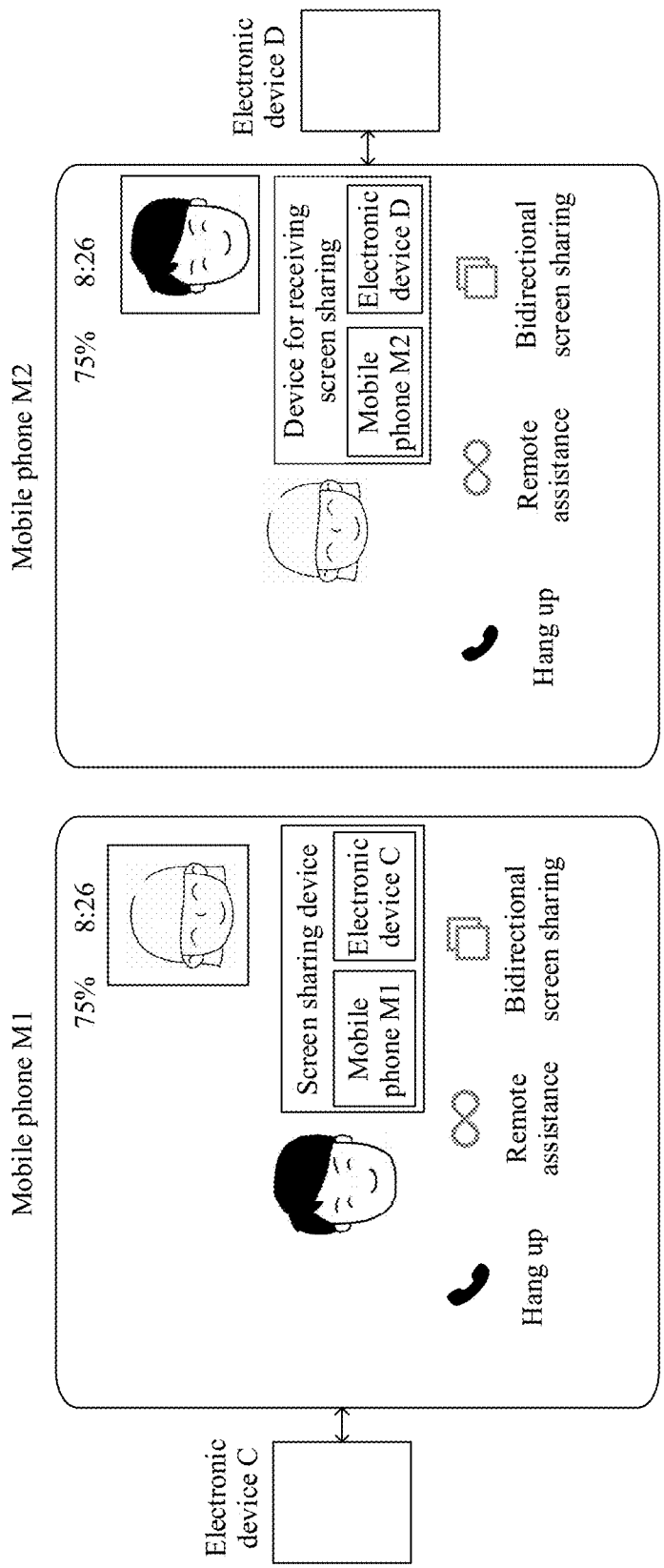

As shown in FIG. 6E, if the mobile phone M1 detects an operation performed by a user on a remote assistance control or a bidirectional screen sharing control, interfaces displayed by the mobile phone M1 and the mobile phone M2 are shown in FIG. 6F. A control used by the user N1 to select a screen sharing device is displayed on a screen of the mobile phone M1. If the user N1 selects the mobile phone M1, the mobile phone M1 shares the screen of the mobile phone M1 to the mobile phone M2 for displaying. If the user N1 selects the electronic device C, the mobile phone M1 shares the screen of the electronic device C with the mobile phone M2 for displaying. Further, the screen of the mobile phone M2 displays a control used by the user N2 to select a device for receiving screen sharing. If the user N2 selects the mobile phone M2, the mobile phone M2 displays the screen shared by the mobile phone M1. If the user N2 selects the electronic device D, the mobile phone M2 enables the electronic device D to display the screen shared by the mobile phone M1.

It should be noted that, in this embodiment of this application, a specific structure and shape of the screen are not limited, and the screen may be set based on a requirement.

Figure 7:
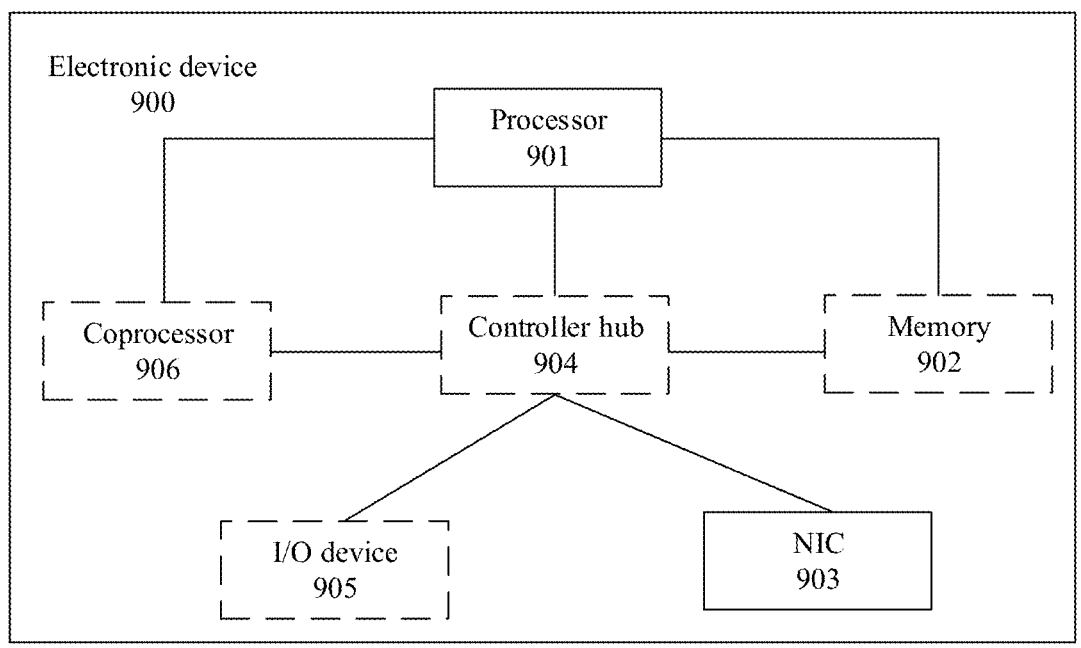
FIG. 7 is a schematic diagram of a structure of an electronic device according to an embodiment of this application.

FIG. 7 is a schematic diagram of another structure of an electronic device 900 according to an implementation of an embodiment of this application. The electronic device 900 may include one or more processors 901 coupled to a controller hub 904. In at least one embodiment, the controller hub 904 communicates with the processor 901 through a multi-branch bus such as a front side bus (FSB), a point-to-point interface such as a quick path interconnect (QPI), or a similar connection. The processor 901 executes instructions for controlling a general type of data processing operation. In an embodiment, the controller hub 904 includes, but is not limited to, a graphics memory controller hub (GMCH) (not shown in the figure) and an input/output hub (IOH) (which may be on separate chips) (not shown in the figure). The GMCH includes a memory and a graphics controller, and is coupled to the IOH.

The electronic device 900 may further include a coprocessor 906 and a memory 902 that are coupled to the controller hub 904. Alternatively, one or both of the memory 902 and the GMCH may be integrated into the processor 901 (as described in the embodiment of this application). The memory 902 and the coprocessor 906 are directly coupled to the processor 901 and the controller hub 904. The controller hub 904 and the IOH are located in a single chip.

In one embodiment, the coprocessor 906 is a dedicated processor, and an optional property of the coprocessor 906 is represented by dashed lines in FIG. 7.

In an embodiment, the electronic device 900 may further include a network interface (NIC) 903. The network interface 903 may include a transceiver, configured to provide a radio interface for the electronic device 900 to further communicate with any other suitable devices (such as a front-end module and an antenna). In various embodiments, the network interface 903 may be integrated with another component of the electronic device 900. The network interface 903 may implement a function of a communications unit in the foregoing embodiment.

The electronic device 900 may further include an input/output (I/O) device 905.

It should be noted that FIG. 7 is merely used as an example. To be specific, although FIG. 7 shows that the electronic device 900 includes a plurality of components such as the processor 901, the controller hub 904, and the memory 902, in actual application, a device using the methods in the embodiment of this application may include only some of the components of the electronic device 900, for example, may include only the processor 901 and the NIC 903. A property of an optional component in FIG. 7 is shown by a dashed line.

The memory of the electronic device 900 may include one or more tangible and non-transitory computer-readable storage media, configured to store data and/or instructions. The computer-readable storage medium stores instructions, and specifically, stores temporary and permanent copies of the instructions.

In this embodiment of this application, the electronic device 900 may be a mobile phone, and the instructions stored in the memory of the electronic device may include: an instruction that is executed by at least one unit in the processor and that causes the mobile phone to implement the enhanced video call method mentioned above.

The embodiments of the mechanism disclosed in the embodiments of this application may be implemented in a manner such as software, hardware, firmware, or a combination of these implementation methods. The embodiments of this application may be implemented as a computer program or program code executed on a programmable system. The programmable program includes at least one processor and a memory (or a storage system, including volatile and non-volatile memories and/or a storage unit).

The program code may be applied to input the instructions to perform the functions described herein and generate output information. The output information may be applied to one or more output devices in a known manner. It may be understood that, in the embodiments of this application, a processing system may be a microprocessor, a digital signal processor (DSP), a microcontroller, an application-specific integrated circuit (ASIC), or the like, and/or any combination thereof. According to another aspect, the processor may be a single-core processor, a multi-core processor, or the like, and/or any combination thereof.

The program code may be implemented in a high-level programming language or an object-oriented programming language, to communicate with the processor. The program code may alternatively be implemented by using an assembly language or a machine language when needed. Indeed, the mechanisms described in this application are not limited to the scope of any particular programming language. In any case, the language may be a compiled language or an interpretive language.

In some cases, the disclosed embodiments may be implemented by hardware, firmware, software, or any other combinations. The disclosed embodiments may be implemented as instructions carried by or stored on one or more transitory or non-transitory machine-readable (for example, computer-readable) storage media. The instructions may be read and executed by one or more processors. For example, the instructions are distributed over a network or through a pneumatic computer-readable medium. Therefore, the machine-readable medium may include any mechanism for storing or transmitting information in a machine (for example, a computer) readable form, including, but not limited to, a floppy disk, a compact disc, an optical disc, a compact disc read-only memory (CD-ROMs), a magneto-optical disc, a read-only memory (ROM), a random access memory (RAM), an erasable programmable read-only memory (EPROM), an electrically erasable programmable read-only memory (EEPROM), a magnetic card or an optical card, a flash memory, or a tangible machine-readable memory for transmitting information (for example, a carrier-wave, infrared, and digital signal) by using the internet in an electrical, optical, acoustic, or other forms. Therefore, the machine-readable medium includes any type of machine-readable medium suitable for storing or transmitting electronic instructions or information in a machine-readable form.

What is claimed is:

1. A first electronic device comprising:
   a memory configured to store a computer program, wherein the computer program comprises program instructions; and
   a processor, coupled to the memory, configured to execute the program instructions, to cause the first electronic device to perform an enhanced video call method comprising:
   establishing a video call with a second electronic device;
   displaying a first video call interface, wherein the first video call interface comprises a screen sharing control;
   based on the first electronic device detecting a first operation of a user on the screen sharing control, displaying a shared interface in a display area of the first electronic device, and sending, display data of the shared interface of the first electronic device to the second electronic device; and
   receiving doodle data sent by the second electronic device, and displaying a doodle on the shared interface based on the doodle data,
   wherein the doodle automatically disappears from the shared interface after a preset time.

2. The first electronic device according to claim 1, wherein based on the user being unable to operate the shared interface during the preset time, after the doodle disappears from the shared interface, the shared interface of the first electronic device is capable of being operated by the user.

3. The first electronic device according to claim 1, wherein the method further comprises;
   displaying an operation mapping control;
   based on the first electronic device detecting a fifth operation performed by the user on the operation mapping control, sending a fourth request used for performing operation mapping to the second electronic device; and based on the fourth request being agreed to by the second electronic device, receiving, operation mapping signaling that is associated with the shared interface of the second electronic device and that is sent by the second electronic device, and displaying an operation mapping interface on the shared interface of the first electronic device based on the operation mapping signaling.

4. The first electronic device according to claim 3, wherein the method further comprises;

based on the first electronic device detecting a sixth operation performed by the user on the operation mapping interface, sending, to the second electronic device, notification information used to notify the second electronic device that the user has performed the sixth operation.

5. The first electronic device according to claim 1, wherein the method further comprises;

based on the first electronic device detecting the first operation of the user on the screen sharing control, automatically displaying, by the first electronic device, a split-screen control.

6. The first electronic device according to claim 1, wherein based on the first electronic device detecting the first operation of the user on the screen sharing control, the method further comprises;

displaying, by the first electronic device, a split-screen control display type selection control that is used by the user to select a split-screen control display type; and based on the first electronic device detecting a seventh operation of the user on the split-screen control display type selection control, displaying a split-screen control based on the split-screen control display type selected by the user.

7. The first electronic device according to claim 1, wherein based on the first electronic device being connected to a third electronic device and detecting the first operation of the user on the screen sharing control, the method further comprises;

displaying a screen sharing device selection control used by the user to select a device for screen sharing; and based on the user selecting the first electronic device as a screen sharing device, sending, the display data of the shared interface of the first electronic device to the second electronic device: or based on the user selecting the third electronic device as a screen sharing device, sending, display data of a shared interface of the third electronic device to the second electronic device.

8. The first electronic device according to claim 1, wherein based on the first electronic device being connected to a third electronic device and receiving a fifth request that is used for screen sharing and that is sent by the second electronic device, the method further comprises;

displaying a screen sharing device selection control used by the user to select a device for screen sharing; and based on the user selecting the first electronic device as a screen sharing device, receiving the display data that is of the shared interface of the second electronic device and that is sent by the second electronic device, and displaying the shared interface; or based on the user selecting the third electronic device as a screen sharing device, receiving, the display data that is of the shared interface of the second electronic device and that is sent by the second electronic device, and sending the display data to the third electronic device.

9. The first electronic device according to claim 1, wherein the method further comprises;

based on the first request being agreed to by the second electronic device, establishing, between the first electronic device and the second electronic device, at least one screen sharing streaming media transfer channel that is independent of a video call streaming media transfer channel, so as to transmit the display data of the shared interface, wherein the video call streaming media transfer channel is used to transmit video call data between the first electronic device and the second electronic device.

10. The first electronic device according to claim 1, wherein the method further comprises;

based on the first request being agreed to by the second electronic device, displaying a side tool bar control on a side edge of the screen; and based on the first electronic device detecting an eighth operation of the user on the side tool bar control, displaying, an interface associated with the eighth operation.

11. A second electronic device comprising:

a memory configured to store a computer program, wherein the computer program comprises program instructions; and a processor coupled to the memory configured to execute the program instructions, to cause the second electronic device to perform an enhanced video call method comprising:

establishing a video call with a first electronic device, wherein the second electronic device displays a second video call interface;

receiving a first request that is for sharing a screen of the first electronic device and that is sent by the first electronic device, and displaying, on the second video call interface, a first confirmation control used by a user to confirm the first request;

based on the second electronic device detecting a ninth operation of the user on the first confirmation control, sending, to the first electronic device, a first reply indicating that the first request is agreed to;

receiving display data that is of a shared interface of the first electronic device and that is sent by the first electronic device, displaying the shared interface associated with the display data;

displaying a doodle on the shared interface in response to a user input;

sending doodle data to the first electronic device, wherein the doodle data is based on the doodle on the shared interface; and wherein the doodle automatically disappears from the shared interface after a preset time.

12. The second electronic device according to claim 11, wherein the method further comprises;

receiving a second request sent by the first electronic device, and displaying a second confirmation control used by the user to confirm the second request, wherein the second request is used by the first electronic device to request remote assistance from the second electronic device;

based on the second electronic device detecting a tenth operation of the user on the second confirmation control, sending, to the first electronic device, a second reply indicating that the second request is agreed to; and sending a remote assistance instruction to the first electronic device based on the second electronic device detecting an eleventh operation performed by the user on the shared interface.

13. The second electronic device according to claim 11, wherein the method further comprises comprising:

receiving, from the first electronic device, a fourth request for performing operation mapping, and displaying a third confirmation control associated with the fourth request and that is used by the user to confirm the fourth request;

sending a third reply to the first electronic device based on the second electronic device detecting a fourteenth operation of the user on the third confirmation control; and based on the second electronic device detecting a fifteenth operation performed by the user on the shared interface of the second electronic device, displaying an interface associated with the fifteenth operation, and sending operation mapping signaling to the first electronic device.

14. The second electronic device according to claim 13, wherein the method further comprises;

receiving notification information sent by the first electronic device, and displaying an interface associated with the notification information, wherein the notification information is used to notify the second electronic device that the user has performed a sixth operation performed by the user on the operation mapping interface on the first electronic device.

15. A video call system comprising:

a first electronic device and a second electronic device, wherein the first electronic device and the second electronic device establish a communication connection, the first electronic device performs an enhanced video call method comprising:

establishing a video call with the second electronic device;

displaying a first video call interface comprising a screen sharing control;

based on the first electronic device detecting a first operation of a user on the screen sharing control, displaying a shared interface in a display area of the first electronic device, and sending, by the first electronic device, display data of the shared interface of the first electronic device to the second electronic device; and receiving, from the second electronic device, doodle data, and displaying a doodle on the shared interface based on the doodle data; and the second electronic device performs an enhanced video call method comprising:

establishing a video call with the first electronic device, and displaying a second video call interface;

receiving, from the first electronic device, a first request for sharing a screen of the first electronic device, and displaying, on the second video call interface, a first confirmation control used by a user of the second device to confirm the first request;

sending, to the first electronic device, a first reply indicating that the first request is agreed to;

receiving, from the first electronic device, display data that is of the shared interface;

displaying the shared interface associated with the display data;

displaying the doodle on the shared interface in response to a user input; and sending the doodle data to the first electronic device, wherein the doodle automatically disappears from the shared interface after a preset time.

16. The second electronic device according to claim 11, wherein based on the user being unable to operate the shared interface during the preset time, after the doodle disappears from the shared interface, the shared interface of the first electronic device is capable of being operated by the user.

17. The video call system according to claim 15, wherein based on the user being unable to operate the shared interface during the preset time, after the doodle disappears from the shared interface, the shared interface of the first electronic device is capable of being operated by the user.

18. The video call system according to claim 15, wherein the method performed by the first electronic device further comprises;

displaying an operation mapping control;

based on the first electronic device detecting a fifth operation performed by the user on the operation mapping control, sending a fourth request used for performing operation mapping to the second electronic device; and based on the fourth request being agreed to by the second electronic device, receiving, operation mapping signaling that is associated with the shared interface of the second electronic device and that is sent by the second electronic device, and displaying an operation mapping interface on the shared interface of the first electronic device based on the operation mapping signaling.

19. The video call system according to claim 15, wherein the method performed by the first electronic device further comprises;

based on the first electronic device detecting the first operation of the user on the screen sharing control, automatically displaying, by the first electronic device, a split-screen control.

20. The video call system according to claim 15, wherein the method performed by the second electronic device further comprises;

receiving, from the first electronic device, a fourth request for performing operation mapping, and displaying a third confirmation control associated with the fourth request, wherein the third confirmation control is used by the user to confirm the fourth request;

sending to the first electronic device a third reply based on detecting a fourteenth operation of the user on the third confirmation control; and based on detecting a fifteenth operation performed by the user on the shared interface, displaying an interface associated with the fifteenth operation, and sending operation mapping signaling to the first electronic device.

21. The first electronic device according to claim 1, wherein displaying the doodle on the shared interface occurs in concert with the established video call.

22. The second electronic device according to claim 11, wherein displaying the doodle on the shared interface occurs in concert with the established video call.

23. The video call system according to claim 15, wherein displaying the doodle on the shared interface occurs in concert with the established video call.

24. The first electronic device according to claim 1, wherein the first and second electronic devices are different types of electronic devices.

25. The second electronic device according to claim 11, wherein the first and second electronic devices are different types of electronic devices.

26. The video call system according to claim 15, wherein the first and second electronic devices are different types of electronic devices.

\* \* \* \* \*

UNITED STATES PATENT AND TRADEMARK OFFICE
CERTIFICATE OF CORRECTION

PATENT NO. : 12,248,724 B2
APPLICATION NO. : 17/907915
DATED : March 11, 2025
INVENTOR(S) : Mao et al.

It is certified that error appears in the above-identified patent and that said Letters Patent is hereby corrected as shown below:

In the Claims

Claim 3: Column 34, Line 64: "wherein the method further comprises;" should read as -- wherein the method further comprises: --.

Claim 4: Column 35, Line 12: "wherein the method further comprises;" should read as -- wherein the method further comprises: --.

Claim 5: Column 35, Line 20: "wherein the method further comprises;" should read as -- wherein the method further comprises: --.

Claim 6: Column 35, Line 30: "method further comprises;" should read as -- method further comprises: --.

Claim 7: Column 35, Line 44: "further comprises;" should read as -- further comprises: --.

Claim 7: Column 35, Line 50: "second electronic device: or" should read as -- second electronic device; or --.

Claim 8: Column 35, Line 60: "electronic device, the method further comprises;" should read as -- electronic device, the method further comprises: --.

Claim 9: Column 36, Line 8: "wherein the method further comprises;" should read as -- wherein the method further comprises: --.

Claim 10: Column 36, Line 21: "wherein the method further comprises;" should read as -- wherein the method further comprises: --.

Claim 12: Column 36, Line 61: "wherein the method further comprises;" should read as -- wherein the method further comprises: --.

Signed and Sealed this
Thirtieth Day of September, 2025

John A. Squires
*Director of the United States Patent and Trademark Office*

CERTIFICATE OF CORRECTION (continued)
U.S. Pat. No. 12,248,724 B2

Claim 14: Column 37, Line 29: "wherein the method further comprises;" should read as -- wherein the method further comprises: --.

Claim 15: Column 37, Line 46: "displaying a first video call interface comprising a" should read as -- displaying comprising a --.

Claim 18: Column 38, Line 25: "comprises;" should read as -- comprises: --.

Claim 19: Column 38, Line 41: "comprises;" should read as -- comprises: --.

Claim 20: Column 38, Line 48: "further comprises;" should read as -- further comprises: --.